(12) United States Patent
La Cour et al.

(10) Patent No.: US 10,565,514 B2
(45) Date of Patent: Feb. 18, 2020

(54) SYSTEM AND METHOD FOR EMULATION OF A QUANTUM COMPUTER

(71) Applicant: Board of Regents, The University of Texas System, Austin, TX (US)

(72) Inventors: Brian R. La Cour, Austin, TX (US); Granville E. Ott, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 310 days.

(21) Appl. No.: 15/474,379

(22) Filed: Mar. 30, 2017

(65) Prior Publication Data

US 2017/0286858 A1 Oct. 5, 2017

Related U.S. Application Data

(60) Provisional application No. 62/315,957, filed on Mar. 31, 2016.

(51) Int. Cl.
*G06F 7/48* (2006.01)
*G06F 9/445* (2018.01)
(Continued)

(52) U.S. Cl.
CPC .............. *G06N 10/00* (2019.01); *G06F 7/50* (2013.01); *G06F 7/523* (2013.01); *G06F 17/5009* (2013.01); *G06F 2217/16* (2013.01)

(58) Field of Classification Search
USPC ............... 703/2, 22, 24, 26; 702/27, 186
See application file for complete search history.

(56) References Cited

U.S. PATENT DOCUMENTS

| 8,832,164 B2 * | 9/2014 | Allen | G06N 10/00 708/200 |
|---|---|---|---|
| 9,774,401 B1 * | 9/2017 | Borrill | H04L 9/0852 |

(Continued)

OTHER PUBLICATIONS

Feynman, Richard P. "Simulating physics with computers." International journal of theoretical physics 21.6 (1982): 467-488; 22 pages.

(Continued)

*Primary Examiner* — Thai Q Phan
(74) *Attorney, Agent, or Firm* — Baker Botts L.L.P.

(57) ABSTRACT

A universal quantum computer may be emulated by a classical computing system that uses an electronic signal of bounded duration and amplitude to represent an arbitrary initial quantum state. The initial quantum state may be specified by inputs provided to the system and may be encoded in the signal, which is derived from a collection of phase-coherent coherent basis signals. Unitary quantum computing gate operations, including logical operations on qubits or operations that change the phase of a qubit, may be performed using analog electronic circuits within the quantum computing emulation device. These circuits, which may apply a matrix transformation to the signals representing the initial quantum state, may include four-quadrant multipliers, operational amplifiers, and analog filters. A measurement component within the quantum computing emulation device may produce a digital signal output representing the transformed quantum state. The gate operation(s) performed may be selected from among multiple supported operations.

20 Claims, 31 Drawing Sheets

(51) Int. Cl.
*G06F 9/455* (2018.01)
*G06N 10/00* (2019.01)
*G06F 17/50* (2006.01)
*G06F 7/523* (2006.01)
*G06F 7/50* (2006.01)

(56) References Cited

U.S. PATENT DOCUMENTS

| | | | | |
|---|---|---|---|---|
| 2005/0273306 | A1* | 12/2005 | Hilton | G06N 10/00 703/11 |
| 2007/0239366 | A1* | 10/2007 | Hilton | B82Y 10/00 702/27 |
| 2011/0238378 | A1* | 9/2011 | Allen | G06N 10/00 702/186 |
| 2017/0286858 | A1* | 10/2017 | La Cour | G06F 7/48 |
| 2018/0046933 | A1* | 2/2018 | La Cour | G06F 13/364 |

OTHER PUBLICATIONS

Ferry, D. K., R. Akis, and J. Harris. "Quantum wave processing." Superlattices and microstructures 30.2 (2001): 81-94; 14 pages.

Kish, Laszlo B. "Quantum computing with analog circuits: Hilbert space computing." Smart Structures and Materials. International Society for Optics and Photonics, 2003; 9 pages.

O uchi, S-I., Minoru Fujishima, and Koichiro Hoh. "An 8-qubit quantum-circuit processor." IEEE International Symposium on Circuits and Systems. No. 5. IEEE; 2002; 4 pages.

Fujishima, Minoru, Kosuke Saito, and Koichiro Hoh. "16-qubit quantum-computing emulation based on high-speed hardware architecture." Japanese Journal of Applied Physics 42.4S (2003): 2182; 3 pages.

La Cour, Brian R. "A locally deterministic, detector-based model of quantum measurement." Foundations of Physics 44.10 (2014): 1059-1084; 26 pages.

Dyson, Charles. "Implementing quantum algorithms using classical electrical circuits: Deutsch, Deutsch-Jozsa and Grover." Diss. University of York, 2011; 29 pages.

Barenco, Adriano, et al. "Elementary gates for quantum computation." Physical review A 52.5 (1995): 3457; 31 pages.

Cheng, Sheng-Tzong, and Ming-Hung Tao. "Quantum cooperative search algorithm for 3-SAT." Journal of Computer and System Sciences 73.1 (2007): 123-136; 14 pages.

\* cited by examiner

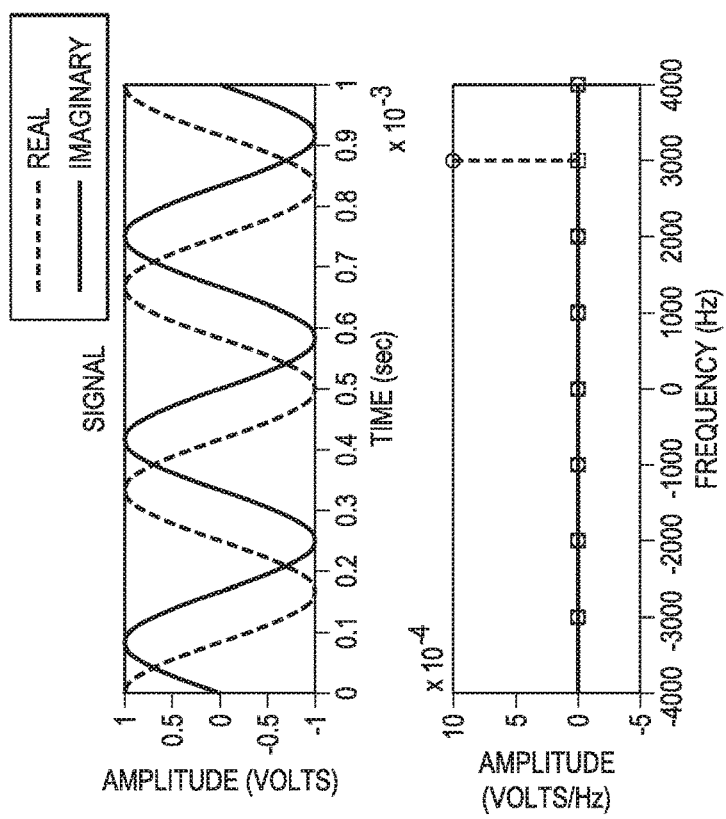
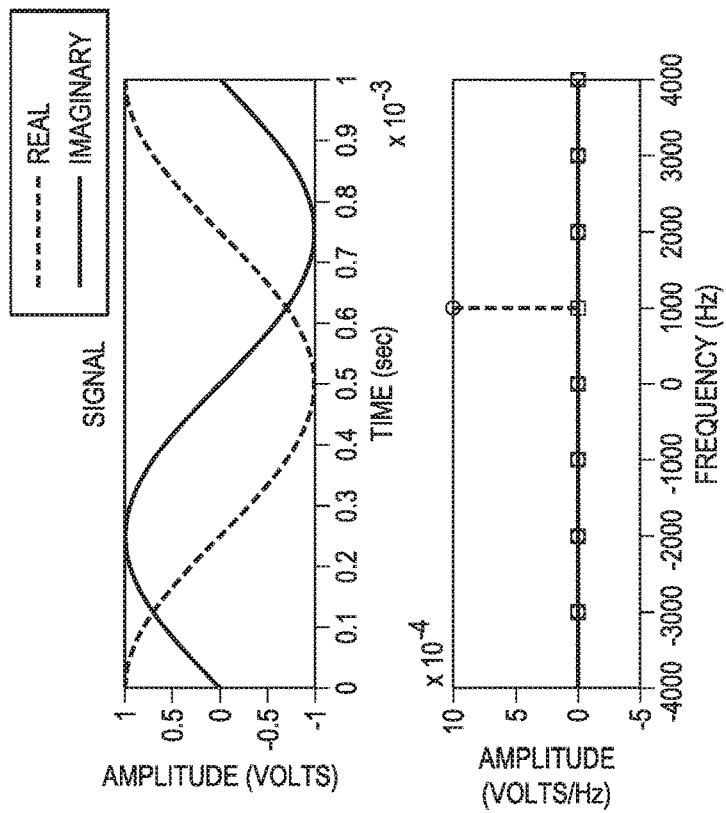

SYSTEM AND METHOD FOR EMULATION OF A QUANTUM COMPUTER

RELATED APPLICATIONS

This application claims priority to U.S. Provisional Application No. 62/315,957 filed Mar. 31, 2016, entitled "System and Method for Emulation of a Quantum Computer," which is incorporated herein by reference in its entirety.

STATEMENT OF GOVERNMENT INTEREST

This invention was made with government support under Grant no. N00014-14-1-0323 awarded by the Office of Naval Research. The government has certain rights in the invention.

FIELD OF THE DISCLOSURE

The present disclosure relates generally to the field of quantum computing systems and, more particularly, to systems and methods for emulating a quantum computer.

DESCRIPTION OF THE RELATED ART

A quantum state can be represented by a mathematical object that characterizes the state of a physical system obeying the laws of quantum mechanics. Quantum states can be used to represent the physical state of microscopic systems, such as atoms or photons. These states may exist naturally but can be difficult to prepare and control in a given physical system.

The quantum state of a physical system can be described as either a pure or a mixed state. Attaining a pure state may involve special preparation of the physical system, while a mixed state may occur naturally. Interactions of the physical system with the surrounding environment can reduce the purity of a pure state, which then may be reduced to a mixed state. The process of a quantum state changing from a pure state to a mixed state is sometimes referred to as decoherence. For example, decoherence processes can destroy entanglement and pure states, reducing the quantum state to a mixed state. Mixed states may not be useful in typical quantum computing systems, and some existing quantum computer algorithms are based upon the assumption that the quantum state is a pure state. A quantum state can also be described as either an entangled state or a separable state. An entangled state may describe the state a physical system in which certain components are interrelated, while a separable state may describe the state of a physical system that is not entangled.

A quantum computing system may be defined as a physical system used to prepare, manipulate, and measure a quantum state. A quantum computing system may use a set of gates in a circuit architecture to prepare and manipulate the quantum state, which is sometimes referred to as a "gate-based" model of quantum computing. In addition, one or more measurement gates may be used to output the results of the computational process. Current approaches to quantum computing use true quantum systems, such as photons, trapped ions, or superconducting circuits. All of these approaches rely upon maintaining a highly coherent quantum state through a series of gate operations in order to achieve a computational advantage. Preparing and manipulating such systems can be quite difficult, as small interactions with the environment quickly lead to decoherence of the state and, consequently, a significant loss in performance. The efficacy of a gate-based quantum computing system may therefore rely upon maintaining a pure quantum state, which may be an entangled pure state. The quality of a gate-based quantum computing system may also be dependent upon the quality of each of the constituent gates. The quality of a gate may be defined by gate fidelity, which measures the similarity of a gate's actual output state to an ideal output state. In order to achieve fault-tolerant performance, through the use of Quantum Error Correction (QEC) protocols, a minimum threshold of gate fidelity may be desirable. Achieving this minimum threshold has been one challenge in some existing physical representations of a quantum computing system.

Certain theoretical research has suggested that quantum computing systems may outperform classical digital computers at performing certain tasks, such as factorization and list searches, which, among other tasks, may be used in communication security and data mining. Some algorithms developed from the theoretical research may be practically executed on a physical quantum computing system.

SUMMARY

The disclosure relates to systems and methods for emulating a quantum computer. In one aspect, a disclosed quantum computer emulation device may include a basis state generator including circuitry to receive a baseline signal, derive a plurality of phase-coherent signals from the baseline signal, where each of two or more pairs of signals in the plurality of phase-coherent signals is to represent a real component and an imaginary component of a signal for a single qubit, and multiply components of the single-qubit signals together to create a plurality of basis state signals. The quantum computer emulation device may also include an initial quantum state generator including circuitry to receive a plurality of direct current (DC) voltages, the DC voltages to represent complex coefficients, and generate, from the plurality of basis state signals and dependent on the plurality of DC voltages, a synthesized complex signal to represent a particular initial quantum state of two or more qubits. The quantum computer emulation device may include a first gate component including circuitry to receive the synthesized complex signal, and to perform a given operation on the synthesized complex signal to produce a modified complex signal. The modified complex signal may represent a transformed quantum state. The quantum computer emulation device may also include a measurement component including circuitry to receive the modified complex signal, and output a digital signal. The digital signal may represent the transformed quantum state.

In any of the disclosed embodiments, the plurality of phase-coherent signals may include two pairs of signals, the plurality of basis state signals may include four basis state signals, and the synthesized complex signal may represent the initial quantum state of two qubits.

In any of the disclosed embodiments, the initial quantum state generator may further include circuitry to multiply each of the plurality of basis state AC signals by a respective pair of DC voltages, the pair of DC voltages to represent one of the complex coefficients, and to add results of the multiplication of the basis state AC signals by the respective pairs of DC voltages to generate the synthesized complex signal.

In any of the disclosed embodiments, the initial quantum state generator may further include circuitry to encode information to represent the initial quantum state in the frequency information in the synthesized complex signal. To produce the modified complex signal, the first gate component may further include circuitry to perform a matrix transformation on the synthesized complex signal. The matrix transformation may cause information to represent the transformed quantum state to be encoded in the frequency information in the modified complex signal.

In any of the disclosed embodiments, to produce the modified complex signal, the first gate component may be programmable to perform one of two or more supported quantum computing operations at a time, including the given operation, and to perform each of the two or more supported quantum computing operations, the first gate component may further include analog circuitry to perform one or more of a multiplication operation, a summation operation, and a filtering operation.

In any of the disclosed embodiments, the quantum computer emulation device may further include a second gate component including circuitry to receive the modified complex signal, and to perform a particular operation on the modified complex signal to produce a further modified complex signal, the further modified complex signal to represent a furthered transformed quantum state.

In any of the disclosed embodiments, to produce the modified complex signal, the first gate component may further include circuitry to perform two or more supported quantum computing operations, including the given operation. At least one of the supported quantum computing operations may be to operate on a single qubit, and at least one of the supported quantum computing operations may be to operate on two or more qubits.

In any of the disclosed embodiments, to produce the modified complex signal, the first gate component may further include circuitry to determine on which one or more of the qubits represented in the synthesized complex signal the given operation is to be performed, to filter the synthesized complex signal to extract components of the synthesized complex signal that represent the one or more qubits on which the given operation is to be performed, and to perform the given operation.

In any of the disclosed embodiments, the quantum computer emulation device may further include a storage component, and circuitry to direct the modified complex signal from an output of the first gate component to the storage component, and to direct the modified complex signal from the storage component to an input of the first gate component. The first gate component may further include circuitry to receive the modified complex signal from the storage component, and to perform a particular operation on the modified complex signal to produce a further modified complex signal, the further modified complex signal to represent a furthered transformed quantum state.

Another a disclosed aspect includes a method for emulating a quantum computer. The method may include generating a first pair of phase-coherent signals representing an initial quantum state of one or more qubits, the signals corresponding to real and imaginary parts of a complex signal, respectively. The method may include providing the first pair of signals as inputs to a first gate component that has been programmed to perform a given quantum computing operation. The method may include performing, by analog electronic circuits within the first gate component, the given quantum computing operation on the first pair of signals to produce a second pair of signals. The second pair of signals may represent a transformed quantum state of at least one of the one or more qubits. The method may also include providing an output of the first gate component to a measurement component, and producing, by the measurement component, a digital representation of the output of the first gate component.

In any of the disclosed embodiments, the first pair of phase-coherent signals may represent an initial quantum state of two or more qubits.

In any of the disclosed embodiments, the method may further include, prior to providing an output of the first gate component to the measurement component, storing a representation of the second pair of signals for use in a subsequent quantum computing operation, providing the representation of the second pair of signals as inputs to the first gate component, and performing, by analog electronic circuits within the first gate component, the subsequent quantum computing operation on the second pair of signals to produce a third pair of signals, the third pair of signals representing a transformed quantum state of at least one of the one or more qubits. Providing an output of the first gate component to the measurement component may include providing the third pair of signals to the measurement component.

In any of the disclosed embodiments, the method may further include, prior to providing the first pair of signals as inputs to the first gate component, programming the first gate component to perform the given quantum computing operation, including providing, to the first gate component, inputs that cause the first gate component to perform a particular one of two or more quantum computing operations that are executable by the analog electronic circuits within the first gate component, the particular quantum computing operation including one or more of a multiplication operation, a summation operation, and a filtering operation.

In any of the disclosed embodiments, the method may further include, prior to providing the first pair of signals as inputs to the first gate component, receiving a baseline signal, deriving a plurality of phase-coherent signals from the baseline signal, wherein each of two or more pairs of signals in the plurality of phase-coherent signals represents a real component and an imaginary component of a signal for a single qubit, multiplying components of the single-qubit signals together to create a plurality of basis state signals, receiving input representing a plurality of complex coefficients, and generating, from the plurality of basis state signals and dependent on the plurality of complex coefficients, the first pair of signals.

In any of the disclosed embodiments, the method may further include, prior to providing an output of the first gate component to the measurement component, performing, by analog electronic circuits of a second gate component within the first gate component, a second quantum computing operation on the second pair of signals to produce a third pair of signals, the third pair of signals representing a transformed quantum state of at least one of the one or more qubits, and providing an output of the first gate component to the measurement component may include providing the third pair of signals to the measurement component.

In another aspect, a disclosed non-transitory computer readable medium may store instructions that are executable by a processor to program and operate a quantum computing emulation device. Programming and operating the quantum computing emulation device may include receiving input defining an initial quantum state of one or more qubits to be encoded in a pair of phase-coherent signals, the signals representing real and imaginary parts of a complex signal, respectively, providing the input defining the initial quantum state to a quantum computing emulation device as one or more direct current (DC) values, receiving input defining a first quantum computing operation to be performed on the pair of signals into which the initial quantum state is encoded, providing the input defining the first quantum computing operation to the quantum computing emulation device as one or more pairs of DC values, each of which may represent a complex coefficient of a matrix transformation to be applied by the quantum computing emulation device to transform the initial quantum state, and receiving, subsequent to the performance of the first quantum computing operation on the pair of signals by the quantum computing emulation device quantum, a digital or analog signal representing a modified quantum state as transformed by the quantum computing emulation device.

In any of the disclosed embodiments, when executed by the processor the instructions may further cause the processor to perform receiving input defining a plurality of basis states from which the pair of phase-coherent signals are to be derived, and providing the input defining the plurality of basis state to the quantum computing emulation device.

In any of the disclosed embodiments, receiving the input defining the first quantum computing operation may include receiving input selecting one of a plurality of quantum computing operations supported in the quantum computing emulation device.

In any of the disclosed embodiments, receiving the input defining the first quantum computing operation may include receiving input specifying on which one or more of the one or more qubits the first quantum computing operation is to be performed, and the digital signal representing the modified quantum state may be dependent on which one or more of the one or more qubits are specified.

In any of the disclosed embodiments, when executed by the processor the instructions may further cause the processor to perform receiving input defining a second quantum computing operation to be performed by the quantum computing emulation device to transform a result of the first quantum computing operation, and providing the input defining the second quantum computing operation to the quantum computing emulation device as one or more pairs of DC values. The digital signal may represent a modified quantum state as transformed by the performance of the first quantum computing operation and the second quantum computing operation by the quantum computing emulation device.

BRIEF DESCRIPTION OF THE DRAWINGS

Embodiments of the present disclosure may be better understood through reference to the following figures in which:

FIGS. 12A-12D illustrate an example of the generation of basis states, according to one embodiment;

DETAILED DESCRIPTION OF PARTICULAR EMBODIMENT(S)

Figure 1:
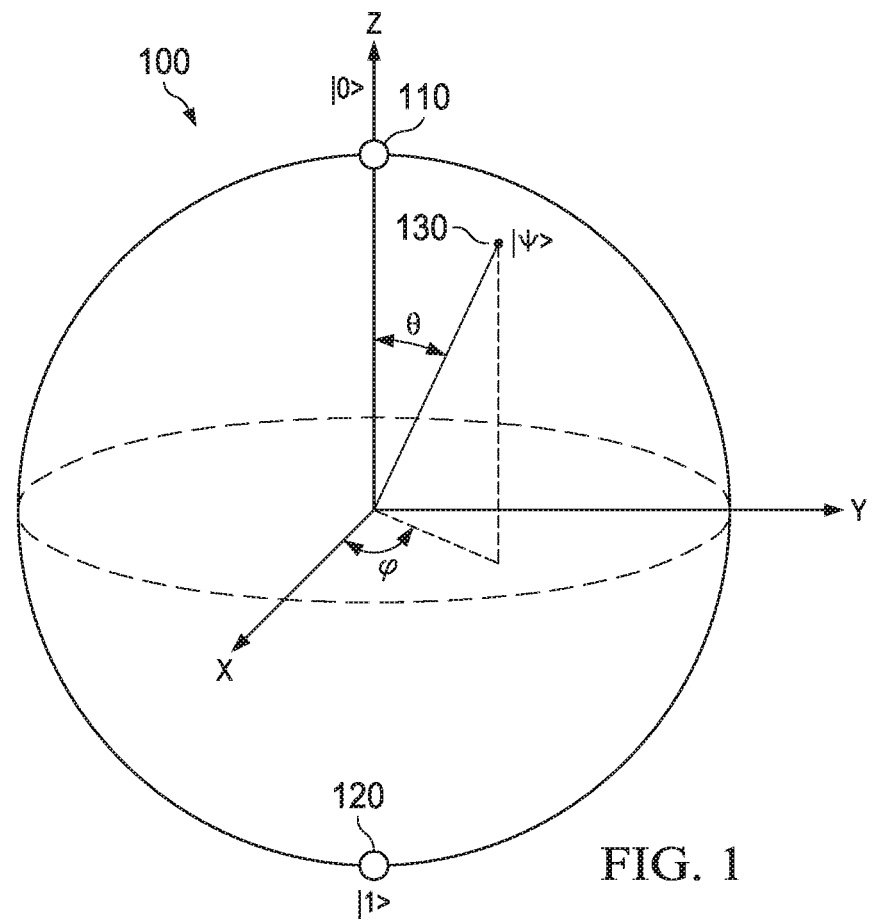
FIG. 1 illustrates an example conceptual representation of a single-qubit quantum computing operation.

In the following description, details are set forth by way of example to facilitate discussion of the disclosed subject matter. It should be apparent to a person of ordinary skill in the field, however, that the disclosed embodiments are exemplary and not exhaustive of all possible embodiments. For a more complete understanding of the present disclosure, reference is made to the following description and accompanying drawings.

The present disclosure relates to systems and methods for emulating a quantum computer. Some quantum computing systems rely upon maintaining a pure quantum state and are susceptible to decoherence, which, as noted above, may corrupt the desired pure state. In addition, some quantum computing systems have used a physical representation of the quantum state that is relatively difficult to prepare, maintain, and/or manipulate. The challenges with the physical representation in quantum computing implementations has become increasingly difficult as the number of qubits is increased and may limit the number of qubits to a low value.

The recent discovery of classical analogues to quantum systems has suggested that a classical emulation of a quantum computer may be feasible and both easier to build and far less susceptible to decoherence.

As noted above, a quantum computing system may use a set of gates in a circuit architecture to prepare and manipulate the quantum state, which is sometimes referred to as a "gate-based" model of quantum computing. In addition, one or more measurement gates may be used to output the results of the computational process.

In some embodiments of the present disclosure, a universal quantum computer may be emulated with a classical computing system, one that uses a signal of bounded duration and amplitude to represent an arbitrary quantum state. The signal may be of any modality (e.g., acoustic, electromagnetic, etc.). However, the example embodiments described herein are primarily focused on electronic signals.

In at least some embodiments, quadrature modulation may be used to represent a single qubit. As described herein, this approach may be generalized to multiple qubits, in some embodiments. In at least some embodiments, individual qubits may be represented by in-phase and quadrature sinusoidal signals. Unitary gate operations may be performed using analog electronic circuit devices, such as four-quadrant multipliers, operational amplifiers, and analog filters, although non-unitary operations may be performed as well. Unlike some earlier approaches, which operate explicitly on the quantum state components, in some embodiments of the present disclosure, these gate operations may be performed by decomposing the quantum state into pairs of subspace projection signals, thereby avoiding an otherwise cumbersome spectral decomposition and re-synthesis process for each gate operation. In some embodiments, using a hidden-variable model of quantum measurement, these same projection operations may be used to realize statistical measurement gates. In this manner, the Hilbert space structure of the quantum state, as well as a universal set of gate operations, may be fully emulated classically. In some embodiments, the required bandwidth of this approach may scale exponentially with the number of qubits, which may limit the scalability of the approach. However, the intrinsic parallelism, ease of construction, and classical robustness to decoherence may, in some embodiments, lead to capabilities and efficiencies rivaling that of current high performance computers.

One of the properties of quantum computers that makes these efficiencies possible is the Hilbert space structure of the quantum state, which gives rise to linear superpositions of classical binary states over a complex scalar field. The quantum state is therefore one of a continuum of possible states, resembling more an analog than digital computer in this regard. Because the dimension of the Hilbert space scales exponentially with the number of quantum bits (or, qubits), a quantum computer may be considered to have vastly greater capability over a digital computer with an equivalent number of classical bits.

FIG. 1 illustrates an example conceptual representation of a single-qubit quantum computing operation. In this example, a single qubit state 130 may be thought of as a point on a sphere 100, where the north pole 110 represents a value of 0 and the south pole 120 represents a value of 1. In this example, a single-qubit operation may be thought of as taking the qubit at point 130 on sphere 100 and rotating it around the surface of sphere 100 to a different point on the sphere. As illustrated in this example, there may be a whole continuum of quantum computing operations that could be applied to the qubit to cause it to land on different points on sphere 100.

Described herein are methods for building and operating a quantum computing emulation device using analog signals and classical analog signal processing. This approach uses a signal model that is mathematically equivalent to a multi-qubit, gate-based quantum computer. In various embodiments, quantum bits (qubits) are represented using quadrature modulated tonals of an analog electronic signal. The device is well suited to solving particular types of numerical optimization problems. Based on initial prototyping, as described herein, it is believed that a device of between 10 and 20 qubits can be built on one or two integrated circuit chips and can outperform current digital processors.

As described in more detail below, the approach presented herein includes techniques for addressing individual qubits, or groups of qubits, and applying gate operations upon them using analog electronic adders, multipliers, and filters. A model of quantum measurement gates based on amplitude threshold detections has been constructed that is capable of reproducing phenomena such as quantum contextuality and entanglement, which are thought to be uniquely quantum in nature and important to quantum computing. As described herein, a physical (hardware) demonstration system has been constructed that is capable of emulating a two-qubit quantum device.

As described in detail herein, methods and systems for emulating a quantum computing system may involve, given a pure quantum state $|\psi\rangle$ in a mathematical Hilbert space $\mathcal{H}$, constructing a physical representation using a time-domain signal. The signal may be embodied by electronic voltages, electromagnetic waves, acoustic waves, or another physical embodiment of the signal, as desired. Basic operations on the signal, such as addition, multiplication, scaling, and filtering, may be performed. Given a quantum computing algorithm, an initial quantum state may be constructed and then a sequence of quantum gates, represented by standard signal analysis and manipulation devices, may be applied. Finally a measurement gate, embodied using devices for signal analysis and/or signal manipulation, may be applied to obtain a result of the algorithm. Both types of gates utilize projection operators, in a manner described below.

Figure 2:
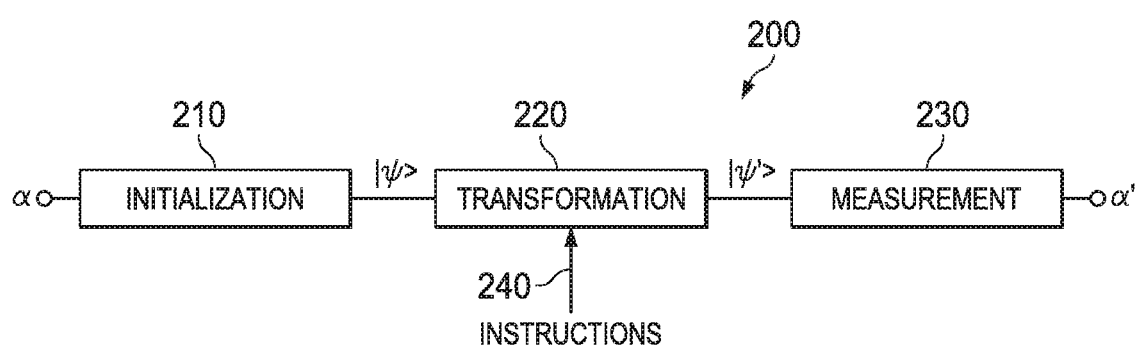
FIG. 2 is a block diagram illustrating an example high-level system architecture for a quantum computer emulation system, according to one embodiment.

FIG. 2 is a block diagram illustrating an example high-level system architecture for a quantum computer emulation system 200, according to one embodiment. In this example, the quantum computer emulation system 200 includes an initialization component 210, a transformation component 220, and a measurement component 230. As illustrated in this example, the inputs to the quantum emulation system 200 may include a vector of complex coefficients, α, and instructions 240 for a set of transformations to be applied to the system state. The vector α may be used to specify an initial system state, $|\psi\rangle$, of the quantum computer emulation system 200. The initialization component 210 may include circuitry to generate, from a collection of basis state signals, a pair of signals that represent the initial quantum state specified by the vector α. The transformation component 220 may apply a matrix transformation to the an initial system state, $|\psi\rangle$ to produce the final system state, which is shown as $|\psi'\rangle$. A measurement may be performed on the final state by measurement component 230, which may produce, for example, a vector of complex numbers, α', corresponding to the final system state. In this example, the vector α' of complex values may represent an output of the quantum computer emulation system 200.

In this and other examples included herein, the signals representing a quantum state are described as a pair of signals representing the real and imaginary parts of a complex signal, respectively. However, in other embodiments, these two parts of a complex signal may be combined into a single signal through carrier modulation. In this case, two signals representing the quantum state may be encoded in the single carrier signal. In some embodiments, a signal modulation device (such as that illustrated in FIG. 6) may be employed in the quantum computing emulation device to modulate a complex signal to produce a (real) carrier signal. In some embodiments, a signal demodulation device (such as that illustrated in FIG. 7) may be employed to demodulate a (real) carrier signal into its corresponding real and imaginary components. As noted above, an example physical (hardware) quantum computing emulation device has been constructed that includes breadboards (circuit boards) for implementing at least some of the primary components of the device. This example device includes one breadboard containing circuitry to perform signal generation, one breadboard containing circuitry to receive those signals and generate a representation of an initial quantum state, and one breadboard containing circuitry to perform operation(s) on the basis state to produce an output representing a modified quantum state. This example device may be interfaced with a desktop computer that is then used to program the quantum computing emulation device. For example, through this interface, a user may specify a particular problem to be solved, an initial state, a sequence of gate operations to be performed on the initial state, and/or the measurements are performed on the final state to get a digital answer. More specifically, this example device includes an Application Programming Interface (API) through which configuration information and commands are presented to the appropriate breadboards. In this example, the interface between the desktop computer and the quantum computing emulation device includes D/A devices, which allow certain voltage signals to be specified on the desktop computer and presented to the circuit boards to control the operation of the device. Similarly, the interface between the desktop computer and the quantum computing emulation device includes A/D devices through which intermediate and/or final result values may be presented to and recorded by the desktop computer.

In various embodiments, the sequence of gates included in a quantum computing emulation device may include any combination of gates of the types that are used in quantum computing. These may include gates that perform operations similar to those performed by the logic gates in a digital computer as well as other operations that are associated with quantum computing. For example, in quantum computing, an AND gate is reversible. Therefore, unlike in a digital computer, an AND gate may include 3 inputs and 3 outputs. Note, however, that it may not be necessary to construct gates that have 3 inputs and 3 outputs, since it can be shown that any operation that to be perform on a quantum computer can be performed using combinations of single-qubit gates and two-qubit gates. In at least some embodiments of the present disclosure, the quantum computing emulation device may include a universal set of gates for performing operations on a two-qubit state, and these gates may be fully programmable.

Figure 3:
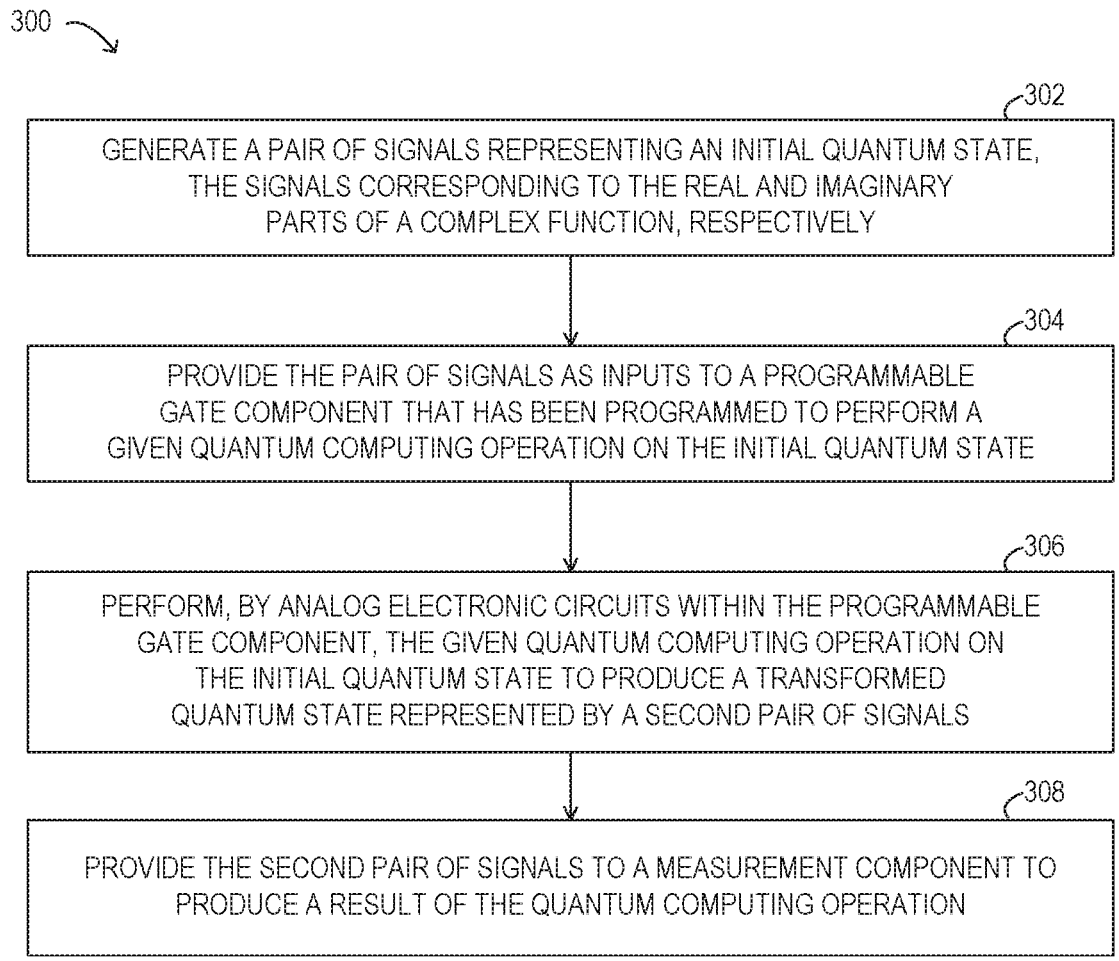
FIG. 3 illustrates an example of a method for emulating a quantum computer, according to one embodiment.

One example of a method 300 for emulating a quantum computer is illustrated by the flow diagram in FIG. 3, according to one embodiment. As illustrated at 302, the method may include generating a pair of signals representing an initial quantum state, where the signals corresponding to the real and imaginary parts of a complex function, respectively. As illustrated at 304, the method may include providing the pair of signals as inputs to a programmable gate component that has been programmed to perform a given quantum computing operation on the initial quantum state.

As illustrated at 306, the method may include performing, by analog electronic circuits within the programmable gate component, the given quantum computing operation on the initial quantum state to produce a transformed quantum state represented by a second pair of signals. The method may also include providing the second pair of signals to a measurement component to produce a result of the quantum computing operation, as shown at 308. In at least some embodiments, all or a portion of method 300 may be implemented by circuitry within a quantum computing emulation device.

In some embodiments, a quantum computing emulation device may support serial gate operations. For example, using D/A converters, the resultant states of at least some gate operations may be recorded and serially played back. In some embodiments, a sequence of gate operations may be specified (e.g., using the MATLAB® programming language developed by The MathWorks, Inc.) on a desktop computer that is interfaced to the device, and the output of each gate operation in the sequence may be recorded and then played back as the input state for the next gate operation in the sequence. In at least some embodiments, analog switches may be used to switch the inputs of single-qubit gates between qubits, as well as to switch to a controlled single-qubit gate. The quantum computing emulation device may thus implement universal programmability.

Figure 4:
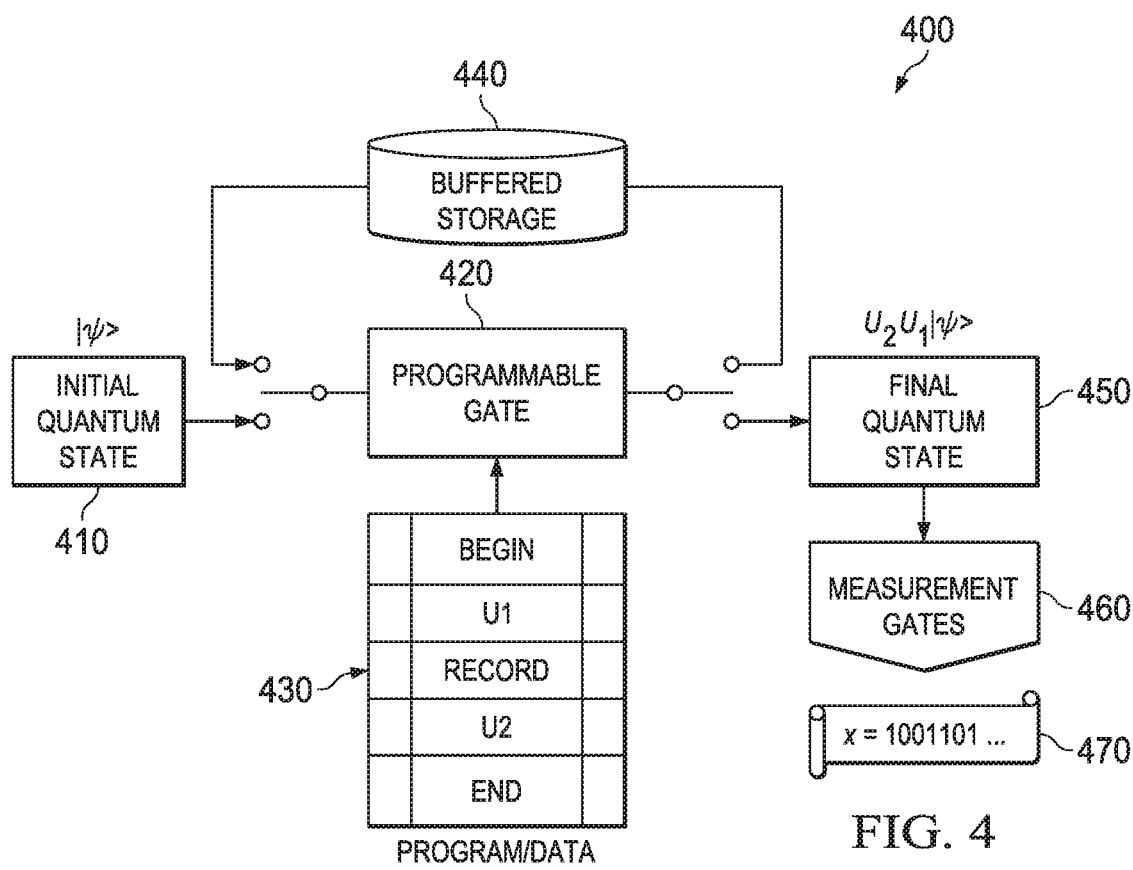
FIG. 4 illustrates an example notational computer architecture for a quantum computing emulation device, according to one embodiment.

FIG. 4 illustrates an example notational computer architecture for a quantum computing emulation device, according to one embodiment. As illustrated in this example, a quantum computing emulation device 400 may include a component that includes circuitry for generating an initial quantum state (shown as initial quantum state component 410), a component that includes circuitry for performing any of multiple supported gate operations on the initial quantum state (shown as programmable gate component 420), a component that stores an output of programmable gate component 420 for use as an input to a subsequent gate operation (shown as buffered storage component 440), storage component a component that includes circuitry for obtaining the final quantum state (shown as final quantum state component 450), and one or more components that include circuitry for producing a digital signal representing the result of a quantum computing operation (shown as measurement gates 460). In this example, device 400 receives a sequence of instructions indicating the gate operations to be performed and the results to be recorded (shown as program/data 430), and outputs a digital result 470.

As described in more detail below, the initial quantum state component 410 may include circuitry for creating basis states for the input to the quantum computing emulation device and for performing quantum state synthesis to generate of a pair of complex signals in which information defining the initial quantum state is encoded in the frequency content of the signals.

As described in more detail below, the programmable gate component 420 may perform a type of matrix manipulation on these complex signals to transform them according to the specified gate operation, may record the result, and may (optionally) feed the result back to the input if there is a sequence of gate operations to be performed. In some embodiments, results of the gate operations may be recorded in the buffered storage component 440, which may take any of a variety of suitable forms. In some embodiments (e.g., those operating at relatively low frequencies), buffered storage component 440 may be implemented (e.g., digitally) in a memory device. For example, current memory devices may support operating frequencies of up to 1 Ghz for this application. In other embodiments (e.g., those operating at higher frequencies), buffered storage component 440 may be implemented using one or more delay lines (e.g., optical or acoustic delay lines). In embodiments in which the results are stored digitally, they may be converted to a digital representation for storage and then converted back to an analog representation before being fed back into the programmable gate component 420 as an input. In some embodiments, once the sequence of gate operations is completed, measurements may be taken on the signals representing the final quantum state (e.g., by measurement gates 460) to generate and output the digital representation of the result (shown as 470). For example, the measurement gates 460 may include circuitry to perform digital sampling, in some embodiments.

Figure 5:
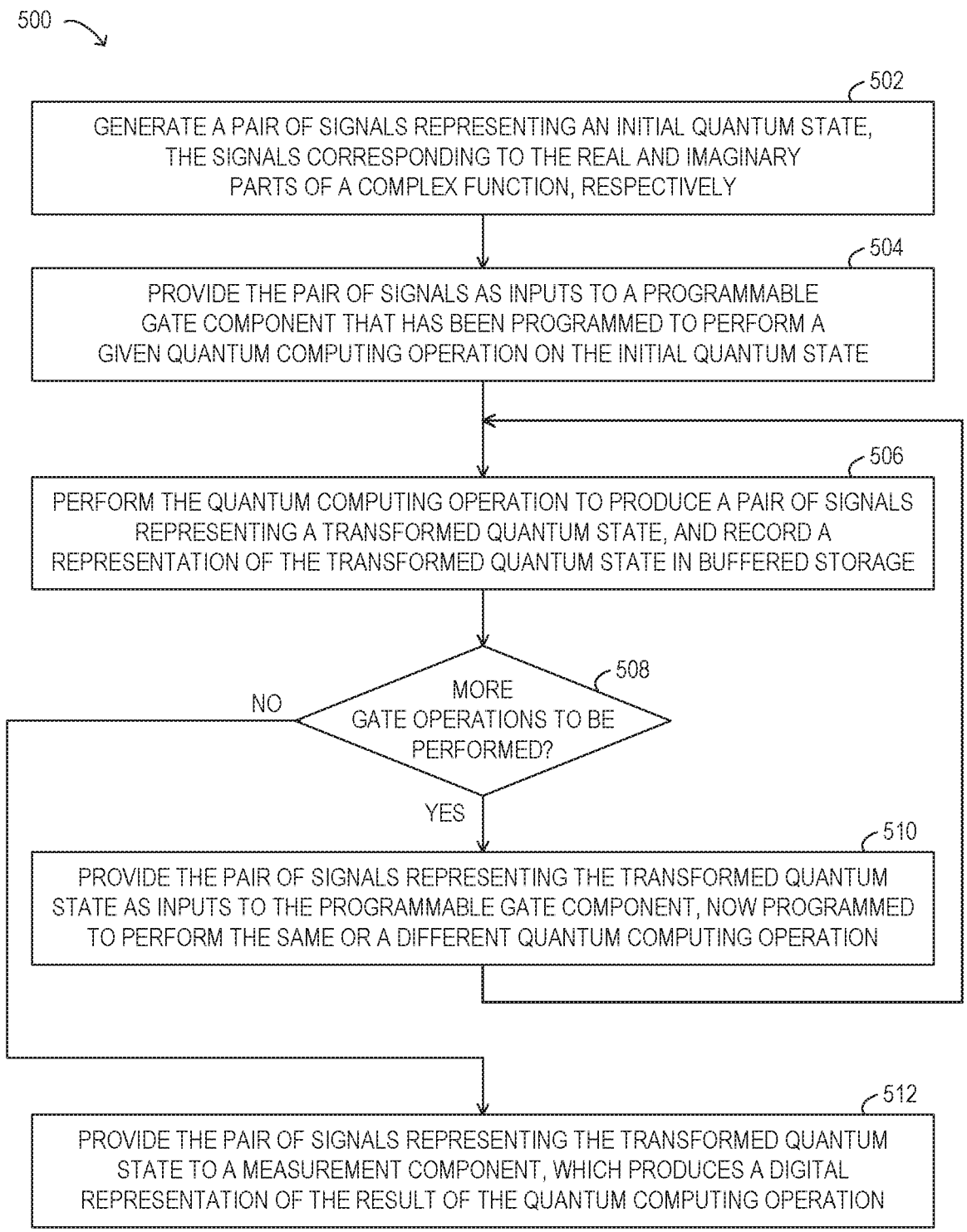
FIG. 5 illustrates an example method for emulating the performance of a quantum computing operation in a quantum computing emulation device, according to one embodiment.

An example method 500 for emulating the performance of a quantum computing operation in a quantum computing emulation device (such as quantum computing emulation device 400 illustrated in FIG. 4) is illustrated by the flow diagram in FIG. 5, according to one embodiment. As illustrated at 502, in this example, the method may include generating a pair of signals representing an initial quantum state, where the signals correspond to the real and imaginary parts of a complex function, respectively. The method may also include providing the pair of signals as inputs to a programmable gate component that has been programmed to perform a given quantum computing operation on the initial quantum state (as in 504). The method may include performing the quantum computing operation on the signals representing the initial quantum state to produce a pair of signals representing a transformed quantum state, as in 506. As illustrated in this example, the method may also include recording a representation of the transformed quantum state (e.g., a representation of one or more pairs of signals) in buffered storage for a potential subsequent use.

If (at 508) it is determined that more gate operations are to be performed, the method may include providing the pair of signals representing the transformed quantum state as inputs to the programmable gate component, as in 510, and repeating the operation shown as 506 for each additional gate operation to be performed. As illustrated in this example, the programmable gate component may be programmed to perform the same quantum computing operation or a different quantum computing operation during each additional iteration. If, or once (at 508), it is determined that there are no additional gate operations to be performed, the method may include providing the pair of signals representing the transformed quantum state to a measurement component, as in 512, after which the measurement component may produce a digital representation of the result of the quantum computing operation. In at least some embodiments, all or a portion of method 500 may be implemented by circuitry within a quantum computing emulation device.

As will be described in more detail below, a physical representation of a multi-qubit quantum state is disclosed in terms of a physical system in which material resources may scale more efficiently than exponentially with the number of qubits. The systems and methods disclosed herein may provide a physical representation of the processing gates for a multi-qubit quantum computing system. Such a representation may be robust against decoherence and other undesirable effects that may degrade the purity and/or fidelity of the quantum state.

The pure quantum state of an n-qubit quantum computer may be represented by a mathematical object, an element of a Hilbert space. More specifically, it may be represented by an element $|\psi\rangle$ of a $2^n$-dimensional Hilbert space $\mathcal{H}$ taking on the particular form of a tensor product of n two-dimensional Hilbert spaces $\mathcal{H}_0, \ldots, \mathcal{H}_{n-1}$ such that $\mathcal{H} = \mathcal{H}_{n-1} \otimes \ldots \otimes \mathcal{H}_0$, where $\otimes$ is the tensor product. A single element of one of the n constituent Hilbert spaces constitutes a qubit. The specification of an inner product $\langle \phi | \psi \rangle$ between states $|\phi\rangle$ and $|\psi\rangle$ in $\mathcal{H}$ completes the Hilbert-space description.

In one example, a pair of orthonormal basis states may be denoted by $|0\rangle_i$ and $|1\rangle_i$, termed the computational basis, for $\mathcal{H}_i$ and $i \in \{0, \ldots, n-1\}$. Taking tensor products of these individual basis states, a set of $2^n$ orthonormal basis states is obtained for the product space $\mathcal{H}$. A particular binary sequence $x_0, \ldots \mathcal{H}_{n-1}$ therefore corresponds to a single basis state $|x_{n-1}\rangle \otimes \ldots \otimes |x_0\rangle$. For brevity, this binary sequence may be represented by its decimal form, $=x_0 2^0 + \ldots + x_{n-1} 2^{n-1} \in \{0, \ldots, 2^{n-1}\}$, so that the corresponding basis state may be written succinctly as $|x\rangle$ or, more explicitly, as $|x_{n-1} \ldots x_0\rangle$. Let $\langle x|\psi\rangle = \alpha_x \in \mathbb{C}$ for a given state $|\psi\rangle \in \mathcal{H}$ and basis state $|x\rangle$. This state may then be written $$|\psi\rangle = \sum_{x=0}^{2^n-1} \alpha_x |x\rangle$$

Thus, each of the $2^n$ basis states may be written as $|x\rangle = |x_{n-1}\rangle \otimes \ldots \otimes |x_0\rangle$, where $x = x_{n-1} 2^{n-1} + \ldots + x_0 2^0$ represents the decimal representation of $x \in \{0, \ldots, 2^{n-1}\}$ and $x_{n-1}, \ldots x_0 \in \{0, 1\}$ are the corresponding binary digits. As used herein, $|x\rangle = |x_{n-1} \ldots x_0\rangle$ may be written for compactness, while the equivalent notation $|x\rangle = |x_{n-1}\rangle_{n-1} \otimes \ldots \otimes |x_0\rangle_0$ may also be used in long form. A general, n-qubit quantum state $|\psi\rangle$ may be specified by $2^n$ complex numbers, each corresponding to a component $\alpha_x$ along a particular basis state $|x\rangle$.

Completing the Hilbert space description involves a physical representation of the inner product function. The inner product may be represented by a mathematical object, specifically a sesquilinear form, such that any two quantum states $|\phi\rangle$ and $|\psi\rangle$ may map to a complex number $\langle \phi|\psi\rangle$. An example physical representation of this mathematical construct is described later, according to one embodiment of the present disclosure.

For a degenerate, one-dimensional Hilbert space of zero qubits, a general pure quantum state $|\psi\rangle = \alpha_0|0\rangle$ may be represented mathematically by a single complex number $\alpha_0 = a_0 + jb_0$, where $a_0$ and $b_0$ are real numbers and $j = \sqrt{-1}$ is the imaginary unit. This complex number may be represented as the sum of the in-phase and quadrature components of a real sinusoidal signal s of the form $$s(t) = a_0 \cos(\omega_c t) - b_0 \sin(\omega_c t)$$

In this example, $\omega_c$ represents some carrier frequency (e.g., an angular frequency $\omega_c > 0$), and $a = \text{Re}[\alpha]$ and $b = \text{Im}[\alpha]$. Multiplying signal s by the in-phase and quadrature reference signals, and applying a low-pass filter with a passband below $2w_c$ removes the higher frequency components and yields the in-phase and quadrature amplitudes. Although s is a real signal, it may be written in terms of a complex signal as follows:

$$= \text{Re}[\alpha e^{j\omega_c t}]$$

Therefore, $\alpha$ may be viewed as a complex (DC, in this case) modulating signal with a carrier frequency of $\omega_c$, in which case the (constant) function $\psi$ given by $\psi(t) = \alpha$ may be identified as corresponding to the quantum state $|\psi\rangle$. Given a zero-qubit signal s, the corresponding zero-qubit state $\psi$ may be obtained by using the above time-averaging procedure to obtain the real and imaginary parts of $\psi$. Similarly, given the state $\psi$, the corresponding signal s may be obtained by modulating the in-phase and quadrature components of a carrier signal of frequency $\omega_c$.

To define an inner product, it is worth noting that a time average of $s(t)^2$ over $t \in [0, T]$ yields the following:

$$\frac{1}{T}\int_0^T s(t)^2 dt = \frac{a^2}{2} + \frac{b^2}{2} = \frac{|\alpha|^2}{2} = \frac{\langle\psi|\psi\rangle}{2}$$

More generally, for a second signal of the form $r(t) = \text{Re}[\phi(t)e^{j\omega_c t}]$, where $\phi(t) = \beta \in \mathbb{C}$, the following may be defined:

$$\langle \phi|\psi\rangle = \frac{1}{T}\int_0^T \phi(t)^* \psi(t) dt = \beta^* \alpha.$$

This may complete the Hilbert space description of this simple, one-dimensional space. It is worth noting that the zero-qubit signals considered here are often used as an encoding scheme in digital communications, with each value of $\alpha$ representing a different binary sequence. For example, a typical 64-QAM Ethernet protocol uses 64 different combinations of phases and amplitudes to represent a string of 6 (classical) bits. In what follows, quite a different approach may be taken to encoding information, e.g., using a nested sequence of modulating signals to represent a single n-qubit state in terms of its $2^n$ complex amplitudes. For this reason, the term quadrature modulated tonals (QMT) may be used herein to refer to this sort of representation.

For the in-phase and quadrature components of a complex basebanded signal, it is convenient to use complex exponentials rather than sines and cosines. For example, for a Hilbert space of one qubit, a general pure quantum state $|\psi\rangle = \alpha_0|0\rangle + \alpha_1|1\rangle$ may be represented mathematically by a pair of complex numbers $\alpha_0 = a_0 + jb_0$ and $\alpha_1 = a_1 + jb_1$. The corresponding real signal may defined as $s(t) = \text{Re}[\psi(t)e^{j\omega_c t}]$, where $\psi$ represents the complex, basebanded, time-domain signal defined by $$\psi(t) = \alpha_0 e^{j\omega_0 t} + \alpha_1 e^{-j\omega_0 t}, \quad (10)$$

In this example, $\omega_0 < \omega_c$. The functions $\phi_0^{\omega_0}$ and $\phi_1^{\omega_0}$ are the in-phase and quadrature signals, respectfully. These signals, defined by $\phi_0^{\omega_0}(t) = e^{j\omega_0 t}$ and $\phi_0^{\omega_0}(t) = e^{-j\omega_0 t}$, are used to represent the computational basis functions (basis states) $|0\rangle$ and $|0\rangle$, respectively. Other choices of basis states are possible.

In this way, it can be seen that the real and imaginary parts of $\psi$ may serve as the in-phase and quadrature components modulating the carrier signal. Physically, these complex signals may be represented by two distinct real signals, each representing the real and imaginary parts of the complex, basebanded signal. For n qubits, the basis state $|x\rangle$ may be represented by the basis signal $\phi_x$ composed of a product of n single-qubit signals as follows:

$$\phi_x(t) = \phi_{xn-1}^{\omega n-1}(t) \ldots \phi_{x1}^{\omega 1}(t) \cdot \phi_{xu}^{\omega u}(t)$$

Figure 6:
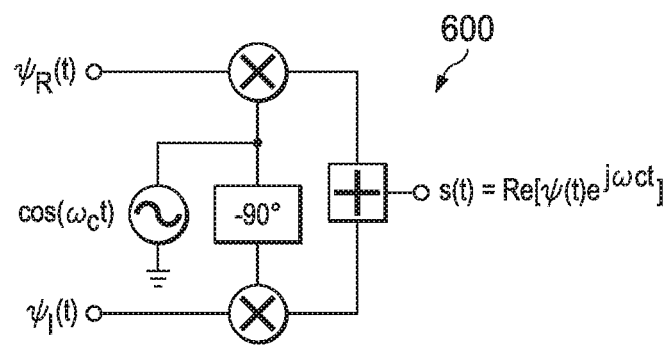
FIG. 6 illustrates an example circuit schematic for implementing a signal modulation device, according to one embodiment.

In this example, $\phi_0^{\omega i}(t)$ and $\phi_1^{\omega i}(t)$ are defined above. Note that the spectrum of $\phi_x$ will therefore consist of the $2^n$ sums and differences of the n component frequencies. A representative circuit schematic of this process is shown in FIG. 6. Specifically, FIG. 6 illustrates an example circuit schematic for implementing a signal modulation device, according to one embodiment. In this example, signal modulation device 600 includes circuitry to modulate (Mod) a carrier signal, s(t), by a complex basebanded signal, $\psi(t) = \psi_R(t) + j\psi_I(t)$. In at least some embodiments, the signal modulation device 600 may be employed in a quantum computing emulation device to produce s(t) from $\psi(t) = \psi_R(t) + j\psi_I(t)$.

The mapping from $\psi$ to s can be reversed through a process of demodulation. As in the zero-qubit case, this may be accomplished by alternately multiplying s(t) by the in-phase, $\cos \omega_c t$, and quadrature, $-\sin \omega_c t$, signals and then low-pass filtering. The result is as follows:

$$\frac{1}{T}\int_{t-T}^{t} 2\cos(\omega_c t')s(t')dt = \psi_R(t),$$

$$\frac{1}{T}\int_{t-T}^{t} -2\sin(\omega_c t')s(t')dt = \psi_I(t)$$

Figure 7:
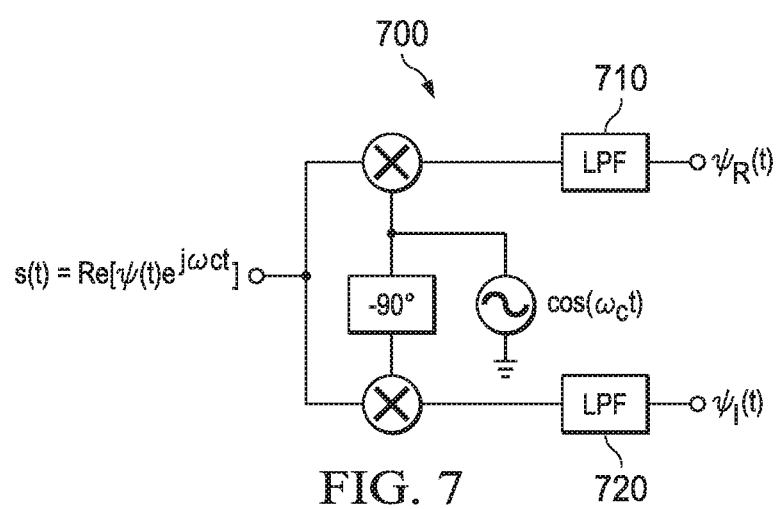
FIG. 7 illustrates an example circuit schematic for implementing a signal demodulation device, according to one embodiment.

A representative circuit schematic of this process is shown in FIG. 7. Specifically, FIG. 7 illustrates an example circuit schematic for implementing a signal demodulation device, according to one embodiment. In this example, signal demodulation device 700 includes circuitry to demodulate (Dem) a real signal, s(t), into its corresponding real, $\psi_R(t)$, and imaginary, $\psi_I(t)$, components. In at least some embodiments, the signal demodulation device 700, which includes two low-pass filters (shown as LPF 710 and LPF 720) may be employed in a quantum computing emulation device to produce $\psi(t)=\psi_R(t)+j\psi_I(t)$ from s(t). Note that because the mapping from $\psi$ to s is reversible, the following discussion focuses on the former.

As noted in the previous discussion, to complete the Hilbert space description of this one-qubit representation, an inner product may be defined. For example, let $\psi$ be defined as before and let $\phi$ be an arbitrary one-qubit state of the form $$\phi(t)=\beta_0\phi_0^\omega(t)+\beta_1\phi_1^\omega(t)$$

This corresponds to the quantum state $|\phi\rangle=\beta_0|0\rangle+\beta_1|1\rangle$. The inner product $\langle\phi|\psi\rangle$ between the two is again defined to be the time average over the period T, where T is a multiple of the period $2\pi/\omega_0$ of the signal. $T\in(2\pi/\omega)\mathbb{N}$:

$$\langle\phi|\psi\rangle = \frac{1}{T}\int_0^T \phi(t)*\psi(t)dt$$

Figure 8:
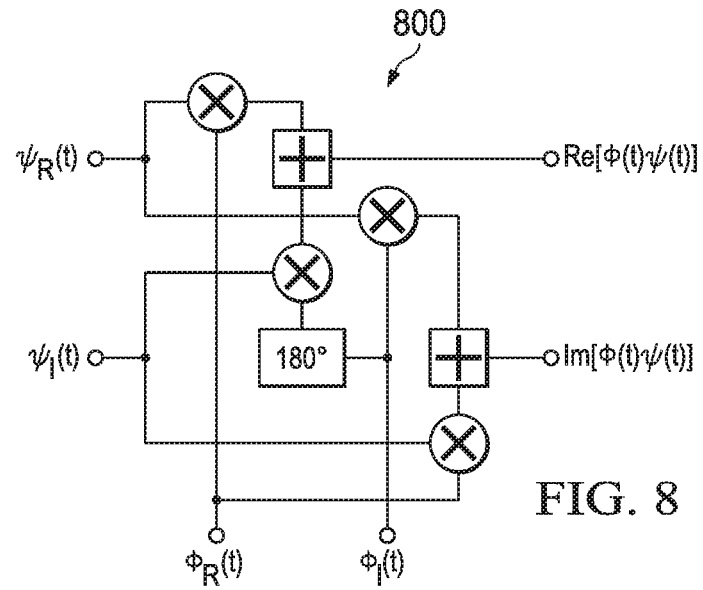
FIG. 8 illustrates an example circuit schematic for implementing complex product calculation device, according to one embodiment.

A representative circuit schematic implementing a complex product function is shown in FIG. 8. Specifically, FIG. 8 illustrates an example circuit schematic for implementing a complex product calculation device, according to one embodiment. In at least some embodiments, a complex product calculation device takes two complex signals, which are represented by pairs of real signals, as inputs, and it outputs another complex signal representing their product. In this example, a complex product calculation device 800 includes circuitry to perform calculating the complex product (Prod) of two complex signals, represented by $\psi(t)$ and $\phi(t)$, in terms of their corresponding real and imaginary components. In at least some embodiments, inner product calculation device 800 may be employed in a quantum computing emulation device to produce $\psi(t)\phi(t)$ from $\psi(t)$ and $\phi(t)$.

In this example, complex product calculation device 800 includes three four-quadrant multipliers, two operational amplifiers (op-amps) serving as adders, and one op-amp serving as an inverter. In this example, quantum states are represented as complex numbers (or complex functions). More specifically a quantum state is represented by two individual signals, one representing the real part and one representing the imaginary part of a complex signal. As described in more detail herein, multiplying two such signals together may include taking two pairs of signals, and breaking the operation down so that includes multiplying together pairs of real signals and then adding pairs of real signals, and so forth. As illustrated in FIG. 8A, two pairs of signals are input to the complex product calculation device 800, and a single pair of signals is output from the complex product calculation device 800. In various embodiments, the low-level multiplication and summation operations may be performed by circuitry within complex product calculation device 800, such as by individual integrated circuit components.

In the example illustrated in FIG. 8A, the real and imaginary parts of the complex signal may be kept separate. In another embodiment, a single signal by be used to represent the quantum state. In such an embodiment the phase of the signal may be measured prior to performing any processing on the signal and then the signal may be put back together in its new phase. In this example, in order to operate an individual qubits, phase detections may be performed to pull out phases representing those qubits. This may involve a lot of DC computation, in which case the circuitry may should be precise enough to handle DC offset, drift, and/or other potential complications.

In some embodiments, such as in a larger scale system that supports operations on a larger number of qubits, the quantum state may still be represented by a single pair of signals that represents all of the qubits. For example, the real part of the complex signal for the quantum state (for all of the qubits) may collectively be represented by one signal and the imaginary part of the complex signal for the quantum state (for all of the qubits) may collectively be represented by another signal.

In some embodiments, the inner product may be formed by first applying a complex conjugate (Conj) operation to $\phi$ (i.e., inverting $\phi_1$) before multiplying it by $\psi$, then passing the resultant real and imaginary parts through low-pass filters. Performing this integration, it can be verified that $$\langle\phi|\psi\rangle=\beta_0^*\alpha_0+\beta_1^*\alpha_1.$$

Therefore, the definition produces the correct result. Note that the inner product corresponds to a low-pass filter, and that $\langle\phi_x|\psi\rangle=\alpha_x$ represents a pair of DC values giving the components of the quantum state for the $|x\rangle$ basis state.

Figure 9:
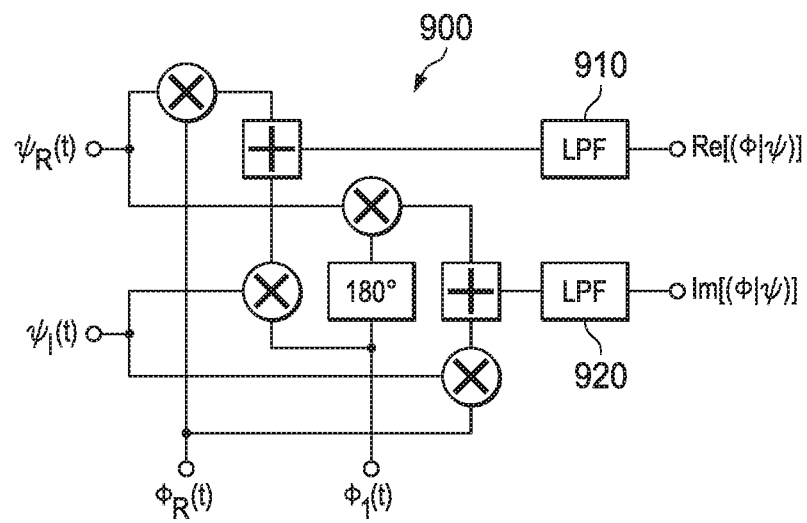
FIG. 9 illustrates an example circuit schematic for implementing an inner product calculation device, according to another embodiment.

A representative circuit schematic implementing the inner product function is shown in FIG. 9. Specifically, FIG. 9 illustrates an example circuit schematic for implementing an inner product calculation device, according to another embodiment. In contrast to the complex product calculation device illustrated in FIG. 8, this circuit produces a pair of DC voltages as an output. In this example, an inner product calculation device 900 includes circuitry to perform calculating the inner product of two complex signals, represented by $\psi(t)$ and $\phi(t)$, in terms of their corresponding real and imaginary components. In at least some embodiments, inner product calculation device 900 may be employed in a quantum computing emulation device to produce $\langle\phi|\psi\rangle$ from inputs $|\psi\rangle$ and $|\phi\rangle$. In this example, inner product calculation device 900 includes four four-quadrant multipliers, two operational amplifiers (op-amps) serving as adders, one op-amp serving as an inverter, and two low-pass filters LPF (shown as LPF 910 and LPF 920).

The definition described above makes it possible to identify $\langle\phi|$ the dual of $\langle\phi|$, as the functional which maps a complex basebanded signal $\psi$ to the corresponding inner product $\langle\phi|\psi\rangle$. From the definition of the inner product, it can also be seen that the one-qubit computational basis states $\phi_0^\omega$ and $\phi_1^\omega$ are orthonormal. This allows the components of the state to be extracted by performing a time average, due to the following:

$$\langle\phi_0^\omega|\rangle=\langle 0|\psi\rangle=\alpha_0,$$

$$\langle\phi_1^\omega|\rangle=\langle 1|\psi\rangle=\alpha_1,$$

This analysis procedure may be complemented by one of synthesis, in which the state ψ may be constructed from the components $\alpha_0$ and $\alpha_1$ by multiplying each by the corresponding basis state and summing the two resulting signals.

For a four-dimensional Hilbert space representing two qubits (A and B), a general pure quantum state may be represented mathematically by four complex numbers as follows:

$$|\psi\rangle = \alpha_{00}|00\rangle + \alpha_{01}|01\rangle + \alpha_{10}|10\rangle + \alpha_{11}|11\rangle. \quad (11)$$

The corresponding real signal may defined as $s(t)=\text{Re}[\psi(t)e^{j\omega_c t}]$, where ψ represents the complex, basebanded, time-domain signal defined by $$\psi(t) = e^{j\omega_A t}[\alpha_{00}e^{j\omega_B t} + \alpha_{01}e^{j\omega_B t}] + e^{jw_A t}[\alpha_{10}e^{j\omega_B t} + \alpha_{11}e^{j\omega_B t}]$$

In this example, $\omega_A > \omega_B$, and it is assumed that the carrier frequency is sufficiently large so that $\omega_A + \omega_B < \omega_c$.

Much as before, the following are defined: $\phi_0^{\omega_A}(t) = e^{j\omega_A t}$ and $\phi_1^{\omega_A}(t) = e^{-j\omega_A t}$. In addition, the basis functions $\phi_0^{\omega_A}$ and $\phi_1^{\omega_A}$ may be identified with the qubit states $|0\rangle_A$ and $|1\rangle_A$, respectively. Similarly, the basis functions $\phi_0^{\omega_B}$ and $\phi_1^{\omega_B}$ may be identified with the computational basis states $|0\rangle_B$ and $|1\rangle_B$, respectively. Finally, the function product $\phi_0^{\omega_A} \cdot \phi_1^{\omega_B} = \phi_1^{\omega_B} \cdot \phi_0^{\omega_A}$ say, may be identified with the tensor product $|0\rangle_A \otimes |1\rangle_B = |1\rangle_B \otimes |0\rangle_A = |01\rangle$.

Note that, unlike the Kronecker product between two matrices, the function product between qubits is commutative. Thus, the complex basebanded signal ψ may be identified with the two-qubit quantum state $|\psi\rangle$.

Note that the signal ψ consists of four distinct frequencies (1) $\omega_A + \omega_B > 0$, corresponding to $\alpha_{00}$, (2) $\omega_A - \omega_B > 0$ corresponding to $\alpha_{01}$, (3) $-\omega_A + \omega_B < 0$, corresponding to $\alpha_{10}$, and (4) $-\omega_A - \omega_B < 0$, corresponding to $\alpha_{11}$. The modulated signal given by $s(t) = \text{Re}[\psi(t)e^{j\omega_c t}]$ consists of these four frequencies shifted to the right by $+\omega_c$ and to the left by $-\omega_c$. Thus, s consists of eight frequencies in all, ranging from $-\omega_c - \omega_A - \omega_B$ to $\omega_c + \omega_A + \omega_B$, four of which are positive and four of which are negative, as befits a real signal.

Given the set of four complex numbers $\alpha_{00}, \ldots, \alpha_{11}$, the two-qubit signal s may be produced by first constructing the real and imaginary parts, $\psi_R$ and $\psi_I$ respectively, of ψ. As before, s may be produced by using $\psi_R$ as the in-phase signal and $\psi_I$ as the quadrature signal for a carrier of frequency $\omega_c$, to wit:

$$s(t) = \psi_R(t)\cos(\omega_c t) - \psi_I(t)\sin(\omega_c t),$$

This approach may be generalized to n qubits as follows. Let $x \in \{0, 1, \ldots, 2^n-1\}$ and define $\phi_x$ as the function product such that $$\phi_x(t) = \phi_{x_{n-1}}^{\omega_{n-1}}(t) \cdots \phi_{x_1}^{\omega_1}(t) \cdot \phi_{x_0}^{\omega_0}(t).$$

Here, $\phi_0^{\omega_k}(t) = e^{j\omega_k t}$, $\phi_1^{\omega_k}(t) = e^{-jw_k t}$, and $x_0, \ldots, x_{n-1}$ are the binary digits of x. By convention, it is assumed that $0 < \omega_0 < \ldots < \omega_{n-1}$. The n-qubit signal can now be written in the form $s(t) = \text{RE}[\psi(t)e^{-i\omega_c t}]$, where $\omega_{n-1} + \ldots \omega_0 < \omega_c$ and $$\psi(t) = \sum_{x=0}^{2^n-1} \alpha_x \phi_x(t).$$

For two such signals φ and ψ, the inner product is defined, as before, to be as follows:

$$\langle \phi | \psi \rangle = \frac{1}{T} \int_0^T \phi(t) * \psi(t) dt$$

Here, the time average is over a multiple of the period T (where T is a multiple of the period $2\pi/\omega_0$ of the signal) of the lowest frequency qubit. This completes the Hilbert space description.

To represent s, n+1 frequencies may be used, including one for each of the n qubits plus a carrier frequency $\omega_c$. The product of these n+1 frequencies in s will have spectral components at the sums and differences of these frequencies. This can be achieved most easily by taking $\omega_i = 2^i \Delta\omega$ and $\omega_c = \omega_b + 2^n \Delta\omega$, where $\Delta\omega > 0$ and $\omega_b \geq 0$ is some baseband offset. This may be referred to as the octave spacing scheme. Using this approach, the positive frequencies of s will therefore range from $\omega_{min} = \omega_c - (\omega_{n-1} + \ldots + \omega_0) = \omega_b + 2^n \Delta\omega - (2^n-1)\Delta\omega = \omega_b + \Delta\omega$ to $\omega_{max} = \omega_c + (\omega_{n-1} + \ldots + \omega_0) = \omega_b (2^{n+1} - 1)\Delta\omega$, in increments of $2\Delta\omega$, so there will be $2^n$ different (positive) frequencies in all. The ordering of the frequencies is such that the complex coefficient $\alpha_x$ is encoded in the frequencies $\pm\omega_c + \Omega_x$, where $\Omega_x = (2^n - 1 - 2x)\Delta\omega$ for $x \in \{0, \ldots, 2^n - 1\}$.

In the octave spacing scheme, each qubit corresponds to one of n frequencies, while each basis state corresponds to one of $2^n$ frequencies. Here, $\omega_i$ may be referred to as the qubit frequency for qubit i and $\Omega_x$ may be referred to as the basis frequency for basis state $|x\rangle$. To synthesize a quantum state ψ, then, one may explicitly define each of the $2^n$ complex components, multiply this by the corresponding basis states, and sum the resulting products. Likewise, to analyze a given quantum state ψ, one may multiply by each of the $2^n$ basis states, compute the inner product by time averaging, and thereby obtain the corresponding complex component. In some embodiments, using such a procedure, one may manipulate and transform the quantum state via any desired transformation, unitary or otherwise. Such a 'brute force' approach to implementing gate operations may not very efficient, however. A different and more effective strategy for addressing and manipulating individual qubits or pairs of qubits is described below.

In a digital computer, the state of the computer is given by a sequence of binary values. In a quantum computer, the state of the system may be represented by a superposition of all binary states. Thus, a collection of basis states may represent each of the individual binary strings, and the full quantum state may be represented by a sum over those basis states in accordance with a collection of complex coefficients. In at least some embodiments of the present disclosure, the basis states may be constructed such that the phase between all of the signals (all of the components) is maintained coherently. For example, in some embodiments, the basis states may be constructed using a single reference oscillator in to maintain phase coherence. After creating the basis states (which is a collection of frequencies that do not contain any information about the quantum state of the system), generating the initial quantum state may be thought of as encoding the information that defines the initial quantum state into the signal.

Figure 10:
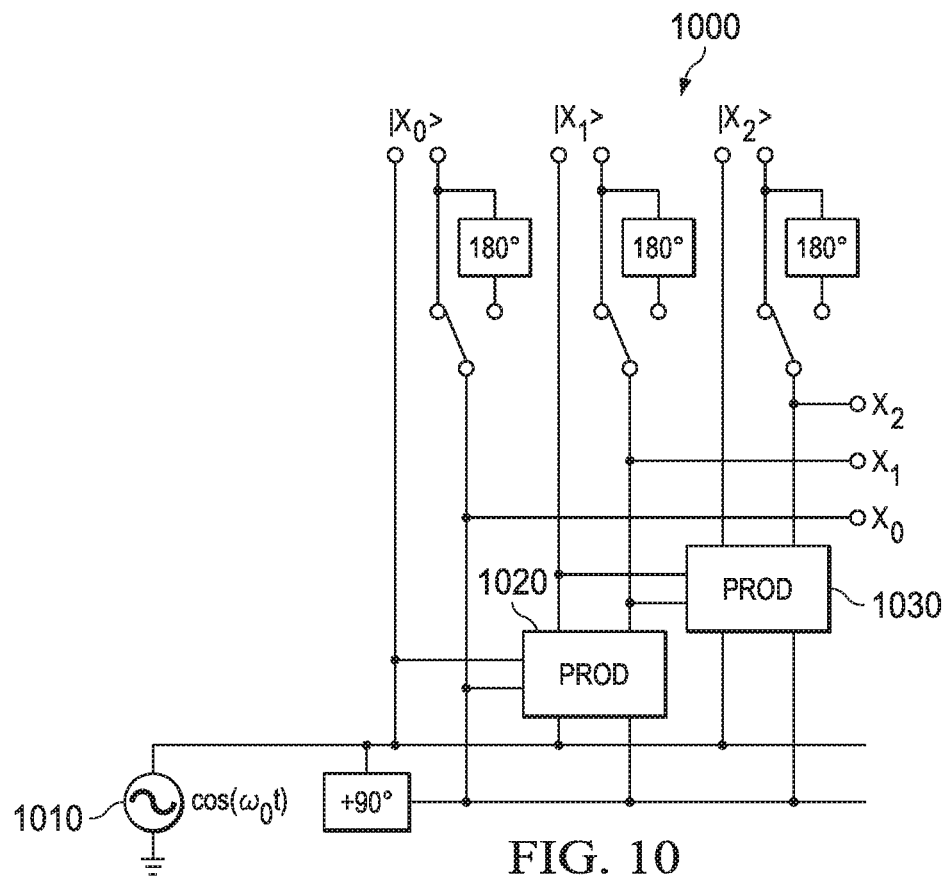
FIG. 10 illustrates an example circuit schematic for implementing a Basis generation device, according to one embodiment.

FIG. 10 illustrates an example circuit schematic for implementing a Basis component, such as one of the Basis components illustrated in FIG. 13 and described below. Specifically, FIG. 10 illustrates a schematic for one embodiment of a device 1000 that includes circuitry to generate a computational basis state corresponding to the binary indexing parameters $x_0, x_1, x_2, \ldots, x_{n-1}$, where n is the number of qubits and $x_i \in \{0, 1\}$ for $i \in \{0, \ldots, n-1\}$. In at least some embodiments, basis state generation device 1000 may be employed in a quantum computing emulation device to produce basis states $|x_2 x_1 x_0\rangle$ from the binary values $x_0, x_1, x_2$. In this example, basis state generation device 1000 includes a signal generator 1010 from which phase-coherent basis signals are derived, three op-amps that serve as inverters, one op-amp that serves as a 90° phase shifter, and two inner product calculation components (shown as Prod 1020 and Prod 1030).

Figure 11:
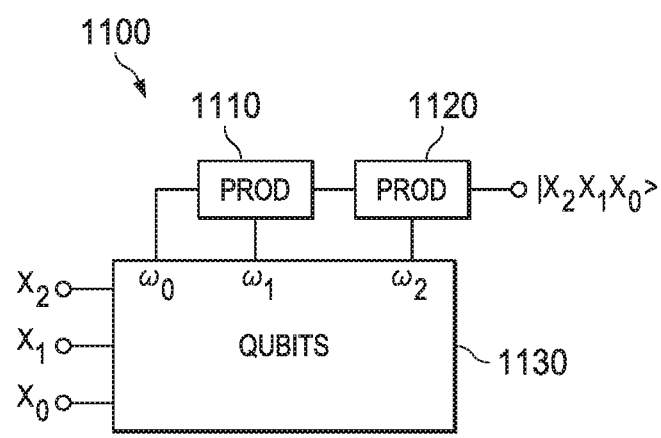
FIG. 11 illustrates an example circuit schematic for implementing a qubit generation device, according to one embodiment.
Figure 12A:
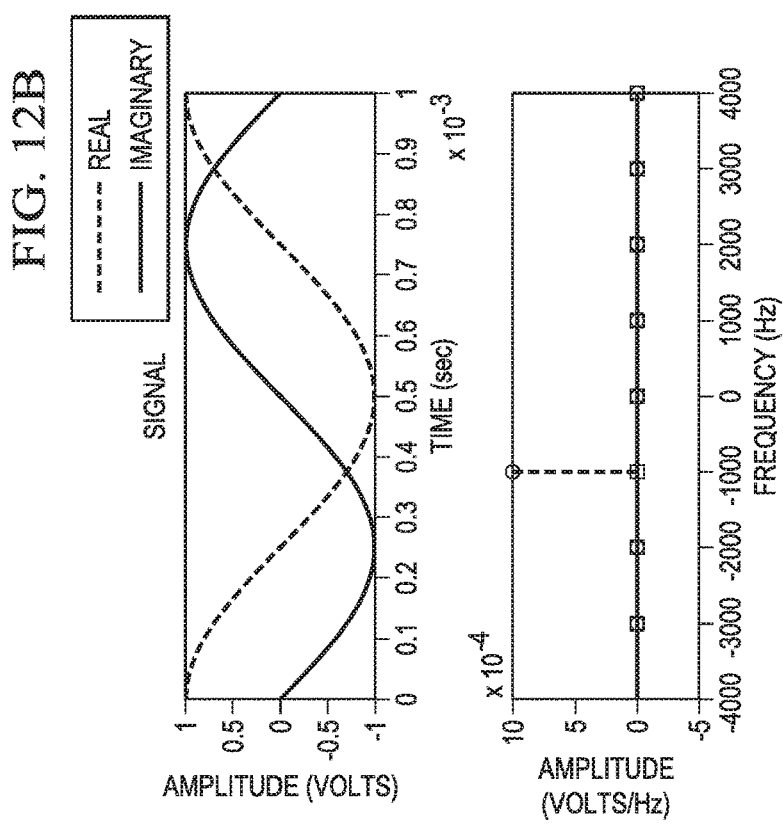
Figure 12B:
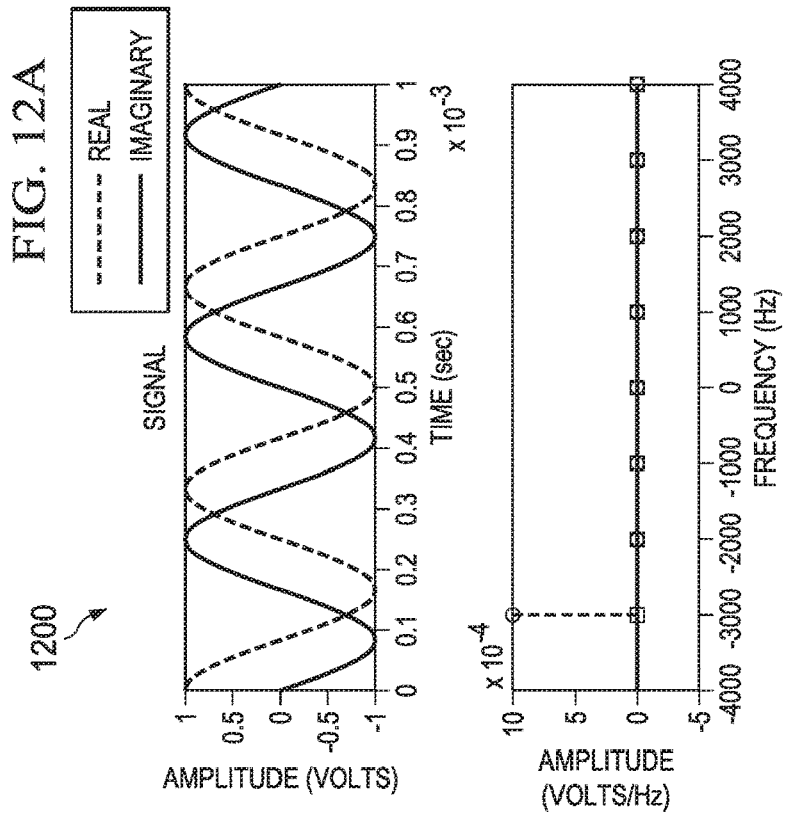

FIG. 11 illustrates an example circuit schematic for implementing a Qubits component. Specifically, FIG. 11 is a schematic of one embodiment of a qubit generation device 1100 for generating individual qubits, where each qubit corresponds to a pair of signals representing the real and imaginary components of a complex signal. In at least some embodiments, qubit generation device 1100 may be employed in a quantum computing emulation device to produce the individual qubit signals $|x_0\rangle$, $|x_1\rangle$, $|x_2\rangle$ from the binary values $x_0$, $x_1$, $x_2$. In this example, qubit generation device 1100 includes two inner product calculation components (shown as Prod 1110 and Prod 1120), along with additional qubit generation circuitry shown as qubits circuitry 1130.

FIGS. 12A-12D illustrate an example of the generation of basis states, as described herein. More specifically, FIGS. 12A-12D illustrate the generation of basis states at 1 and 2 kHz by a quantum computing emulation device such as those described herein. In this example, graphs 1200A-1200D illustrate ideal basis states corresponding to basis states $|11\rangle$, $|10\rangle$, $|01\rangle$, $|00\rangle$, respectively. In one experiment, graphs depicting the actual basis states corresponding to basis states $|11\rangle$, $|10\rangle$, $|01\rangle$, $|00\rangle$, respectively, that were generated by the quantum computing emulation device were nearly identical to graphs 1200A-1200D. This experiment illustrated that, in at least some embodiments, the basis functions may have very little contamination (<30 dB).

Figure 13:
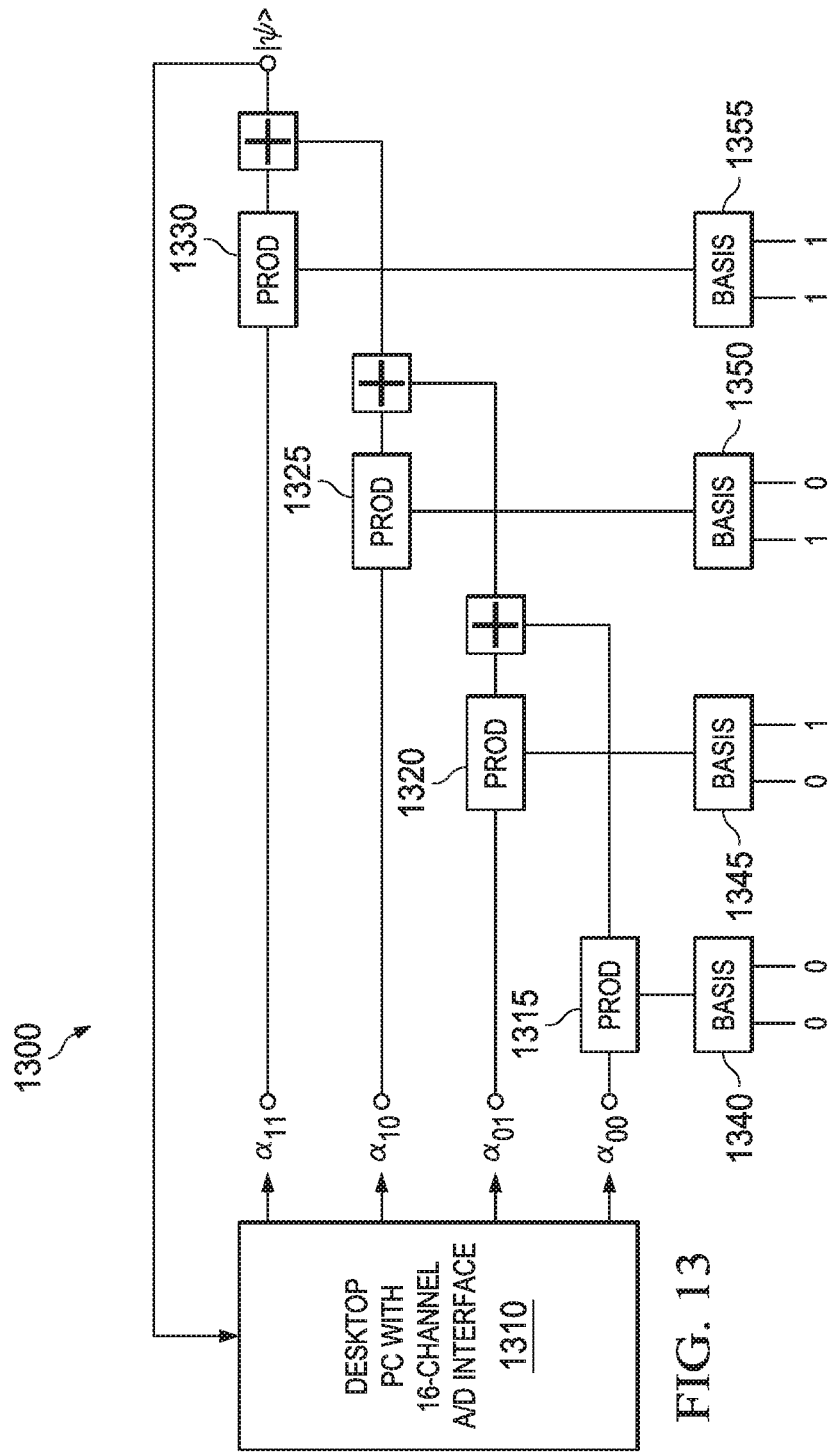
FIG. 13 illustrates an example circuit schematic for a quantum state synthesis device, according to one embodiment.

FIG. 13 illustrates an example circuit schematic for a device that synthesizes a quantum state. Specifically, FIG. 13 is a schematic of one embodiment of a quantum state synthesis device 1300 that includes circuitry to synthesize a quantum state from complex components with respect to a computational basis. In the example illustrated in FIG. 13, thick lines correspond to complex signals, while thin lines represent real signals. In this example, complex signals may be represented by separate real and imaginary components of a complex signal. Complex signals may also be represented by modulation of a carrier signal. In at least some embodiments, quantum state synthesis device 1300 may be employed in a quantum computing emulation device to produce an initial quantum state $|\psi\rangle$ from a set of complex coefficients $\alpha$. In the example illustrated in FIG. 13, quantum state synthesis device 1300 includes (or is communicatively coupled to) a desktop computer 1310 that includes a 16-channel A/D interface. In this example, complex coefficients that define the initial quantum state may be input using the desktop computer 1310. Quantum state synthesis device 1300 also includes four inner product calculation components (shown as Prod components 1315, 1320, 1325 and 1330), four basis state generation device components (shown as Basis components 1340, 1345, 1350, 1355), and three op-amps that serve as adders. In this example, the synthesized quantum state $|\psi\rangle$ (shown as an output of quantum state synthesis device 1300) may be fed back to desktop computer 1310 (as shown) and/or provided to a programmable gate component.

The example quantum state synthesis device 1300 illustrated in FIG. 13 may be used to synthesize an initial quantum state in a two-qubit system. In such a system, there are four different basis states. The synthesized quantum state is a combination of those four basis states, where the particular combination is defined by a collection of four pairs of DC values that are specified by inputs to the desktop computer. In some embodiments, the problems to be solved (or the algorithms to apply in solving the problems) using the quantum computing emulation device may be of a type in which, once the system is initialized to a specified quantum state, the device would perform a specified sequence of gate operation to solve the problem (e.g., to apply the algorithm defined by the sequence of gate operations).

Figure 14A:
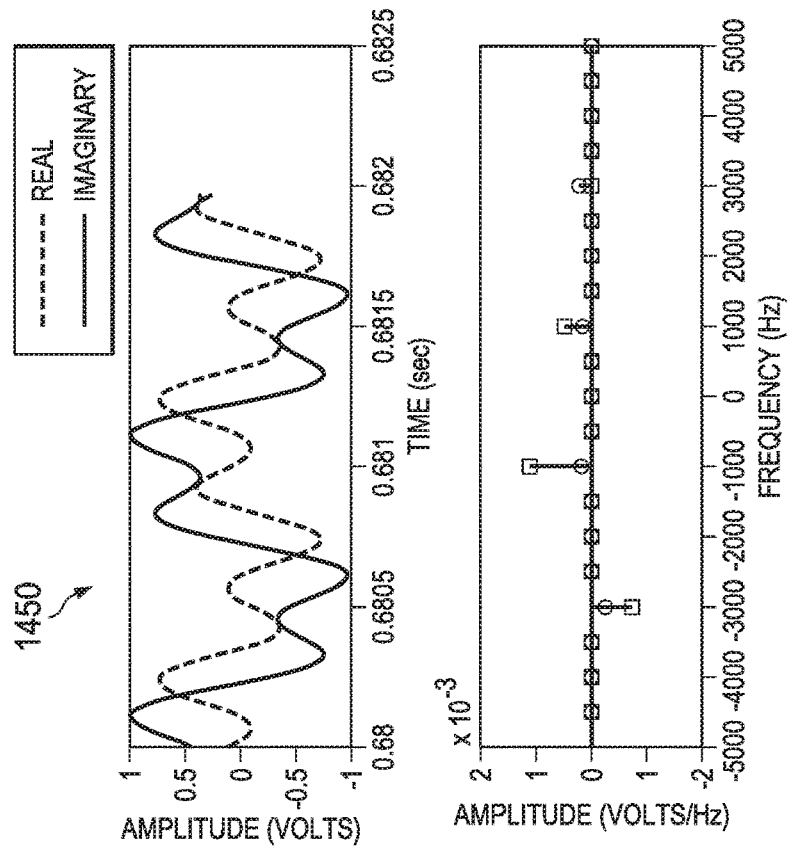
FIGS. 14A and 14B illustrate an example of the synthesis of a two-qubit quantum state, according to one embodiment.
Figure 14B:
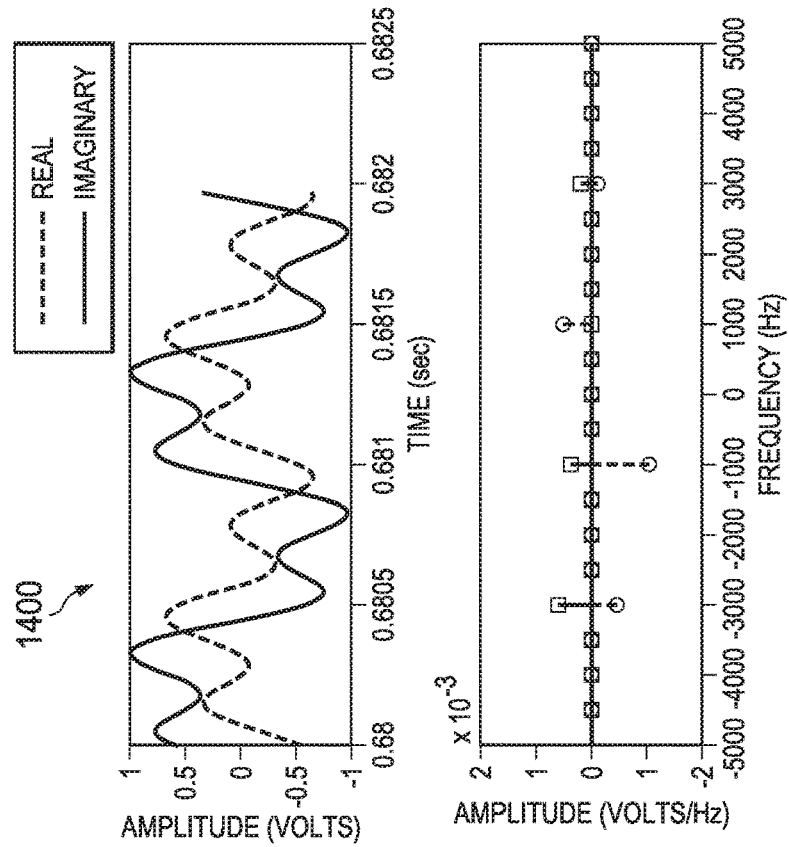

FIGS. 14A and 14B illustrate an example of the synthesis of a two-qubit quantum state, as described herein. More specifically, these figures illustrate the generation of a pair of signals in which information defining the two-qubit quantum state is encoded in the frequency content of the signals by a quantum computing emulation device such as those described herein. In this example, the quantum state is defined by the following collection of complex coefficients:

$$\alpha_{11}=-0.3024+0.3644i, \alpha_{10}=-0.6613+0.2081i,$$

$$\alpha_{01}=+0.3097-0.0325i, \alpha_{00}=-0.0512+0.1095i.$$

Graph 1400 in FIG. 14A illustrates an ideal pair of signals (corresponding to the real and imaginary portions of a complex signal) to represent the quantum state defined by this collection of complex coefficients. Graph 1450 in FIG. 14B illustrates the actual pair of signals produced by the quantum computing emulation device to represent the quantum state defined by this collection of complex coefficients. As illustrated in this example, in at least some embodiments of the quantum computing emulation devices, the ideal and actual signals may differ only by an unimportant phase, with the median fidelity being about 90%.

Figure 15:
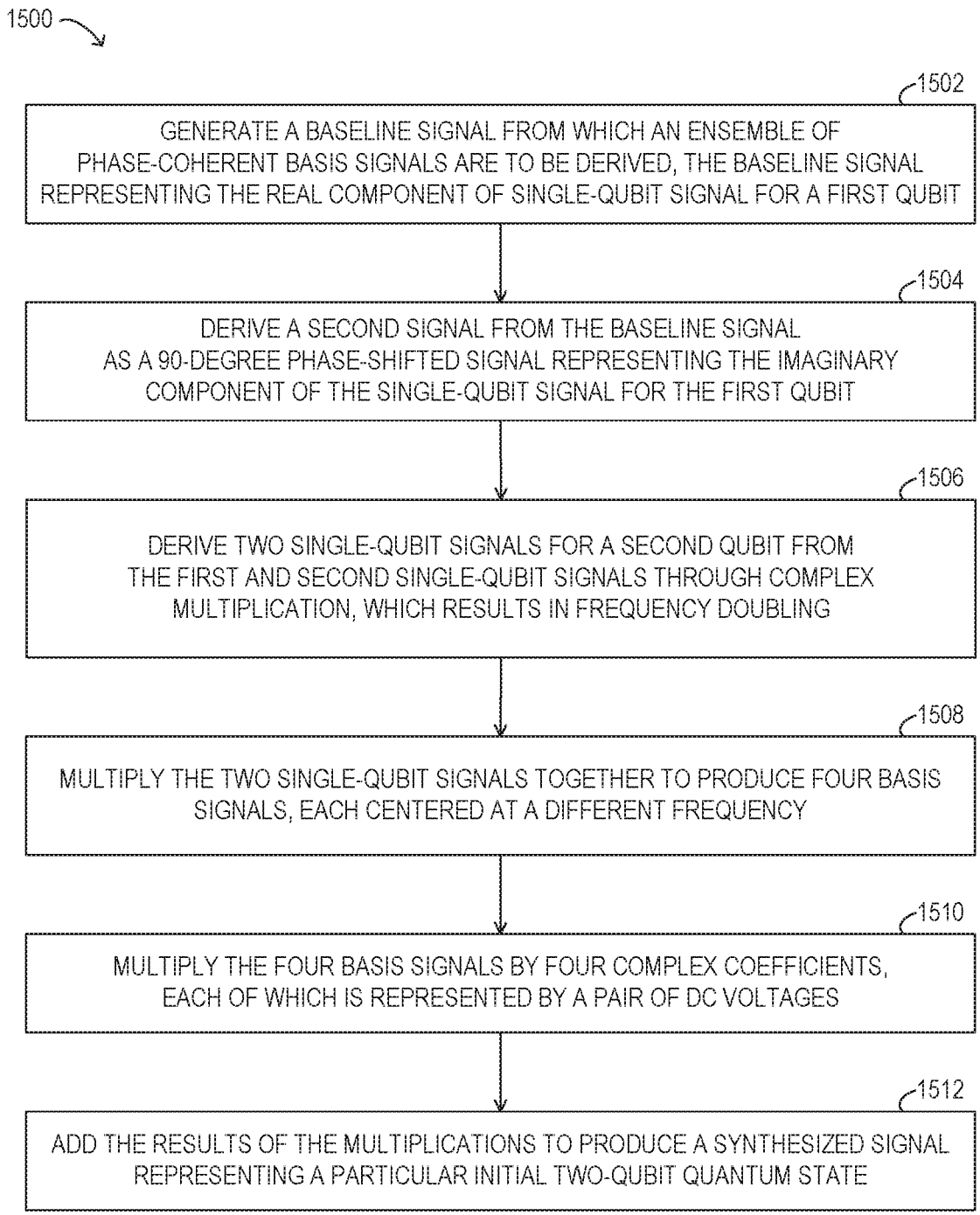
FIG. 15 illustrates an example method for generating signals representing an initial quantum state in a quantum computing emulation device, according to one embodiment.

FIG. 15 illustrates an example method 1500 for generating signals representing an initial quantum state in a quantum computing emulation device, according to one embodiment. As illustrated in this example, the method may include generating a baseline signal from which an ensemble of phase-coherent basis signals are to be derived, as in 1502. In this example, the baseline signal may represent the real component of single-qubit signal for a first qubit. The method may include (at 1504) deriving a second signal from the baseline signal as a 90-degree phase-shifted signal representing the imaginary component of the single-qubit signal for the first qubit. As illustrated at 1506 in FIG. 15, the method may include deriving two single-qubit signals for a second qubit from the first and second single-qubit signals through complex multiplication, which results in frequency doubling.

As illustrated in this example, the method may include multiplying the two single-qubit signals together to produce four basis signals, each centered at a different frequency (as in 1508). The method may include multiplying the four basis signals by four complex coefficients, each of which is represented by a pair of dc voltages (as in 1510). The method may also include adding the results of the multiplications together to produce a synthesized signal representing a particular initial two-qubit quantum state (as in 1512). In at least some embodiments, all or a portion of method 1500 may be implemented by circuitry within a quantum computing emulation device.

In another embodiment (e.g., in a system in which the state includes a large number of qubits), the initial quantum state may be created in other ways. For example, in one embodiment, an initial quantum state may be created by performing an inverse Fast Fourier Transform (FFT). In this example, after providing data containing phase information for the respective elements, which are primarily 1s and 0s, and an inverse FFT may be performed (e.g., by optical processing or another mechanism) to create the ensemble of signals for the initial quantum state.

A basic step in quantum computation is the application of unitary or measurement gates to one or more specific qubits. A quantum gate may be represented mathematically by a transformation on elements of a Hilbert space $\mathcal{H}$. The transformation may be linear and, in particular, unitary, while nonlinear transformations may also be possible. The application of a quantum gate upon the current quantum state of a quantum computing system may produce a new quantum state in the corresponding physical system. When the quantum state is represented by certain components with respect to the computational basis, then the quantum gate may be represented by a matrix acting on a vector including the components. Quantum gates may act upon one or more qubits, and may leave the remaining qubits unchanged. A one-qubit gate acts upon one qubit at a time, a two-qubit gate acts upon two-qubits at a time, and so on. Because a general result from the theory of quantum computing states that a Universal Quantum Computer may be constructed from a set of one-qubit and two-qubit gates, the practical realization of one-qubit and two-qubit gates, as disclosed herein, may represent a significant advancement in the art of quantum computing.

In at least some embodiments of the present disclosure, projection operators may be used to divide the quantum state into projections onto the relevant subspaces corresponding to the qubit(s) being addressed (i.e., the qubits on which the gate operation is to be performed). A projection operator may be thought of as a type of gate in which an output state may be represented by an element of a lower-dimensional Hilbert space than an input state. Quantum gates may use projection operators to address individual qubits. A single qubit may be addressed by applying a pair of projection operators mapping an n-qubit state to an (n−1)-qubit state and corresponding to the particular qubit to be addressed. For a general, n-qubit quantum state of the form $$|\psi\rangle = \sum_{x=0}^{2^n-1} \alpha_x |x\rangle,$$

the projection operators for addressing qubit i may be defined as follows:

$$\prod_0^{(i)} |\psi\rangle = \sum_{x:x_i=0} \alpha_x |x_{n-1} \ldots x_{i+1} \ldots 0 x_{i-1} \ldots x_0\rangle = |0\rangle_i \otimes |\psi_0^{(i)}\rangle$$

$$\prod_1^{(i)} |\psi\rangle = \sum_{x:x_i=1} \alpha_x |x_{n-1} \ldots x_{i+1} \ldots 1 x_{i-1} \ldots x_0\rangle = |1\rangle_i \otimes |\psi_1^{(i)}\rangle.$$

Here, $|\psi_0^{(i)}\rangle$ and $|\psi_1^{(i)}\rangle$ represent (n−1)-qubit states. The four projection operators for addressing qubits i and j may be defined as follows:

$$\prod_{ba}^{(ji)} |\psi\rangle = \sum_{x:x_i=a, x_j=b} \alpha_x |x_{n-1} \ldots x_{j+1} \ldots b x_{j-1} \ldots x_{i+1} a x_{i-1} \ldots x_0\rangle$$

$$= |0\rangle_j \otimes |1\rangle_i \otimes |\psi_{ba}^{(ji)}\rangle.$$

Here, a, b ∈ {0, 1} and $|\psi_{ba}^{(ji)}\rangle$ represents an (n−2)-qubit state.

The action of a projection operator on qubit i may be achieved by constructing from ψ the signals $\psi_0^{(i)}$ and $\psi_1^{(i)}$ corresponding to the quantum states $|\psi_0^{(i)}\rangle$ and $|\psi_1^{(i)}\rangle$. The corresponding projections may then be represented by $e^{j\omega_i t}\psi_0^{(i)}(t)$ and $e^{-j\omega_i t}\psi_1^{(i)}(t)$, respectively. This may be achieved in the following manner: Given an n-qubit state $|\psi\rangle$, multiply the corresponding signal ψ(t) by either $\phi_0^{\omega_i}(t)^* = e^{-jw_i t}$, to construct $\psi_0^{(i)}(t)$, or by $\phi_1^{\omega_i}(t)^* = e^{j\omega_i t}$, to construct $\psi_1^{(i)}(t)$. For the former case, $$\phi_0^{\omega_i}(t) * \psi(t) = \sum_{x=0}^{2^n-1} \alpha_x e^{i(\Omega_x - \omega_i)t}$$

$$= \sum_{x:x_i=0} \alpha_x e^{i(\Omega_x - \omega_i)t} + \sum_{x:x_i=1} \alpha_x e^{i(\Omega_x - \omega_i)t}.$$

Here, $x_i$=mod [floor($x/2^i$), 2] may represent the value of bit i in the binary expansion $x = x_0 2^0 + \ldots + x_{n-1} 2^{n-1}$ and $\Omega_x$ may be defined as follows:

$$\Omega_x = (-1)^{x_{n-1}} \omega_{n-1} + \ldots + (-1)^{x_0} \omega_0.$$

To construct the signal $\psi_0^{(i)}(t)$, the $2^{n-1}$ frequencies of the form $\Omega_x - \omega_i$ corresponding to $x_i$=0 may be bandpass filtered or, equivalently, the $2^{n-1}$ frequencies $\Omega_x - \omega_i$ corresponding to $x_i$=1 may be bandstop filtered. In an octave spacing scheme, wherein $\omega_i = 2^i \Delta\omega$, the frequencies are $\Omega_x - \omega_i = (2^n - 2^i - 1 - 2x)\Delta\omega$ for x=0, . . . , $2^n - 1$, of which only those for which $x_i$=0 are bandpassed. Once bandpass filtering is done, the bandpassed signal, $\psi_0^{(i)}(t)$, may be multiplied by $e^{jw_i t}$ to obtain the result of the projection operator.

A similar procedure may be used to obtain $\psi_1^{(i)}(t)$ and its corresponding projection. In this case, ψ(t) is multiplied by $\phi_1^{(i)}(t)^* = e^{jw_i t}$ and the resulting signal is bandpass filtered to obtain $$\psi_1^{(i)}(t) = \sum_{x:x_i=1} \alpha_x e^{i(\Omega_x + \omega_i)t}.$$

To construct the signal $\psi_1^{(i)}(t)$, the frequencies $\Omega_x + \omega_i$ may be bandpass filtered such that $x_i$=1. These are, in fact, the same frequencies as $\Omega_x + \omega_i$ for $x_i$=0, so the same bandpass filter may be used. Thus, a total of n distinct bandpass filters may be used, each bandpass filter may be unique and specific to the corresponding qubit to be addressed.

To address two qubits, the following procedure may be used. For a state ψ(t) with n≥2 and i<j, $\psi_{ba}^{(ji)}(t)$ may be constructed by first multiplying ψ(t) by $\phi_b^{\omega_j}(t)^* \phi_a^{\omega_i}(t)^*$. This results in a signal with frequencies $\Omega_x - (-1)^b \omega_j - (-1)^a \omega_i$ for x=0, . . . , $2^n - 1$. For $x_i$=a and $x_j$=b, all components due to qubits i and j are to be removed using a bandpass filter. The following result is obtained:

$$\psi_{ba}^{(ji)}(t) = \sum_{x:x_i=a, x_j=b} \alpha_x \exp[i(\Omega_x - (-1)^b \omega_j - (-1)^a \omega_i)t].$$

The final result of the projection operator may be obtained by multiplying the equation above by the product signal $\phi_b^{\omega_j}(t) \phi_a^{\omega_i}(t)$. This approach may be generalized to address m out of n qubits, in some embodiments.

An additional discussion of general theory and notation for the emulation of a quantum computing system follows below. In general, in order to address qubit A, a general two-qubit state may be written as follows:

$$|\psi\rangle = |0\rangle_A \otimes [\alpha_{00}|0\rangle_B + \alpha_{01}|1\rangle_B] + |1\rangle_A \otimes [\alpha_{10}|0\rangle_B + \alpha_{11}|1\rangle_B]$$
$$= |0\rangle_A \otimes |\psi_0^{(A)}\rangle + |1\rangle_A \otimes |\psi_1^{(A)}\rangle.$$

Alternately, qubit B may be addressed as follows:

$$|\psi\rangle = |0\rangle_B \otimes [\alpha_{00}|0\rangle_A + \alpha_{10}|1\rangle_A] + |1\rangle_B \otimes [\alpha_{01}|0\rangle_A + \alpha_{11}|1\rangle_A]$$
$$= |0\rangle_B \otimes |\psi_0^{(B)}\rangle + |1\rangle_B \otimes |\psi_1^{(B)}\rangle.$$

Note that, although the order of the tensor products has been reversed, the subscript is used on the ket to keep track of which qubit it refers to, so there is no ambiguity of notation. The (unnormalized) two-qubit state $|0\rangle_B \otimes |\psi_0^{(B)}\rangle$, say, is the projection of $|\psi\rangle$ onto the subspace for which qubit B takes the value 0. The one-qubit state $|\psi_0^{(B)}\rangle$ may be referred to as the partial projection, which may play a significant role in the QMT implementation described herein.

For a general n-qubit state of the form below $$|\psi\rangle = \sum_{x=0}^{2^n-1} \alpha_x |x\rangle,$$

a single qubit $i \in \{0, \ldots n-1\}$ with value $a \in \{0, 1\}$ may be addressed by defining the projection operator, as follows:

$$\prod\nolimits_a^{(i)} |a\rangle_i \otimes |\psi_a^{(i)}\rangle = \sum_{x:x_i=a,x} \alpha_x |x_{n-1} \ldots x_{i-1} a x_{i-1} \ldots x_0\rangle.$$

Here, the partial projection operator $$\pi_a^{(n,i)}: \bigotimes_{j=0}^{n-1} \mathcal{H}_j \to \bigotimes_{j=i+1}^{n-1} \mathcal{H}_j \otimes \bigotimes_{j=0}^{i-1} \mathcal{H}_j$$

is defined to be $\pi_a^{(n,i)}|\psi\rangle = |\psi_a^{(i)}\rangle$. In the special case that n=1, then $\Pi_a^0|\psi\rangle = \alpha_a|a\rangle$ and $\pi_a^{(1,0)}|\psi\rangle = \alpha_a$. Note that $\Pi_0^{(i)} + \Pi_1^{(i)} = 1$ is the identity operator.

A two-qubit projection may be defined similarly. For $n \geq 2, i,j \in \{0, \ldots, n-1\}$, $a, b \in \{0,1\}$, and $i \neq j$, the projection operator onto qubits i and j with values a and b, respectively, may be defined as $\Pi_{ab}^{(ij)} := \Pi_b^{(j)} \Pi_a^{(i)} = \Pi_a^{(i)} \Pi_b^{(j)} = \Pi_{ba}^{(ji)}$. Here, $$\Pi_{ab}^{(ij)|\psi\rangle} = |b\rangle_j \otimes |a\rangle_i \otimes \pi_b^{(n-1,j)} \pi_a^{(n,i)} |\psi\rangle = |a\rangle_i \otimes |b\rangle_j \otimes |\psi_{ab}^{(ij)}\rangle.$$

In the special case that n=2, then $$\left|\psi\frac{(10)}{ab}\right\rangle = a_{ab}\left|\psi\frac{(01)}{ba}\right\rangle.$$

In the degenerate case that i=j, $$\prod\frac{(ii)}{ab} = \prod\frac{(i)}{a}$$

may be defined if a=b; otherwise, it may be undefined. Note that, for $i \neq j$, $$\prod\frac{(ij)}{00} + \prod\frac{(ij)}{01} + \prod\frac{(ij)}{10} + \prod\frac{(ij)}{11} = 1$$

may represent the identity operator. Thus approach may be generalized to projections onto an arbitrary number of qubits, in some embodiments.

Given an n-qubit state $|\Psi\rangle$, as represented by a QMT complex basebanded signal $\psi$, it may be possible to construct the n-qubit state given by some projection $$\Pi\frac{(i)}{0}|\Psi\rangle = |0\rangle i \otimes |\Psi\rangle\frac{(i)}{0},$$

say. It can be seen that this corresponds to a complex basebanded signal of the form $e^{i w i n} \Psi_0^{(i)}(t)$, so the task may include determining the partial projection signal $\psi_0^{(i)}(t)$. This may be done in a brute-force manner by decomposing $\psi(t)$ into its $2^n$ complex components and then reconstructing the projection from these pieces. A construction scheme that does not require complete knowledge of the quantum state but relies only on the fact that it is a state of n qubits in described below.

Consider the one-qubit case $\Psi(t) = a_0 e^{i\omega t} + a_1 e^{-i\omega t}$. If n=1 and i=0, then $\Psi_0^{(0)}(t) = a_0$ is a constant (DC) signal (i.e., a zero-qubit state). This may be constructed by multiplying $\Psi(t)$ by $\emptyset_0^\omega(t)^* = e^{-i\omega t}$ and low-pass filtering. In fact, this corresponds to the one-qubit inner product function described earlier. In some embodiments, $\Psi(t)$ may be constructed as $\psi_1^{(0)}(t) = a_1$ in a similar manner.

Now consider the two-qubit case with $\omega_1 = \omega_A$ and $\omega_0 = \omega_B$. To address qubit A, $\psi_0^{(A)}(t)$ may be constructed by multiplying $\psi(t)$ by $\phi_0 \omega^A(t)^* = e^{-i\omega_A t}$ and applying low-pass filtering. To illustrate this, note the following:

$$\phi_0^{\omega_A}(t)^* \psi(t) = \alpha_{00} e^{i\omega_B t} + \alpha_{01} e^{-i\omega_B t} + \alpha_{10} e^{-i(2\omega_A - \omega_B)t} +$$
$$\alpha_{11} e^{-i(2\omega_A + \omega_B)t}$$
$$= \psi_0^{(A)}(t) + [\alpha_{10} e^{-i(2\omega_A - \omega_B)t} + \alpha_{11} e^{-i(2\omega_A + \omega_B)t}].$$

Here, the first term has frequencies $\pm \omega_B$, as desired. The remaining terms have frequencies $-(2\omega_A \pm \omega_B)$. Since $\omega_A \geq 2\omega_B > 0$, it can be seen that $2\omega_A \pm \omega_B \geq 4\omega_B - \omega_B = 3\omega_B$ Thus, by using a low-pass filter with a passband of $|\omega| < 3\omega_B$, these remaining terms may be eliminated to obtain $\psi_0^{(A)}(t)$. A similar approach may be used to construct $\psi_1^{(A)}(t) = a_{10} e^{i\omega_B t} + a_{11} e^{-i\omega_B t}$. Given $\psi_0^{(A)}(t)$ and $\psi_1^{(A)}(t)$, the corresponding projections may be constructed by multiplying the former by $e^{i\omega_A t}$ and the latter by $e^{-i\omega_A t}$.

Addressing qubit B may, in some embodiments, be slightly more complicated. For example, multiplying $\psi(t)$ by $\phi^{\omega_B}(t)^*$ yields $$\phi_0^{\omega_B}(t)^*\psi(t) = \alpha_{00}e^{i\omega_A t} + \alpha_{10}e^{-i\omega_A t} + \alpha_{01}e^{i(\omega_A - 2\omega_B)t} + \alpha_{11}e^{-i(\omega_A + 2\omega_B)t}$$

$$\psi_0^{(0)}(t) + [\alpha_{01}e^{i(\omega_A - 2\omega_B)t} + \alpha_{11}e^{-i(\omega_A + 2\omega_B)t}].$$

Here, the first term has frequencies $\pm\omega_A$, as desired. The remaining terms have frequencies $\omega_A - 2\omega_B \geq 0$ and $-(\omega_A + 2\omega_B) < 0$. Since $\omega_A \geq 2\omega_B > 0$, it can be seen that that $0 \leq \omega_A - 2\omega_B < \omega_A < \omega_A + 2\omega_B$. Thus, by using a bandpass filter with a passband of $|\omega - \omega_A| < 2\omega_B$, these terms may be eliminated to obtain $|\psi_0^{(B)}\rangle$. A similar approach may be used to construct $\psi_1^{(B)}(t) = a_{01}e^{i\omega_A t} + a_{11}e^{-i\omega_A t}$. Again, multiplication of $\psi_0^{(B)}(t)$ by $e^{i\omega_B t}$ and $\psi_1^{(B)}(t)$ by $e^{i\omega_B t}$ yield the corresponding projections.

Now suppose $n > 2$. For this case, $i = n-1$ is easy, $i = 0$ is as before, and $0 < i < n-1$ is complicated. Construction may begin, as before, by multiplying $\psi(t)$ by either $\phi_0^{\omega_i}(t)^* = e^{-i\omega_i t}$, to construct $\psi^{(i)}(t)$, or $\phi_1^{\omega_i}(t)$, to construct $\psi^{(i)}(t)$. In the former case, $$\phi_0^{\omega_i}(t)^*\psi(t) = \sum_{x=0}^{2^n-1} \alpha_x e^{i(\Omega_x - \omega_i)t} = \sum_{x:x_i=0} \alpha_x e^{i(\Omega_x - \omega_i)t} + \sum_{x:x_i=1} \alpha_x e^{i(\Omega_x - \omega_i)t},$$

where $x_i = \mod[\text{floor}(x/2^i), 2]$ is the value of bit i in the binary expansion $x = x_0 2^0 + \ldots + x_{n-1} 2^{n-1}$ and $$\Omega_x := (-1)^{x_{n-1}}\omega_{n-1} + \ldots + (-1)^{x_0}\omega_0.$$

Note that the individual frequencies may be written in the form $$\Omega_x - \omega_i = \begin{cases} [\Omega_x - (-1)^{x_i}\omega_i] & \text{if } x_i = 0 \\ [\Omega_x - (-1)^{x_i}\omega_i] - 2\omega_i & \text{if } x_i = 1 \end{cases}$$

From this, it may be deduced that $$\psi_0^{(i)}(t) = \sum_{x:x_i=0} \alpha_x e^{i(\Omega_x - \omega_i)t}.$$

To actually construct this signal, the $2^{n-1}$ frequencies $\Omega_x - \omega_i$ corresponding to $x_i = 0$ may be bandpass filtered or, equivalently, the $2^{n-1}$ frequencies $\Omega_x - \omega_i$ corresponding to $x_i = 1$ may be bandpass filtered. In the octave spacing scheme described herein, the frequencies are $\Omega_x - \omega_i = (2^n - 1 - 2x - 2^i)\Delta\omega$ for $x = 0, \ldots, 2^n - 1$, of which only those for which $x_i = 0$ are bandpassed. Once this is done, the bandpassed signal, $\psi_0^{(i)}(t)$, may be multiplied by $e^{i\omega_i t}$ to obtain the projection signal. Note that the state $\psi$ need not be known in order to construct this filter. Instead, only the total number of qubits, n, and the particular qubit to be addressed, i, may need to be specified.

A similar procedure may be used to obtain $\psi_1^{(i)}(t)$ and its corresponding projection. In this case, $\psi(t)$ may be multiplied by $\phi_1^{(i)}(t)^* = e^{i\omega_i t}$ to obtain the following:

$$\psi_1^{(i)}(t) = \sum_{x:x_i=1} \alpha_x e^{i(\Omega_x - \omega_i)t}.$$

Figure 16:
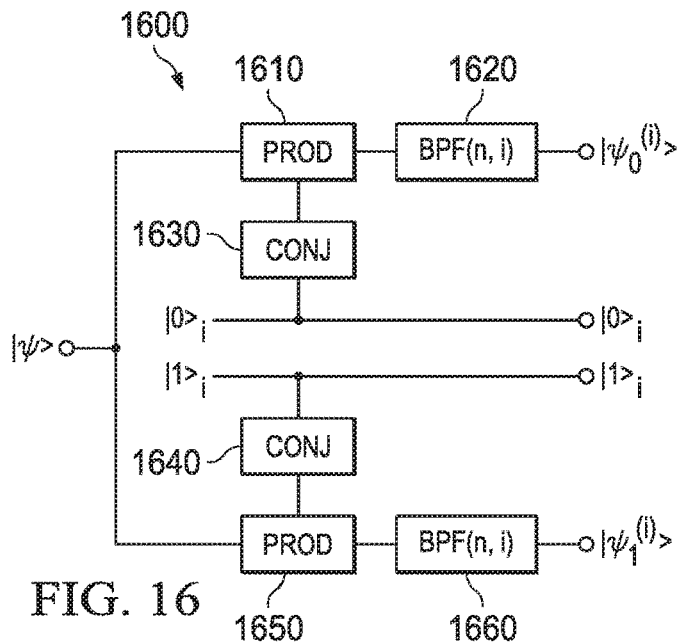
FIG. 16 illustrates an example circuit schematic for implementing a one-qubit projection device, according to another embodiment.

To construct this signal, frequencies $\Omega x + \omega i$ may be bandpass filtered such that $x_i = 1$. Note that these are the same frequencies as $\Omega x - \omega i$ for $x_i = 0$. An example circuit schematic for the projection process is illustrated in FIG. 16 and described below.

Figure 18:
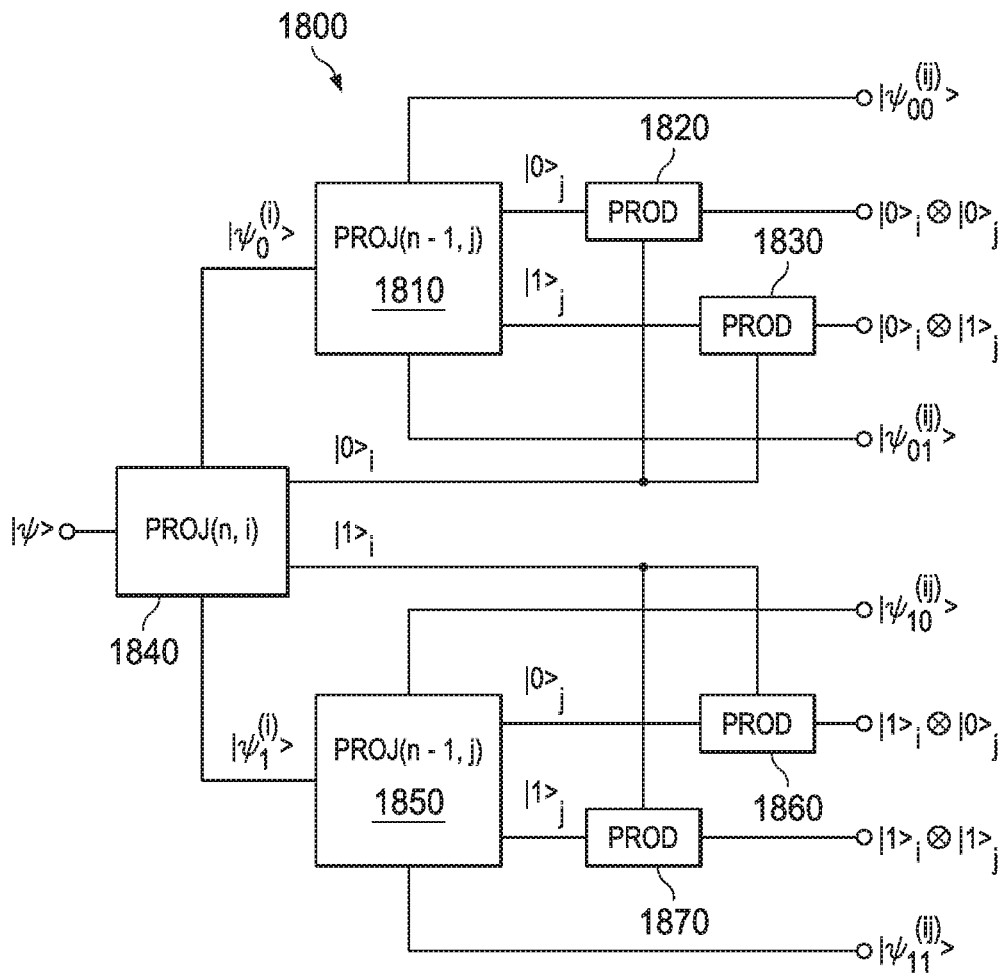
FIG. 18 illustrates an example circuit schematic for implementing a two-qubit projection device, according to another embodiment.

To address two distinct qubits, a set of four partial projection signals of the form $$\psi\frac{(ij)}{ab}ab$$

for a, b $\in \{0, 1\}$ may be constructed from the single QMT signal $\psi$. This may be done by first projecting onto the a subspace of qubit i to obtain $$\psi\frac{(i)}{a},$$

as described above, and then applying this same procedure to project onto the b subspace of qubit i. An example circuit schematic for the two-qubit projection process is illustrated in FIG. 18 and described below.

This approach may be generalized to multi-qubit addressing, in some embodiments. In particular, when projecting onto all n subspaces, then $$\pi_{x_0}^{(1,0)}\pi_{x_1}^{(2,1)} \ldots \pi_{x_{n-2}}^{(n-1,n-2)}\pi_{x_{n-1}}^{(n,n-1)}|\psi\rangle = \langle x_{n-1} \ldots x_0|\psi\rangle = \alpha_x.$$

Note that each partial project may involve only the use of a low-pass filter. This may prove useful when considering the implementation of measurement gates, as described later.

In at least some embodiments, the projection scheme described above may use comb-like bandpass filters to construct the partial projection signals. In another embodiment, an alternative, yet equivalent, scheme may be to convolve the state $\psi$ with a template signal having the desired passband frequency components. The convolution of two such signals corresponds, in the frequency domain, to the product of their Fourier transforms. Thus, in such a scheme, the template signal would serve as a mask to eliminate undesired frequency components. In this way, simple analog devices such as Surface Acoustic Wave (SAW) elastic convolvers or optical charge-coupled device (CCD) convolvers may be used to construct programmable bandpass filters for each qubit.

For an n-qubit state represented by $\psi$, the partial projection state $\psi_0^{(i)}$ may be constructed for qubit i as follows. Using phase shifters and multipliers, a template signal of the following form may be constructed:

$$\phi^{(i)}(t) := 2^{n-1}\cos(\omega_{n-1}t) \ldots \cos(\omega_{i+1}t) \ldots \cos(\omega_{i-1}t) \ldots \cos(\omega_0 t)$$

Note that the Fourier transform of $\phi^{(i)}$ is $$\phi^{(i)}(\omega) = \int_{-\infty}^{\infty} \phi^{(i)}(t)e^{-\omega t}dt = 2\pi \sum_{y:y_i=0} \delta(\omega - \Omega_y + \omega_i).$$

Now, consider the Fourier transform of $$\psi_0^{(i)}(t) := e^{-i\omega_i t}\psi(t)\frac{1}{T}1_{[-\frac{T}{2},\frac{T}{2}]}(t),$$

given by $$\psi_0^{(i)}(\omega) = \sum_{x=0}^{2^n-1} \alpha_x \operatorname{sinc}[(\omega - \Omega_x + \omega_i)T/2].$$

Here, sinc represents the unnormalized sinc function. The convolution of $\phi^{(i)}$ and $\psi_0^{(i)}$ is therefore $$(\psi_0^{(i)} * \phi^{(i)})(t) = \sum_{x=0}^{2^n-1} \sum_{y:y_i=0} \alpha_x \operatorname{sinc}[(\Omega_y - \Omega_x)T/2]e^{i(\Omega_y - \omega_i)t}.$$

For $\Omega_y = \Omega_x$, the argument of the sinc function is zero and, hence, takes on a value of 1. For the remaining terms, the sinc function become vanishingly small as T becomes large. In the special case of the octave spacing scheme and an integer number of periods [i.e., $T \in (2\pi/\omega_0)\mathbb{N}$], the argument of the sinc function becomes $(\Omega_y - \Omega_x) T/2 \in 2\pi(x-y)\mathbb{N}$. Therefore, all terms such that $x \neq y$ drop out, leaving only those such that $x_i = 0$. The result is precisely the desired partial projection signal, as follows:

$$(\psi_0^{(i)} * \phi^{(i)})(t) = \sum_{x:x_i=0} \alpha_x e^{i(\Omega_x - \omega_i)t} = \psi_0^{(i)}(t).$$

In at least some embodiments, a similar procedure may be followed to obtain other qubit projection states.

A representative circuit schematic for implementing the projection process described herein is shown in FIG. 16. Specifically, FIG. 16 illustrates an example circuit schematic for implementing a one-qubit projection device, according to another embodiment. As in the previous example, projection device 1600 includes circuitry to obtain single-qubit projection states for a qubit i. More specifically, projection device 1600 includes circuitry to obtain the single-bit projection Proj(n,i) for a qubit i of an n-qubit state. In this example, the projection device 1600 includes two complex product calculation components (shown as Prod components 1610 and 1650), two complex conjugate function components (shown as Conj components 1630 and 1640), and two bandpass filters (shown as BPF(n,i) components 1620 and 1660). In this example, the BPF(n,i) components, which are bandpass filters corresponding to qubit i of an n-qubit state, may be employed in a quantum computing emulation device to address qubit i. As in the previous example, the four output signals may be related to the input signal by $|\psi\rangle = |0\rangle_i \otimes |\psi_0^{(i)}\rangle + |1\rangle_i \otimes |\psi_1^{(i)}\rangle$.

Note that, in FIG. 16, each of the heavy lines represents a pair of lines/signals (with a real and imaginary part). In this example, bandpass filters are where the separation of frequency content into the two halves is performed. In at least some embodiments, the two bandpass filters are the same, but they operate on different portions of the input signal. In different embodiments, a projection device 1500 or a projection device 1600 may provide input to a gate operation component of a quantum computing emulation device.

Figure 17:
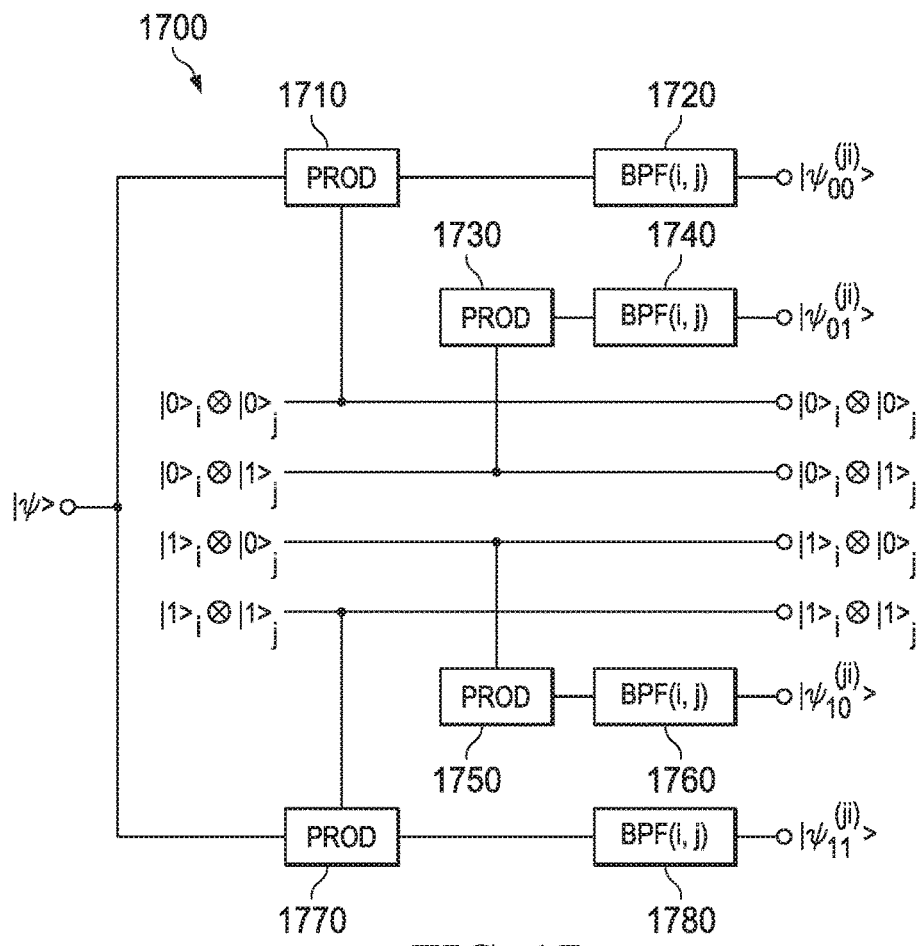
FIG. 17 illustrates an example circuit schematic for implementing a two-qubit projection device, according to one embodiment.

FIG. 17 illustrates an example circuit schematic for implementing a two-qubit projection device, according to one embodiment. In this example, projection device 1700 includes circuitry to obtain two-qubit projection states for a pair of qubits i and j. In other words, projection device 1700 includes circuitry to obtain the two-qubit projection Proj(i, j) for qubits and j. In this example, the projection device 1700 includes four complex product calculation components (shown as Prod components 1710, 1730, 1750, and 1770), and four bandpass filters (shown as BPF(i,j) components 1720, 1740, 1760, and 1780). In this example, the BPF(i, j) components may be employed in a quantum computing emulation device to address qubits i and j. In this example, the eight output signals of projection device 1700 are related to the input signal via the relation $|\psi\rangle = |0\rangle_i \otimes |0\rangle_j \otimes |\psi_{00}^{(ji)}\rangle + |0\rangle_i \otimes |1\rangle_j \otimes |\psi_{01}^{(ji)}\rangle + |1\rangle_i \otimes |0\rangle_j \otimes |\psi_{10}^{(ji)}\rangle + |1\rangle_i \otimes |1\rangle_j \otimes |\psi_{11}^{(ji)}\rangle$.

FIG. 18 illustrates an example circuit schematic for implementing a two-qubit projection device, according to another embodiment. In this example, projection device 1800 includes circuitry to obtain two-qubit projection states for a pair of qubits i and j of an n-qubit state. In other words, projection device 1800 includes circuitry to obtain the two-qubit projection Proj(n, i, j) for qubits i and j. In this example, the two-qubit projection device 1800 includes three one-qubit projection devices (shown as Proj components 1810, 1840, and 1850), any or all of which may be similar to projection device 1600 illustrated in FIG. 16 and described above. In this example, projection device 1800 also includes four complex product calculation components (shown as Prod components 1820, 1830, 1860, and 1870). In at least some embodiments, projection device 1800 may be employed in a quantum computing emulation device to address qubits i and j. As in the previous example, the eight output signals of projection device 1800 are related to the input signal via the relation $|\psi\rangle = |0\rangle_i \otimes |0\rangle_j \otimes |\psi_{00}^{(ji)}\rangle + |0\rangle_i \otimes |1\rangle_j \otimes |\psi_{01}^{(ji)}\rangle + |1\rangle_i \otimes |0\rangle_j \otimes |\psi_{10}^{(ji)}\rangle + |1\rangle_i \otimes |1\rangle_j \otimes |\psi_{11}^{(ji)}\rangle$.

A quantum computation may be thought of as a 2×2 matrix transformation on a complex signal. When transforming complex matrices, the data to be transformed may be encoded in the phase of the AC signals, which have both amplitude and phase information. In at least some embodiments, the amplitude may be normalized and the quantum state information may be encoded in the phase content of the signals. This information may be the input to a matrix transformation that is performed using analog electronic circuits, such as analog computational circuits for analog multiplication, summation, and filtering operations. These circuits may be combined to create the mathematical matrix transformations that are typically used in quantum computing.

In some embodiments, the quantum computing emulation devices described herein may emulate the logical operations of the digital domain, including AND, OR, NOR, and NOT gates, for example. In addition, the analog circuitry within these quantum computing emulation devices may be used to emulate quantum computations. The types of problems that can be solved using quantum computation may lend themselves to parallelism of the computation since the data set includes a whole array of frequencies all in one signal set. In some embodiments, the quantum computing emulation devices described herein may leverage this characteristic to achieve a level of parallelism that cannot be achieved in a digital computer.

As previously noted, in at least some embodiments, a quantum computing emulation device may include a gate component that is programmable to perform different gate operations at different times. For example, in some embodiments, an array of DC coefficients may be provided to program the gate. In such embodiments, as an AC signal representing a quantum state passes through the gate, it may be transformed in a manner that is dependent on the DC coefficients. For example, the DC coefficients may select which one or more multipliers (e.g., in an array of multipliers) will transform different portions of the incoming signal, which adders will be used to combine various transformed and untransformed components of the signal, and/or which filtering operations will transform the input signals or the output signals. In some embodiments, by specifying particular DC coefficients, the gate may be programmed to perform any one of a variety of single gate transformations corresponding to quantum gate operations. In some embodiments, the DC coefficients may control switches for control gates, thus providing a mechanism to control whether or not a given gate operation will be performed on a particular qubit (e.g., dependent on the value of a different qubit).

A general one-qubit gate may be represented by a matrix A of the form.

$$A = \begin{pmatrix} A_{0,0} & A_{0,1} \\ A_{1,0} & A_{1,1} \end{pmatrix}$$

The application of this gate on qubit i may be given by $$A_i|\psi\rangle = [A_{0,0}|0\rangle_i + A_{1,0}|1\rangle_i] \otimes |\psi_0^{(i)}\rangle + [A_{0,1}|0\rangle_i + A_{1,1}|1\rangle_i] \otimes |\psi_1^{(i)}\rangle.$$

In some embodiments, to construct a one-qubit gate, denoted A and applied to qubit i, $\psi_0^{(i)}$ and $\psi_1^{(i)}$ may be constructed as described above and the new formed signal $\psi'$ may be given by $$\psi'(t) = [A_{0,0}e^{j\omega_i t} + A_{1,0}e^{-j\omega_i t}]\psi_0^{(i)}(t) + [A_{0,1}e^{j\omega_i t} + A_{1,1}e^{-j\omega_i t}]\psi_1^{(i)}(t).$$

In this example, the new signal $\psi'$ corresponds to the quantum state $|\psi'\rangle = A_i|\psi z, 163$. In at least some embodiments, the one-qubit gate may operate on the state $|\psi\rangle$, represented by the complex basebanded signal $\psi$, by decomposing it into subspace projection signals and operating on each component.

Two-qubit gate operations may be constructed similarly, in some embodiments. For example, to construct a two-qubit gate, denoted B and applied to qubits i and j, the four signals $\psi_{00}^{(ji)}$, $\psi_{01}^{(ji)}$, $\psi_{10}^{(ji)}$, and $\psi_{11}^{(ji)}$ may be constructed as described above and then the new signal $\psi'$ may be given by:

$$\psi'(t) = \sum_{a,b=0}^{1}\left[\sum_{a',b'=0}^{1} B_{b'a',ba}\phi_{b'}^{(\omega j)}\phi_{a'}^{(\omega j)}\right]\psi_{ba}^{(ji)}.$$

Using a different notation, a quantum state $|\psi\rangle \in \mathcal{H}$ may be mathematically decomposed into the two orthogonal subspaces corresponding to a qubit i as follows:

$$|\psi\rangle = \Pi_0^i|\psi\rangle + \Pi_1^i|\psi\rangle = |0\rangle_i \otimes \left|\psi\frac{(i)}{0}\right\rangle + |1\rangle_i \otimes \left|\psi\frac{(i)}{1}\right\rangle.$$

Here, $$\left|\psi\frac{(i)}{0}\right\rangle \text{ and } \left|\psi\frac{(i)}{0}\right\rangle$$

are the (n−1)-qubit partial projection states.

As previously noted, a linear gate operation on a single qubit may be represented by a complex 2×2 matrix U, where $$U = \begin{pmatrix} U_{0,0} & U_{0,1} \\ U_{1,0} & U_{1,1} \end{pmatrix}$$

Here, if U acts on qubit i of state $|\psi\rangle$, then the transformed state may be given as $$|\psi'\rangle = [U_{0,0}|0\rangle_i + U_{1,0}|1\rangle_i] \otimes |\psi_0^{(i)}\rangle + [U_{0,1}|0\rangle_i + U_{1,1}|1\rangle_i] \otimes |\psi_1^{(i)}\rangle$$

Thus, the gate operation is applied only to the addressed qubit basis states, not to the partial projections. This, of course, is only a mathematical operation. A physical method of construction is needed to realize the transformation.

In a QMT representation, a pair of complex signals $\psi_0^{(i)}(t)$ and $\psi_1^{(i)}(t)$ corresponding to the partial projection states $|\psi_0^{(i)}(t)\rangle$ and $|\psi_1^{(i)}(t)\rangle$ may be produced by taking the initial complex signal $\psi(t)$, multiplying copies of it by $\phi_0^{w1}(t)$ and $\phi_1^{w1}(t)$, respectively, and passing them through a pair of specialized bandpass filters that output the desired projection signals. Given this pair of complex signals, along with the complex, single-qubit basis signals $\phi_0^{w1}(t)$ and $\phi_1^{w1}(t)$, the transformed signal $\psi'(t)$ may be constructed using analog multiplication and addition operations as follows:

$$\psi'(t) = [U_{0,0}\phi_0^{w1}(t) + U_{1,0}\phi_1^{w1}(t)]\psi_0^{(i)}(t) + [U_{0,1}\phi_0^{w1}(t) + U_{1,1}\phi_1^{w1}(t)]\psi_1^{(i)}(t).$$

Figure 21:
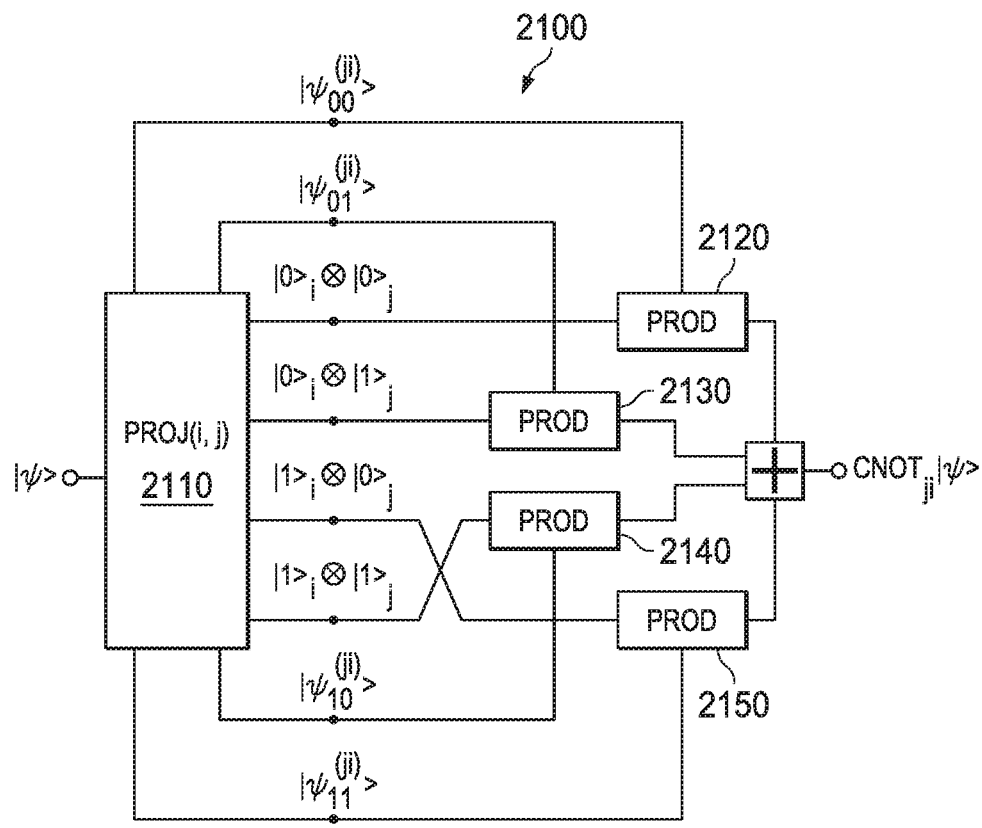
FIG. 21 illustrates an example circuit schematic for a device representing a particular two-qubit gate, a Controlled NOT (CNOT) gate, according to one embodiment.

In various embodiments, the quantum computing emulation devices described herein may be programmed to perform any of a variety of two-qubit gate operations, including Controlled NOT (CNOT) gates. An example circuit for implementing a CNOT gate is illustrated in FIG. 21 and described below, according to one embodiment. In addition to supporting logical NOT and/or CNOT operations, the quantum computing emulation devices described herein may include analog circuitry to implement more exotic types of gates, such as gates that change the phase of a qubit. For example, since qubits are superpositions of zero and one states, when an operation is performed on a qubit, the complex coefficients associated with those binary states are changed. The approach described above may be generalized to an m-qubit gate, in some embodiments.

Figure 19:
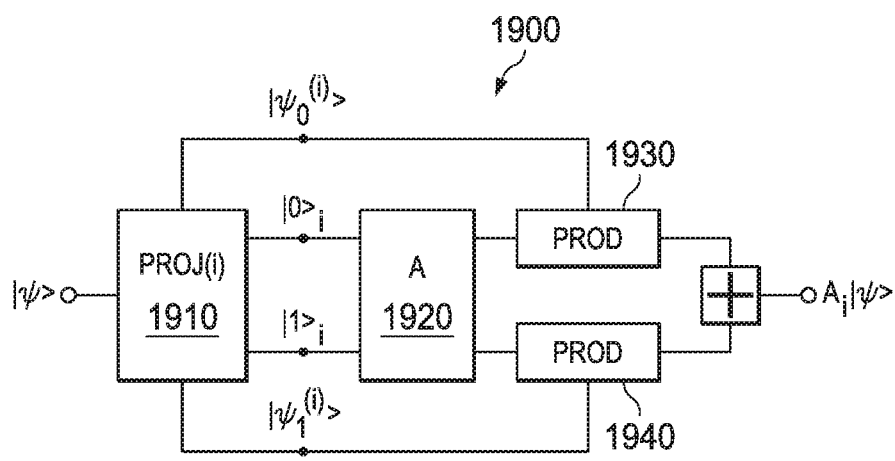
FIG. 19 illustrates an example circuit schematic for a device that applies a single-qubit gate operation on an initial quantum state, according to one embodiment.
Figure 20A:
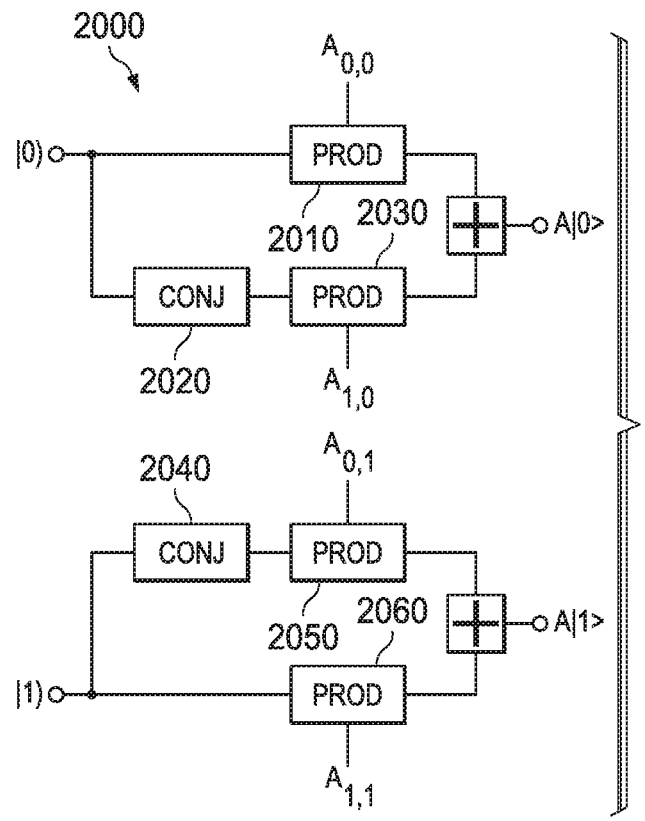
FIG. 20A illustrates an example circuit schematic for a programmable gate that applies a single-qubit gate operation to a given qubit, according to one embodiment.

A schematic illustration of the process described above is shown in FIG. 19 using a linear gate A. More specifically, FIG. 19 illustrates an example circuit schematic for a device that applies a single-qubit gate operation on an initial quantum state, according to one embodiment. In this example, device 1900 includes circuitry to receive the initial state, represented by $|\psi\rangle$, which is then passed into a one-qubit projection device, shown as Proj component 1910. In this example, Proj component 1910 produces a set of signals corresponding to the projection of the initial state onto the subspace corresponding to qubit i. Examples implementations of Proj component 1910 are illustrated in FIGS. 15 and 16 and described above, according to different embodiments. As illustrated in FIG. 19, the output of Proj component 1910 may be provided to gate component (shown as gate component 1920), which applies a single-qubit gate operation A to qubit i. An example implementation of gate component 1920 is illustrated in FIG. 20A and described below. In the example illustrated in FIG. 19, device 1900 also includes two complex product components (shown as Prod components 1930 and 1940), and an op-amp that serves as an adder. The functionality of these components is described in more detail below. In at least some embodiments, device 1900 may be employed in a quantum computing emulation device to cause the single-qubit gate $A_i$, to act on qubit i of quantum state $|\psi\rangle$, as programmed.

In the example illustrated in FIG. 19, various operations are performed going from left to right. For example, on the far left is an input signal representing the current quantum state. Next, a projection operation (which is a filtering operation) is performed on that input signal to splits it up into two complementary signals, each of which includes a respective half of the frequency content of the original signal. Following the projection operation, the qubit that is being addressed (which is labeled as qubit i) is operated upon by the gate operation A to create a new transformed qubit. More specifically, gate operation A performs an operation specified by DC coefficients that were input to the quantum computing emulation device (e.g., as DC voltages). Following the performance of the gate operation, the two halves of the signal that were previously split off are combined with the new transformed qubit (the outputs of gate operation A) through a pair of complex multiplication operations and then those two resulting signals are added together to produce the final transformed state.

Figure 20B:
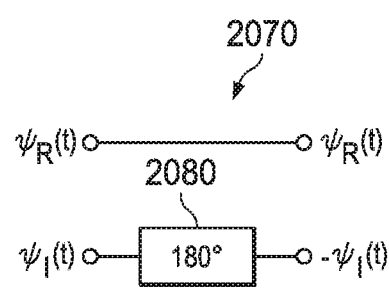
FIG. 20B illustrates an example circuit schematic for a device for generating the complex conjugate component (Conj) of a complex signal, according to one embodiment.

FIG. 20A illustrates an example circuit schematic for a programmable gate that applies a single-qubit gate operation to a given qubit, according to one embodiment. For example, in one embodiment, gate component 1920 illustrated in FIG. 19 may be implemented by the device 2000 illustrated in FIG. 20A. In this example, device 2000 includes circuitry to implement a 2×2 complex matrix A, which represents a single-qubit gate acting on an individual single-qubit basis state. In this example, the operation to be applied by device 2000 is specified by four complex-valued components. The components $A_{0,0}$ and $A_{1,0}$ represent the first column of A, while $A_{0,1}$ and $A_{1,1}$ represent the second column of A. In this example, device 2000 includes four complex product components (shown as Prod components 2010, 2030, 2040, and 2060), and two complex conjugate components (shown as Conj components 2020 and 2040). Each of the complex conjugate components generates an output signal in which the real component is equal to the real component of its input, and in which the imaginary component is equal in magnitude to the imaginary component of its input but is opposite in sign. One example implementation of a complex conjugate function component is illustrated in FIG. 20B. In at least some embodiments, device 2000 may be employed as a programmable gate in a quantum computing emulation device to one of a variety of supported operations to an individual qubit of an input quantum state.

In one embodiment, the programmable gate may include multiple four-quadrant multipliers, each multiplier of which is associated with one of the DC coefficients presented to the quantum computing emulation device.

FIG. 20B illustrates an example circuit schematic for a device 2070 that includes circuitry for generating the complex conjugate component (Conj) of a complex signal. In this example, component 2080 represents a 180° phase shifter. In at least some embodiments, device 2070 may be employed in a quantum computing emulation device to produce $\psi(t)^*$ from $\psi(t)$.

The action of a NOT gate X, where $$X = \begin{pmatrix} 0 & 1 \\ 1 & 0 \end{pmatrix},$$

on qubit 0 of a two-qubit state may be given as follows:

$$X_0|\psi\rangle = |1\rangle_0 \otimes |\psi_0^{(0)}\rangle + |0\rangle_0 \otimes |\psi_1^{(0)}\rangle$$
$$= |1\rangle_0 \otimes [\alpha_{00}|0\rangle_0 + \alpha_{10}|1\rangle_1] + |0\rangle_0 \otimes [\alpha_{01}|0\rangle_1 + \alpha_{11}|1\rangle_1]$$
$$= \alpha_{00}|01\rangle + a_{01}|00\rangle + \alpha_{10}|11\rangle + \alpha_{11}|10\rangle$$

Similarly, for a two-qubit operator B of the form.

$$B = \begin{bmatrix} B_{00,00} & B_{00,01} & B_{00,10} & B_{00,11} \\ B_{01,00} & B_{01,01} & B_{01,10} & B_{01,11} \\ B_{10,00} & B_{10,01} & B_{10,10} & B_{10,11} \\ B_{11,00} & B_{11,01} & B_{11,10} & B_{11,11} \end{bmatrix}$$

acting on qubits i and j, the result of applying this gate may be as follows:

$$B_{ji}|\psi\rangle = \sum_{a,b=0}^{1} \left[ \sum_{a',b'=0}^{1} B_{b'a',ba}|b'\rangle_j \otimes |a'\rangle_i \right] \otimes |\psi_{ba}^{(ji)}\rangle.$$

In one specific example, the action of a controlled NOT (CNOT) gate C, where $$C = \begin{bmatrix} 1 & 0 \\ 0 & X \end{bmatrix},$$

acting on qubits i and j, with i being the controlling or source qubit and j being the controlled or target qubit, may be given as follows:

$$C_{ij}|\psi\rangle = C_{ij}[|0\rangle_i \otimes \pi_0^{(n,i)}|\psi\rangle + |1\rangle_i \otimes \pi_1^{(n,i)}|\psi\rangle]$$
$$= |0\rangle_i \otimes |\psi_0^{(i)}\rangle + C_{ij}|1\rangle_i \otimes [|0\rangle_j \otimes |\psi_{10}^{ij}\rangle + |1\rangle_j \otimes |\psi_{11}^{ij}\rangle]$$
$$= |0\rangle_i \otimes |\psi_0^{(i)}\rangle + |1\rangle_i \otimes [|1\rangle_j \otimes |\psi_{10}^{ij}\rangle + |0\rangle_j \otimes |\psi_{11}^{ij}\rangle].$$

FIG. 21 illustrates one possible schematic for implementing this gate. Specifically, FIG. 21 illustrates an example circuit schematic for a device representing a particular two-qubit gate, a Controlled NOT (CNOT) gate, according to one embodiment. In at least some embodiments, device 2100 may be employed in a quantum computing emulation device to act on qubits j and i. More specifically, the two-qubit $CNOT_{ji}$ gate implemented by device 2100 uses qubit i as the target and qubit j as the control. In this example, device 2100 includes a two-qubit projection component (shown as Proj(i, j) component 2110), and four complex product calculation components (shown as Prod components 2120, 2130, 2140, and 2150). In different embodiments, Proj(i, j) component 2110 may be implemented, for example, by device 1700 illustrated in FIG. 17 or by device 1800 illustrated in FIG. 18.

As illustrated in FIG. 21, a CNOT gate takes two inputs and produces two outputs. The two inputs include a controlling (or control) bit (qubit j) and a controlled (or target) bit (qubit i). As illustrated in this example, if the value of the control bit is 1, a NOT operation is applied to the target bit.

Otherwise, the target bit is not changed. As in other examples, the implementation of the CNOT gate includes a set of projection operations. However, in this case the input signal is broken into four pieces, rather than two pieces. The control NOT operation is implemented by switching the particular branch on which the controlling bit is one and flipping the target bit. In other words, the conditional is built into the circuit. The use of a CNOT gate in the quantum computing emulation devices described herein may allow these devices to implement a problem solution that include "if" statements or other conditional statements. The CNOT gate, as illustrated in FIG. 21, splits the signal into the parts that need to be operated on and the parts that do not need to be operated on, performs the operation, and then puts the signal components back together again through multiplication and addition operations. In at least some embodiments, rather than constructing gates that operate on 3, 4, or 5 qubits, the quantum computing emulation devices described herein may be scaled up by combining single-qubit gates, two-qubut gates, and CNOT gates. As the device is scaled up, there may be more individual qubits to operate on and more pairs of qubits to operate on, but the corresponding complex signals may not need to be split it up into more than two or four sets of signals in any of these operations. Therefore, emulation of a universal quantum computer may be achieved using this small set of gate types.

For the application of any linear operator, the same general procedure may be followed. Frst, the partial projection signals corresponding to the qubit(s) on which to apply the operator may be constructed. Next, the remaining basis states may be transformed according to the operator matrix elements. Finally, these signals may be multiplied by the partial projection signals to obtain the transformed state.

As previously noted, in some embodiments, a sequence of gate operations may be presented to the quantum computer emulation device in order to perform a computation or implement a problem solution. For example, a first gate operation may be applied to one or two of the qubits represented in the input pair of signals (e.g., the pair of signals representing the initial quantum state). The first gate operation may effect a manipulation or transformation that has been selected by the specification of a collection of DC coefficients. While the gate operation itself may be directed to a subset of the qubits, the entire signal is presented to the programmable gate component as input and the entire signal is put back together following the manipulation or transformation of that subset of qubits. The output of the first gate operation (the transformed signal as a whole) may be stored (e.g., in an analog delay line or, after an A/D conversion, on a digital storage medium). Any subsequent gate operations in the sequence of gate operations may receive, as input, the entire signal as transformed by the previous gate operation and stored. If the transformed signal was stored using a digital representation, it may be converted back to an analog signal by a D/A converter prior to its presentation to the programmable gate component. If the next gate operation in the sequence is different than the previous operation, or if the qubits on which it is to operate are different, a different collection of DC coefficients may be specified for that gate operation prior to presenting the input signal to the programmable gate component (or prior to enabling its operation or output). Once the sequence of gate operations is complete, the entire signal, as transformed by the last gate operation in the sequence, may be directed to a measurement component whose output is a digital representation of the problem solution.

Figure 22:
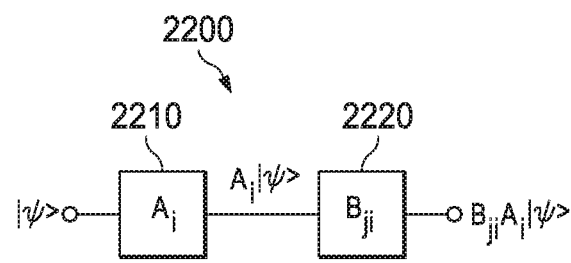
FIG. 22 illustrates an example circuit schematic for a device for performing a set of state transformations, according to one embodiment.

In some embodiments, two or more individual gate operation components within the programmable gate component may act on an input signal prior to the storage of the transformed signal or its output to a measurement component. FIG. 22 illustrates an example circuit schematic for a device 2200 that includes circuitry for performing a set of state transformations, according to one embodiment. In FIG. 22, the initial state, represented by $|\psi\rangle$, is first transformed by applying a single-qubit gate A, shown as gate 2210 (for example, a Hadamard gate) to qubit i of state $|\psi\rangle$. Subsequently, a two-qubit gate B, shown as gate 2220 (for example, a Controlled NOT (CNOT) gate, acting on qubits i and j), is applied upon the transformed state, $A_i|\psi\rangle$, resulting in a final state represented by $|\psi'\rangle = B_{ji}A_i|\psi\rangle$. In at least some embodiments, device 2200 may be employed in a quantum computing emulation device to effect a state transformation component using two gates.

The above procedures describe how to apply general linear transformations to the QMT state. This includes, but is not limited to, unitary transformations. In some embodiments, this approach to performing gate operations requires only a single subspace decomposition of the original signal into two constituent signals and does not require a full spectral decomposition, as would be required if one were performing an explicit matrix multiplication operation over the entire $2^n$-component state. This approach may provide a significant practical advantage to implementation and may more closely emulate the intrinsic parallelism of a true quantum system than some earlier approaches to quantum computing emulation.

In another embodiment, nonlinear transformations may be applied to the QMT state, with interesting implications. For example, it has been shown that the ability to perform nonlinear transformations in a quantum computer may allow one to solve oracle-based #P and NP-complete problems in polynomial time. This result has thus far been of mere theoretical interest, as quantum mechanics appears to be stubbornly linear, but the approach to quantum computing emulation described herein suggests that it may yet be of some practical utility.

Figure 23:
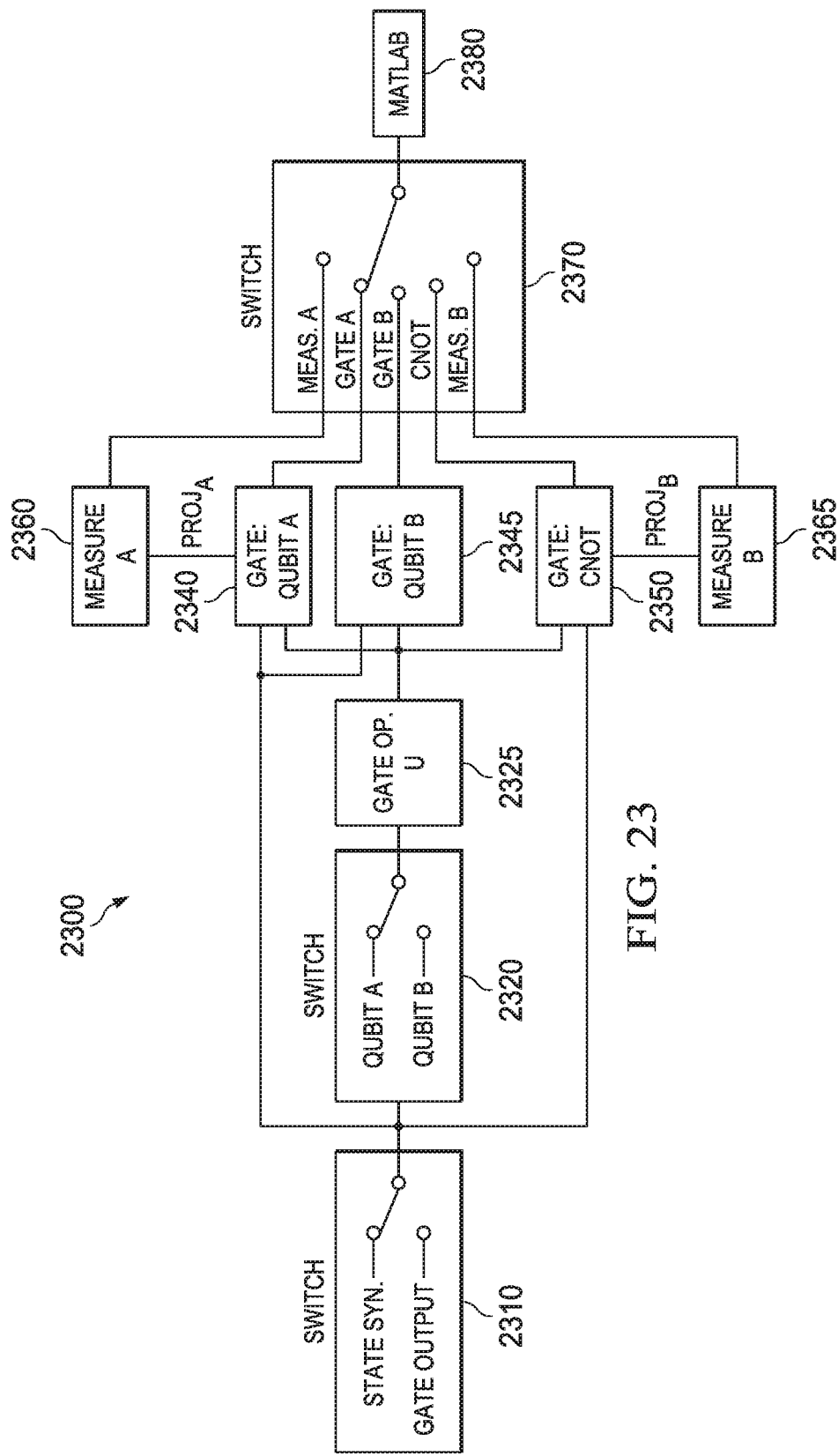
FIG. 23 illustrates an example schematic overview of a programmable gate component of a quantum computing emulation device, according to one embodiment.

FIG. 23 illustrates an example schematic overview of a programmable gate component of a quantum computing emulation device, according to one embodiment. For example, in one embodiment, gate component 1920 illustrated in FIG. 19 may be implemented by the device 2300 illustrated in FIG. 23. In this example, device 2300 includes circuitry to perform a gate operation on a complex signal that represents a two-qubit quantum state. In this example, device 2300 includes a gate operation component 2325 that includes circuitry to perform a gate operation specified by a collection of complex coefficients. Device 2300 also includes circuitry to provide the output of gate operation component 2325 to three additional gates, shown as gates 2340, 2345, and 2350. The input to gate operation component 2325 is controlled by two switches, shown as 2310 and 2320. In this example, switch 2310 is used to direct either a signal generated by a quantum state synthesis device or a signal that is output from gate 2325 (or one of gates 2340, 2345, or 2350) to the second switch 2320. Switch 2320 is then used to direct the portion of the input signal representing a selected one of the two qubits to the input of gate operation component 2325.

In this example, device 2300 also includes two measurement devices (shown as 2360 and 2365), each of which includes circuitry to produce a digital signal representation of an output of a respective one of gates 2340 and 2350. In this example, the outputs of gates 2340, 2345, and 2350, and the outputs of measurement devices 2360 and 2365 are provided to a switch 2370.

Switch 2370 is used to direct one of these outputs to a computer that controls and/or monitors the operation of device 2300 (e.g., a computer running a program that employs the quantum computing emulation device to produce a solution to a quantum computing problem). This computer is represented in FIG. 23 by element 2380. In one embodiment, this computer may execute a sequence of instructions in a computational language such as the MATLAB programming language to control and/or monitor the operations of device 2300. For example, various instructions may be presented to device 2300 to select an input complex signal, to select one or more qubits on which to operate, to control a sequence of gate operations to be performed, to select an output to be fed back to the input, to select an output to be measured, and/or to select an output to be recorded, in different embodiments.

In the example illustrated in FIG. 23, device 2300 is a two-qubit device, with qubits labeled as A and B. Processing of the initial quantum state proceeds from left to right. The first switch (switch 2310) selects as the input to the process either a signal generated by a quantum state synthesis device to represent an initial quantum state (e.g., at the beginning of a sequence of gate operations) or a previously transformed signal (e.g., for a subsequent gate operation in the sequence). In this example, the switch is set for the initial quantum state. As noted above, the second switch (switch 2320) controls which of the two qubits is to be operated on by gate operation component 2325. Note that entire the input signal, which is actually a pair of signals, is directed to the gate operation component 2325. In addition, the input signal is split into two additional branches (one of which is further split off into two branches), and each of these branches is directed to one or more of gates 2340, 2345, and 2350. In this example, gate operation component 2325 receives the DC voltage inputs that specify the gate operation to be performed and operates on the qubit signals for either A or B (depending on switch 2320), after which the output of gate operation component 2325 is directed to three different places. Specifically, the output of gate operation component 2325 is split off and sent to the three gates 2340, 2345, and 2350, one of which selects qubit A, one of which selects qubit B, and one of which performs a CNOT operation. The outputs of gates 2340 and 2350 are directed to measurement components 2360 and 2365, respectively. In this example, gates 2340, 2345, and 2350 do not perform gate operations such as the matrix transformations performed by gate operation component 2325. Instead, each of these gates performs a function that is similar (but opposite) of the projection components described herein in that they filter, separate, and/or put different combinations of constituent signals together to create different output options for device 2300. The different output options may include portions of the input signal that have been transformed and/or portions of the input signal that have not been transformed, depending on which qubit(s) were selected to be operated on and which operations were applied to the selected qubit(s).

In this example, on the far right, a third switch (switch 2370) selects the output option that is to be taken as the result of the gate operation from among the outputs of the three gates 2340, 2345, and 2350 and the two measurement components 2360 and 2365. In this example, switch 2370 is set to select the output of gate A (gate 2340). As illustrated in this example, while the signals transformed by gate operation component 2325 are also fed into the other two gates (2345 and 2350), only the output of gate A (2340) is read as the result. In other words, while the gate operation component 2325 operates on the input signal as a whole, the output is selected based on which of the outputs is the result of the specified operation on the specified qubit. In this example, if the switch selects the output of gate 2340, gate 2345 or gate 2350, the selected output may be stored for potential use as an input to a subsequent gate operation. However, if the switch selects the output of measurement component 2360 or measurement component 2365, the selected output may be a DC value representing a final decision or result.

Figure 24:
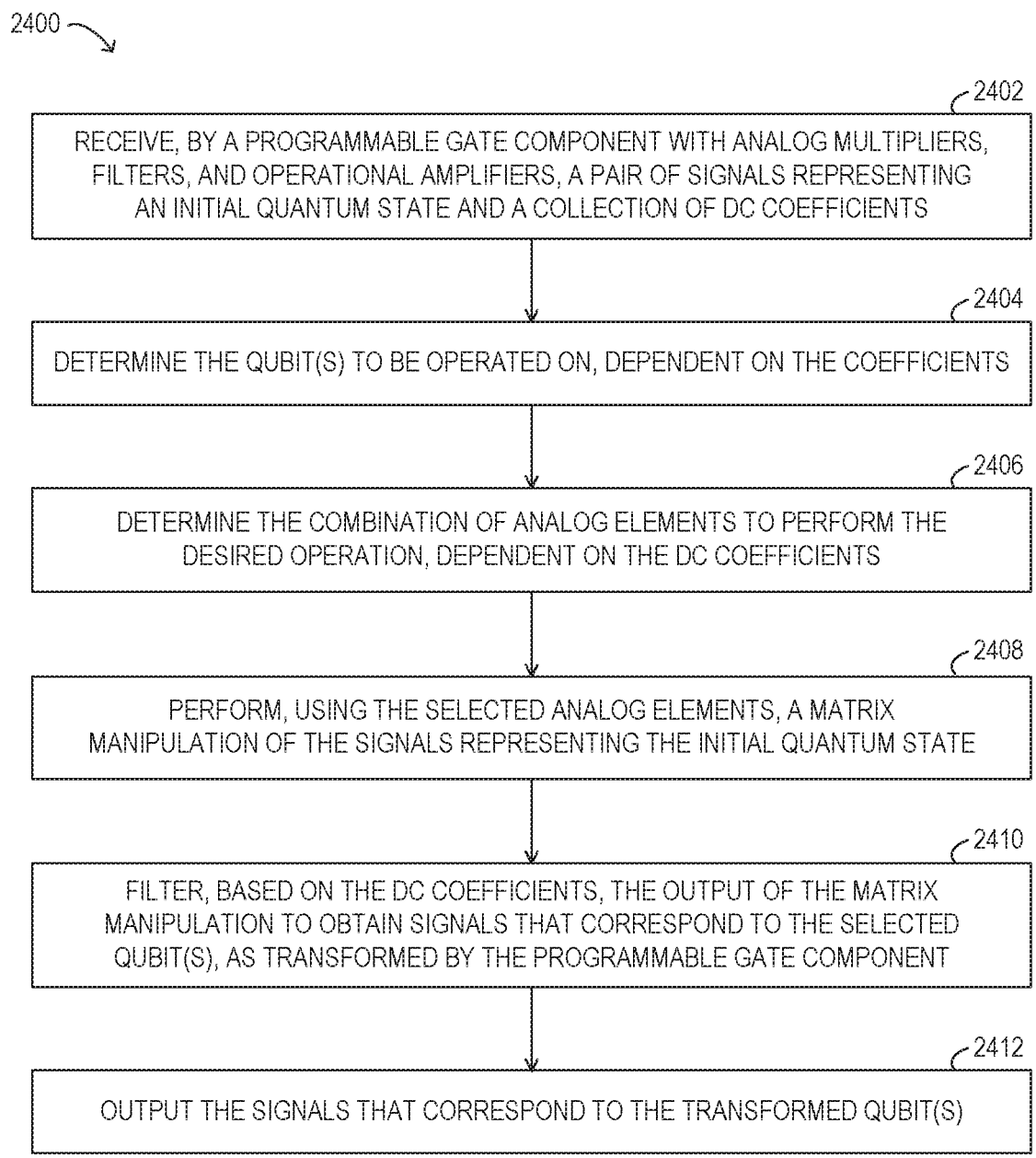
FIG. 24 illustrates an example method for performing a gate operation in a quantum computing emulation device, according to one embodiment.

FIG. 24 illustrates an example method 2400 for performing a gate operation in a quantum computing emulation device, according to one embodiment. As illustrated in this example, method 2400 may include receiving, by a programmable gate component that includes analog multipliers, filters, and operational amplifiers, a pair of signals representing an initial quantum state and a collection of DC coefficients (as in 2402). The method may include determining the qubit(s) that are to be operated on, dependent on the coefficients (as in 2404), and determining the combination of analog elements to perform the desired operation, dependent on the DC coefficients (as in 2406). For example, one or more of the DC coefficients may be used to identify the qubit(s) to be operated on (e.g., to control a switch that selects which of the qubits are to be operated on, such as switch 2320 illustrated in FIG. 23), while other ones of the DC coefficients may be used to specify the operation to be performed on the identified qubit(s). In other embodiments, a different type of input may be used to control a switch that selects which of the qubits are to be operated on.

As illustrated in this example, method 2400 may include performing, using the selected analog elements, a matrix manipulation of the signals representing the initial quantum state (as in 2408). The method may include filtering, based on the DC coefficients, the output of the matrix manipulation to obtain signals that correspond to the selected qubit(s), as transformed by the programmable gate component (as in 2410). The method may also include outputting the signals that correspond to the transformed qubit(s) (as in 2412).

A measurement gate may map the quantum state of a quantum computing system to a result that may be useful for solving a particular problem or completing a particular task for which the quantum computing system may be designed to perform. The output of a quantum computing system may be provided by measurement gates. Certain quantum computing algorithms may also use measurement gates in solving a particular problem. As previously noted, in at least some embodiments, the quantum computing emulation devices described herein may include one or more measurement gates to extract information from the transformed signal $\psi$ representing the transformed quantum state $|\psi\rangle$. These measurement gates may include circuitry to take an analog signal generated by the gate operation component, such as an analog signal representing a transformed quantum state, and reduce it to a binary signal. For example, following the performance of one or more gate operations on a complex signal representing an initial quantum state, the resulting complex signal represents a combination of several different binary states. In this example, the measurement gates may be used to collapse result that into one of those binary states.

In some embodiments, collapsing the result into a binary state may be done by sequentially collapsing each of the qubit states. For example, for a given qubit, the signal representing the qubit may be broken into two halves, and the relative amplitude of those two halves may be examined. In one embodiment, a measurement component may include circuitry to computes a root-mean-squared (RMS) voltage between the two halves and may use the result to make a decision about whether to collapse that qubit to the zero state or the one state. After sequentially processing all of the qubits in this manner, the output analog signal may be reduced to a final digital representation of the decision or result.

In some embodiments, the procedure for performing measurements may be similar to the procedure for performing gate operations. For example, to perform a measurement on a qubit i, the partial projection signals $\psi_0^i(t)$ and $\psi_1^i(t)$ may be constructed, and their root-mean-square (RMS) values may be measured. In some embodiments, this may be done by adding the real and imaginary parts of $\psi_0^i(t)$, measuring the RMS value of the sum, and then squaring the result.

In some embodiments, information from the signal $\psi$ representing the quantum state $|\psi\rangle$ may be extracted by performing a full analysis of all complex components $\alpha_x$. This is an order $2^n$ procedure in the number of required operations, which is referred to herein as the Brute Force approach. For true quantum systems, of course, this cannot be done. Instead, information must be extracted by measuring individual qubits, thereby obtaining a binary sequence and a projection of the state according to the particular sequence of outcomes. Performing sequential measurements of this sort is an order n procedure.

In various embodiments, the output of a measurement gate may be random. In other words, the quantum state may determine a statistical distribution of possible outcomes but may not provide any information about any single or particular outcome.

A measurement gate may use projection operators to determine outcomes. To measure qubit i, the projections $\Pi_0^{(i)}|\psi\rangle$ and $\Pi_1^{(i)}|\psi\rangle$ may be constructed, after which the square magnitude of these states, denoted $q_0^{(i)}=\|\Pi_0^{(i)}|\psi\rangle\|^2$ and $q_1^{(i)}=\|\Pi_1^{(i)}|\psi\rangle\|^2$, may be computed. According to quantum theory, the outcome of such a measurement is 0 with probability $p_0^{(i)}=q_0^{(i)}/(q_0^{(i)}+q_1^{(i)})$ and 1 with probability $p_1^{(i)}=q_1^{(i)}/(q_0^{(i)}+q_1^{(i)})$.

In some embodiments, a measurement gate may be constructed by applying an inner product between the final state, $|\psi'\rangle$, and each basis state, with $\alpha'_x=\langle x|\psi'\rangle$ representing the component of $|\psi'\rangle$ corresponding to the basis state $|x\rangle$.

Measurement gates may also be constructed by modifying the quantum state to include a random component. Specifically, for a general n-qubit quantum state $|\psi\rangle$ given by $$|\psi\rangle = \sum_{x=0}^{2^n-1} \alpha_x |x\rangle$$

the signal $\tilde{\psi}$ is constructed corresponding to the modified quantum state $|\tilde{\psi}\rangle$ given by $$|\tilde{\psi}\rangle = \sum_{x=0}^{2^n-1} (\alpha_x + \nu_x)|x\rangle,$$

where $\nu_x$ represents a random variable following a particular statistical distribution.

In one embodiment, given $\tilde{\psi}$, the projection signals $\tilde{\psi}_0^{(i)}$ and $\tilde{\psi}_1^{(i)}$ may be constructed in the manner described above, after which the squared magnitudes may be obtained via a low-pass filter of their square magnitude values. This results in the values $\tilde{q}_0^{(i)}$ and $\tilde{q}_1^{(i)}$. For a specified threshold $\gamma^2>0$, an outcome of 0 may be deemed to have occurred if $\tilde{q}_0^{(i)}>\gamma^2$ and $\tilde{q}_1^{(i)}\leq\gamma^2$, while an outcome of 1 may be deemed to have occurred if $\tilde{q}_1^{(i)}>\gamma^2$ and $\tilde{q}_0^{(i)}\leq\gamma^2$.

Otherwise, the result may be marked as invalid. In some embodiments, invalid measurements may be rejected in the final analysis of results. Other representations of measurement gates may be possible, in different embodiments.

In some embodiments, a process to measure qubit i may begin by constructing the projections $\Pi_0^{(i)}|\psi\rangle$ from the partial projections $|\psi_0^{(i)}\rangle$ and $|\psi_1^{(i)}\rangle$, respectively. Let $$q_0^{(i)}:=\|\Pi_0^{(i)}|\psi\rangle\|^2=\langle\psi|\Pi_0^{(i)}|\psi\rangle, q_1^{(i)}:=\|\Pi_1^{(i)}|\psi\rangle\|^2=\langle\psi|\Pi_1^{(i)}|\psi\rangle$$

denote the magnitudes of these projections.

According to the generalized Born rule, the outcomes 0 and 1 occur with probability $p_0^{(i)} \propto q_0^{(i)}$ and $p_1^{(i)} \propto q_1^{(i)}$, and these probabilities may be computed explicitly through analog sum and division operations. For each such qubit measurement, a random input DC voltage representing a random number $u_i$, chosen uniformly in the interval [0, 1], may be input to a comparator device such that when $u_i > p_0^{(i)}$ a binary outcome of 1 is obtained with a probability given by the Born rule.

Therefore, according to the generalized Born rule, the probability of outcome $a \in \{0, 1\}$ is $$P_a^{(i)} := \frac{\langle\psi|\Pi_a^{(i)}|\psi\rangle}{\langle\psi|\psi\rangle} = \frac{q_a^{(i)}}{q_0^{(i)} + q_1^{(i)}}.$$

In this example, $|\psi\rangle$ is not assumed to be normalized.

The quantum state after measurement, in accordance with the projection postulate of wavefunction collapse, will be one of the two projections (either $\Pi_0^{(i)}|\psi\rangle$ or $\Pi_1^{(i)}|\psi\rangle$), depending upon which outcome is obtained. Equivalently, the collapsed state may be taken to be one of the partial projections (either $|\psi_0^{(i)}\rangle$ or $|\psi_1^{(i)}\rangle$), thereby collapsing to a state of n−1 qubits.

To measure a second qubit j≠i, the same procedure is followed, but it may use the (unnormalized) "collapsed" state $\Pi_0^{(i)}|\psi\rangle$ or $\Pi_1^{(i)}|\psi\rangle$, depending upon whether outcome 0 or 1, respectively, was obtained in the first measurement. In some embodiments, the selection of the collapsed state may be implemented through a simple switch controlled by the binary measurement output. This procedure may be repeated until all n qubits are measured. Doing so results in an n-bit digital output whose distribution follows the quantum mechanical predictions, at least to the limits of hardware fidelity.

From the collapsed state $|\psi^1\rangle=\Pi_a^{(i)}|\psi\rangle$ the conditional weights may be computed, as follows, for $b \in \{0, 1\}$ $$q_{b|a}^{(j|i)}:=\langle\psi^1|\Pi_b^{(j)}|\psi^1\rangle=\langle\psi|\Pi_a^{(i)}\Pi_b^{(j)}\Pi_a^{(i)}|\psi\rangle=\langle\psi|\Pi_a^{(i)}\Pi_b^{(j)}|\psi\rangle$$

The conditional probability of obtaining outcome b on qubit j, given outcome a on qubit i, is therefore $$P_{b|a}^{j|i} := \frac{\langle\psi|\Pi_a^{(i)}\Pi_b^{(j)}|\psi\rangle}{\langle\psi^1|\Pi_a^{(i)}|\psi\rangle} = \frac{q_{b|a}^{(j|i)}}{q_a^{(i)}}$$

The joint probability of both outcomes is then $P_{ab}^{(ij)} := P_a^{(i)} P_{ba}^{(ji)} = \langle \psi | \Pi_a^{(i)} \Pi_b^j | \psi \rangle / \langle \psi | \psi \rangle$.

In the QMT representation described thus far, there is no sense of a random outcome; whereas, a quantum computer is generally conceived as being probabilistic. There are several approaches one might take, then, to representing a measurement gate. One approach, the Brute Force approach described earlier, would be to extract explicitly all $2^n$ complex components of the state. Three alternative approaches are presented below, according to different embodiments.

Binary Search: in many quantum computer algorithms, the final state has either a single non-zero component or one dominant component, corresponding to the correct answer. In this case, an order –n scaling procedure may be used to compute sequentially first $q_0^{(0)}$ and $q_1^{(0)}$, then either $$q\frac{(0|0)}{0|0} \text{ and } q\frac{(1|0)}{1|0} (\text{if } q_0^{(0)} > q_1^{(0)}) \text{ or } q\frac{(0|1)}{0|1} \text{ and } q\frac{(1|1)}{1|1}$$

(otherwise), etc., selecting the larger of the two at each stage and thereby perform a binary search to identify the non-zero (or dominant) component.

Simulation: with a ready supply of random numbers serving the role of hidden variables, one could replicate the generalized Born rule and thereby replicate quantum statistics rather trivially. Suppose $u_0, u_1, \ldots, u_{n-1}$ is a realization of n independent and identically distributed uniform random variables drawn from the unit interval [0, 1]. In this example, it may be assumed that the outcome of measuring qubit 0, denoted $x_o$, is 1 if $u_0 > P_0^{(0)}$ and is 0 otherwise. The signal $\psi$ may then be replaced by that corresponding to the collapsed projection $\Pi_{xo}^{(0)} | \psi \rangle$. Continuing in this manner, a measurement of qubit i, given the previous outcomes $x_o, \ldots, x_{i-1}$, yields $x_i = 1$ if
$u_i > P_{0|xi-1, \ldots, xo}^{(i|i-1, \ldots, 0)} = \langle \psi | \Pi_0^{(i)} \Pi_{xi-1}^{(i-1)} \ldots \Pi_{xo}^{(0)} | \psi \rangle / \langle \psi | \Pi_{xi-1}^{(i-1)} \ldots \Pi_{xo}^{(0)} | \psi \rangle$ and $x_i = 0$ otherwise for $i = 0, \ldots, n-1$. This approach may be useful for quantum simulation. For the case in which there is one dominant component, this approach reduces to a binary search.

Threshold Detection: This approach may use a wholly deterministic formulation of the measurement procedure that nevertheless reproduces, or at least approximates, the generalized Born rule. One example would be to use a signal-plus-noise model with amplitude threshold detection. In this scheme, each $a_x$ is replaced by $a_x = sa_x + v_x$, where $s \geq 0$ is a scale factor and each $v_x$ is a complex random variable representing a hidden variable state. Collectively, $v_0, \ldots, v_{2n-1}$ follow a certain joint probability distribution. For example, they may be independent and identically distributed complex Gaussian random variables with zero mean. The quantum state described earlier may now be represented by a random signal of the form $$\psi(t) = \sum_{x=0}^{2n-1} a_x \phi_x(t).$$

In this example, the weights $q_0^{(i)} = \langle \psi | \Pi_0^{(i)} | \psi \rangle$ and $q_1^{(i)} = \langle \psi | \Pi_1^{(i)} | \psi \rangle$, now random variables by virtue of the noise term, may be computed in the same manner but are now compared against a threshold $\gamma^2 > 0$ for a particular realization of $\psi$. If exactly one of the two components exceeds the threshold, then it may be said that a single detection has been made (i.e., a valid measurement has been performed) and the outcome is either 0 or 1, depending upon whether $q_0^{(i)} > \gamma^2$ or $q_1^{(i)} > \gamma^2$, respectively. In some embodiments, multi-qubit measurements may use wavefunction collapse to the detected subspace projection, as described above. Surprisingly, for many cases of interest to quantum computing, it can be shown that such an approach yields results that are comparable, if not identical, to those predicted by the Born rule.

Figure 25:
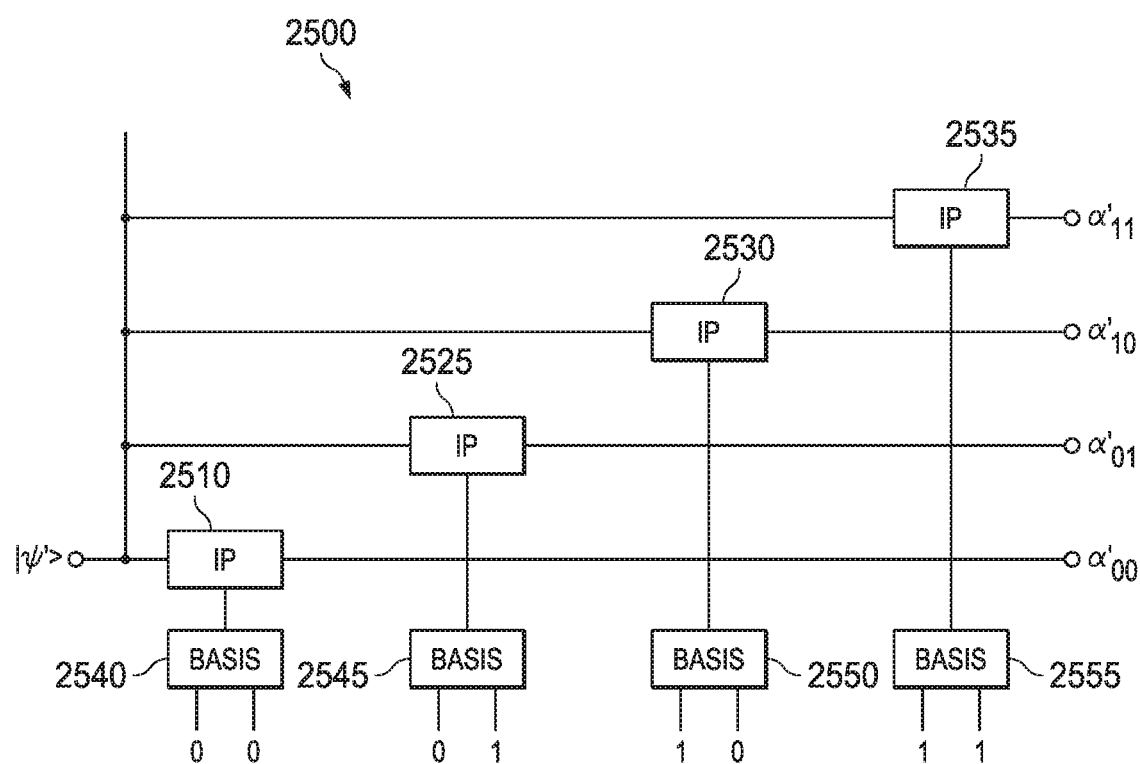
FIG. 25 illustrates an example circuit schematic for a device for extracting the constituent components of a quantum state, according to one embodiment.

FIG. 25 illustrates an example circuit schematic for a device 2500 that includes circuitry for extracting the constituent components of a quantum state, according to one embodiment. In this example, device 2500 includes four basis state generation components (shown as Basis components 2540, 2545, 2550, and 2555), and four inner product components (shown as IP components 2510, 2525, 2530, and 2535). In one embodiment, one or more of Basis components 2540, 2545, 2550, or 2555 may be implemented by device 900 illustrated in FIG. 19. In FIG. 25, the input state $\psi'$ is related to the output components $\alpha'$ via the relation $|\psi\rangle = \alpha'_{00}|00\rangle + \alpha'_{01}|01\rangle + \alpha'_{10}|10\rangle + \alpha'_{11}|11\rangle$. In at least some embodiments, device 2500 may be employed in a quantum computing emulation device to implement a state analysis measurement component that produces $\alpha'$ from $|\psi'\rangle$.

Figure 26:
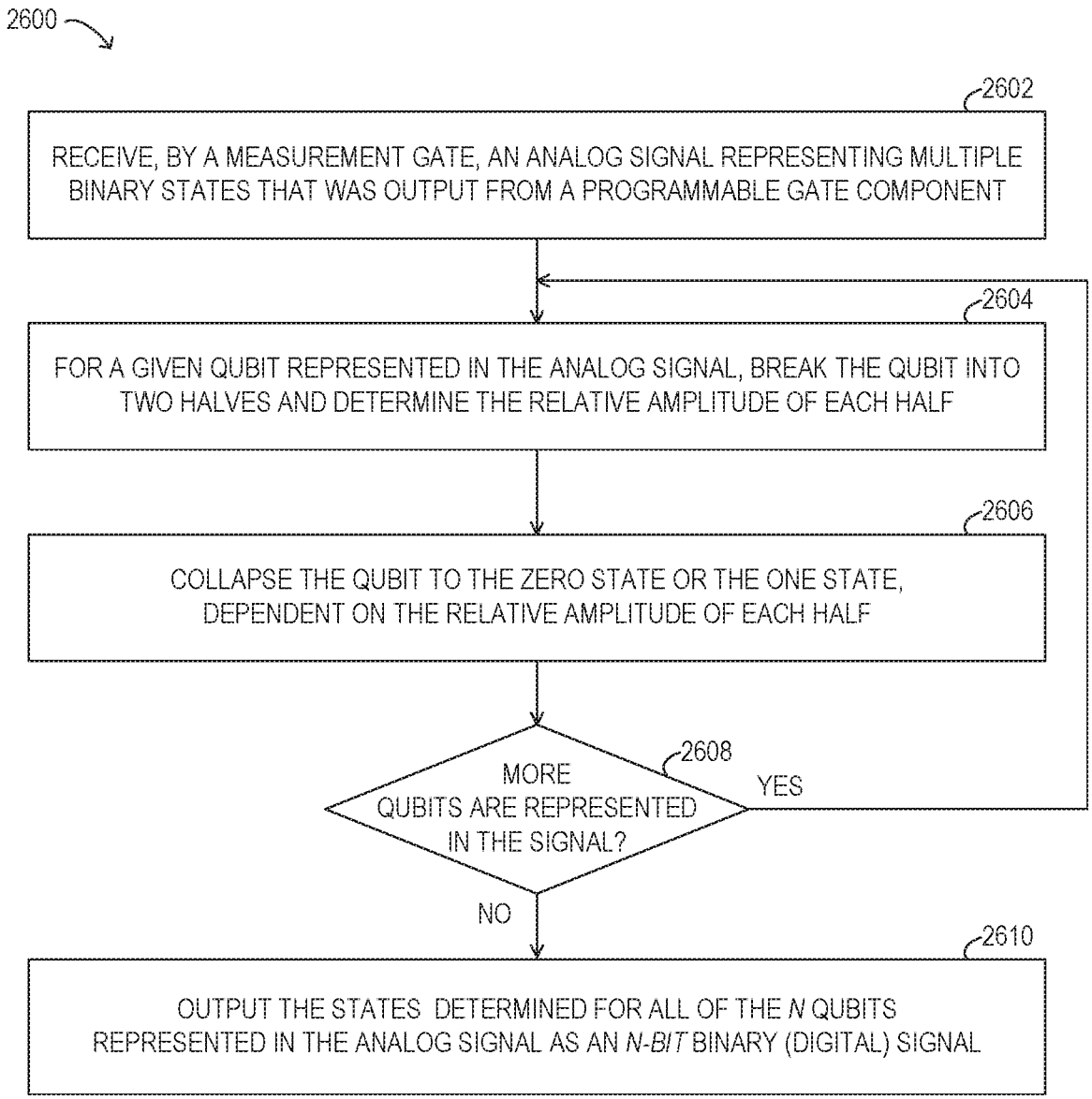
FIG. 26 illustrates an example method for measuring the results of a quantum computing operation performed in a quantum computing emulation device and returning a digital answer, according to one embodiment.

FIG. 26 illustrates an example method 2600 for measuring the results of a quantum computing operation performed in a quantum computing emulation device and returning a digital answer, according to one embodiment. As illustrated in FIG. 26, method 2600 may include receiving, by a measurement gate, an analog signal representing multiple binary states that was output from a programmable gate component (as in 2602). The method may include, for a given qubit represented in the analog signal, breaking the qubit into two halves and determining the relative amplitude of each half (as in 2604). The method may include collapsing the qubit to the zero state or the one state, dependent on the relative amplitude of each half (as in 2606). As described herein, other methods may be used to determine a measurement outcome. For example, in some embodiments, the relative amplitudes may be used to determine a probability for obtaining 0 or 1 and then an outcome may be randomly selecting according to this probability.

If (at 2608) there are more qubits represented in the signal, the operations shown as 2604 and 2606 may be repeated for each additional qubit that is represented in the signal. If, or once (at 2608), there are no additional qubits represented in the signal, the method may include outputting the states that were determined for all of the n qubits that were represented in the analog signal as an n-bit binary (digital) signal (as in 2610).

As previously noted, a quantum computing emulation device capable of initializing the system into an arbitrary two-qubit state and operating one of a universal set of gate operations has been built it hardware. This device uses a signal generator to produce a baseline 1000 Hz tonal, from which all other signals are generated and are thereby phase coherent. The lower frequency qubit, qubit B, is taken from the signal generator, with a separate, 90-degree phase-shifted signal used to represent the imaginary component. The higher frequency qubit, qubit A, is derived from qubit B via complex multiplication, which results in frequency doubling. Thus, $\omega_A = 2\pi(2000 \text{ Hz})$ and $\omega_B = 2\pi(1000 \text{ Hz})$. The two single-qubit signals are multiplied to produce the four basis signals $\phi_{00}(t) = e^{j(\omega_A + \omega_B)t}$, $\phi_{01}(t) = e^{j(\omega_A - \omega_B)t}$, $\phi_{10}(t) = e^{j(-\omega_A + \omega_B)t}$, and $\phi_{11}(t) = e^{j(-\omega_A - \omega_B)t}$ centered at frequencies +3000 Hz, +1000 Hz, −1000 Hz, and −3000 Hz, respectively.

In this device, state synthesis is performed by multiplying these four basis signals by four complex coefficients $\alpha_{00}$, $\alpha_{01}$, $\alpha_{10}$, and $\alpha_{11}$, each represented by pairs of direct current (DC) voltages, and adding the results to produce the final, synthesized signal $\psi(t)$ representing the quantum state $|\psi\rangle$. In one example, a synthesized signal, which is a pair of signals representing the real and imaginary parts of $\psi(t)$ were generated in the hardware. In this example, the state was specified by the complex coefficients $\alpha_{00}=0.6579-0.2895j$, $\alpha_{01}=0.5385+0.1383j$, $\alpha_{10}=-0.2280+0.3953j$, and $\alpha_{11}=-0.2460-0.4277j$.

To implement gate operations, the device includes a set of analog four-quadrant multipliers, filters, and operational amplifiers to realize the mathematical operations described herein. For example, to perform a gate operation on qubit A, a pair of low-pass filters is used to remove the 2000 Hz component from $e^{\pm j\omega_A t}\psi(t)$. The resulting partial projections $\psi_0^A(t)$ and $\psi_1^A(t)$ are a pair of 1000 Hz signals corresponding to qubit B. To perform the gate operation, a matrix U, given by $$U = \begin{bmatrix} U_{00} & U_{01} \\ U_{10} & U_{11} \end{bmatrix} = \begin{bmatrix} 0.1759+0.1836j & 0.4346+0.8460j \\ -0.4346+0.8640j & 0.1759-0.1836j \end{bmatrix}$$

is used it to construct two qubit-A signals of the form $U_{00}e^{j\omega_A t}+U_{10}e^{-j\omega_A t}$ and $U_{01}e^{j\omega_A t}+U_{11}e^{-j\omega_A t}$. These, in turn, are multiplied by the corresponding partial projections and added to form the final signal $\psi'(t)$, given by $$\psi'(t)=(U_{00}e^{j\omega_A t}+U_{10}e^{-j\omega_A t})\psi_0^A(t)+(U_{10}e^{j\omega_A t}+U_{11}e^{-j\omega_A t})\psi_1^A(t).$$

The quality of a quantum state or gate operation is typically measured in terms of the gate fidelity, a number between 0 and 1, where 1 is ideal. For an ideal state $|\psi\rangle$ and measured state $|\hat{\psi}\rangle$, the fidelity is $$F(\hat{\psi},\psi) = \frac{|\langle\hat{\psi}|\psi\rangle|}{\|\hat{\psi}\|\|\psi\|}$$

Using this definition, the fidelity of a state synthesis or gate operation over an ensemble of random realizations can be measured.

As an illustration, a synthesis of the entangled singlet state $|\psi\rangle=[|01\rangle-|10\rangle]/\sqrt{2}$ was performed and the fidelity of the signal used to emulate this state (just prior to performing a gate operation on it) was examined. Using the fidelity equation shown above, the ideal quantum state was compared to the state that was measured, using the recorded signal to compute the inner product $\langle\hat{\psi}|\psi\rangle$ and the normalization $\|\hat{\psi}\|$. The results of this analysis, which included a histogram of fidelity over 500 realizations of the emulated signal, indicated a mean state fidelity of $0.991\approx99\%$.

A similar technique was used to measure gate fidelity. Given a pure singlet state, a random ensemble of unitary gates was applied on qubit A. For each realization of a gate U, the ideal quantum state is $|\psi'\rangle=U|\psi\rangle$. If the measured state is denoted by $\hat{\psi}'$, then the gate fidelity will be $F(\hat{\psi}',\psi')$. The results for this example indicated that, over an ensemble of 500 runs, a mean fidelity of $0.989\approx99\%$ was obtained.

As previously noted, a quantum computing device, and the quantum computing emulation devices described herein, may be well suited to solving particular types of numerical optimization problems. One of the first demonstrations of the computational advantage of a quantum computer was given by David Deutsch. The original problem concerns a simple Boolean function $f: \{0,1\}\mapsto\{0,1\}$ and determining whether it is such that $f(0)=f(1)$ or $f(0)\neq f(1)$. In the more general Deutsch-Jozsa problem, the goal is to determine whether a given function $f: \{0,1\}^n \mapsto \{0,1\}$ is either constant (i.e., $f(x)=f(y)$ for all x, y) or balanced (i.e., $f(x)=0$ for exactly half of the possible values of x), assuming it is one of the two. On a classical (digital) computer, the only way to do this, with certainty, is to evaluate $f$ for up to $2^n/2+1$ inputs (in case the first half all give the same value). On a quantum computer, only a single application of $f$ is needed, due to quantum parallelism.

To follow the standard quantum computing algorithm, but using a QMT signal representation, one may begin with a signal of the form $$\psi(t)=e^{i\omega_n t}\ldots e^{i\omega_1 t}e^{-i\omega_0 t}.$$

This signal may represent the (n+1)-qubit quantum state $|\psi\rangle=|0\ldots 0\rangle|1\rangle$. More specifically, the left n qubits may represent the input register, while the right qubit may represent the output register. In accordance with the quantum algorithm, n Hadamard gates may be applied to the input register and one Hadamard gate may be applied to the output register to obtain $$\psi'(t)=i2^{(n+1)/2}\cos(\omega_n t)\ldots\cos(\omega_1 t)\sin(\omega_0 t).$$

This provides a superposition of all $2^n$ possible inputs. More explicitly, one may write $$\psi'(t) = i\sum_{x_n=0}^{1}\ldots\sum_{x_1=0}^{1}\frac{\phi_{x_n}^{\omega_n}(t)\ldots\phi_{x_1}^{\omega_1}(t)}{\sqrt{2^{n-1}}}\sin(\omega_0 t).$$

Next, an n-qubit unitary gate $U_f$ may be applied to the input register, and a Hadamard gate may be applied to the output register, such that the resulting signal is $$\psi''(t) = \sum_{x\in\{0,1\}^n}\frac{(-1)^{f(x)}}{\sqrt{2^n}}\phi_{x_n}^{\omega_n}(t)\ldots\phi_{x_n}^{\omega_1}(t)e^{-i\omega_0 t}.$$

Here, $x=(x_1,\ldots,x_n)$. It is known that a $U_f$ may be constructed from a polynomial number of one- and two-qubit gates, and the same is true for signals using analog filters.

In particular, $f$ may be specified uniquely by a parameter $a\in\{0,\ldots,2^{n+1}-1\}$ whose (little endian) binary representation is written $a_n\ldots a_1 a_0$. In terms of a, then, $U_f$ may be written explicitly as $$U_f=C_{n0}^{a_n}\ldots C_{10}^{a_1}X_0^{a_0}.$$

Here, $C_{i0}$ is a CNOT gate with control qubit i and target qubit 0, $X_0$ is a NOT gate applied to qubit 0, and a zero exponent corresponds to the identity. Note that $f$ is constant if and only if $a<2$. In the final step, n Hadamard gates may be applied to the input register to obtain $$\psi'''(t) = \sum_{x,y\in\{0,1\}^n}\frac{(-1)^{f(x)+x\cdot y}}{2^n}\phi_{x_n}^{\omega_n}(t)\ldots\phi_{y_1}^{\omega_1}(t)e^{-i\omega_0 t}.$$

Here, $x\cdot y=x_1 y_1+\ldots+x_n y_n$ (modulo 2).

The resulting signal is such that there is always exactly one non-zero frequency component (i.e., the quantum state has exactly one non-zero amplitude). In particular, $f$ will be constant if and only if the component $|0 \ldots 0\rangle|1\rangle$ of $|\psi'''\rangle$ has unit magnitude. To determine whether or not this is the case, one need only measure the input register.

As described above in the discussion of measurement gates, qubits n through 1 may be measured sequentially by first multiplying $\psi'''(t)$ by $e^{-i\omega_0 t}$, low-pass filtering the resulting signal, and then computing the magnitude of the resulting projection state. Continuing in this manner allows an efficient binary search over the n input register qubits. If the outcome of any of these measurements is not 0, then it may be concluded that $f$ is balanced; otherwise, it may be concluded that $f$ is constant.

Interestingly, one can go further and extract the actual value of the parameter a. For example, it can be shown that the first n binary digits of a (i.e., $a_n, \ldots a_1$) are given the measurement outcomes of qubits n through 1, respectively. Now, by construction, the qubit 0 state is $|1\rangle$, independent of $a_0$; however, if the sign of the non-zero frequency component examined (which is not possible in a true quantum system), it may be deduced that $a_0=0$ if it is positive and $a_0=1$ if it is negative. Specifically, using the deduced values of the first n qubits, the inner product $\langle a_n \ldots a_1 1|\psi'''\rangle$ may be computed. If the real part of this inner product is positive, then $a_0=0$; otherwise, $a_0=1$. In this way, in addition to determining whether $f$ is constant or balanced, the one of the $2^n+1$ possible functions that was implemented may be uniquely identified using only a single application of the oracle.

This algorithm was implemented in the MATLAB programming language using a digital simulation of the signals and gate operations, such as those described herein. Idealized filters and lossless components were assumed in the simulation. To study robustness, white Gaussian noise was added to the input signal. The results of one such run of the Deutsch-Jozsa algorithm for n=5 showed the final signal, prior to measurement, with noise added to the signal to achieve a −10 dB signal-to-noise ratio (SNR). Despite the low SNR value, the simulated measurements were easily able to correctly estimate the function parameter value (a=101000, in this case).

Figure 27:
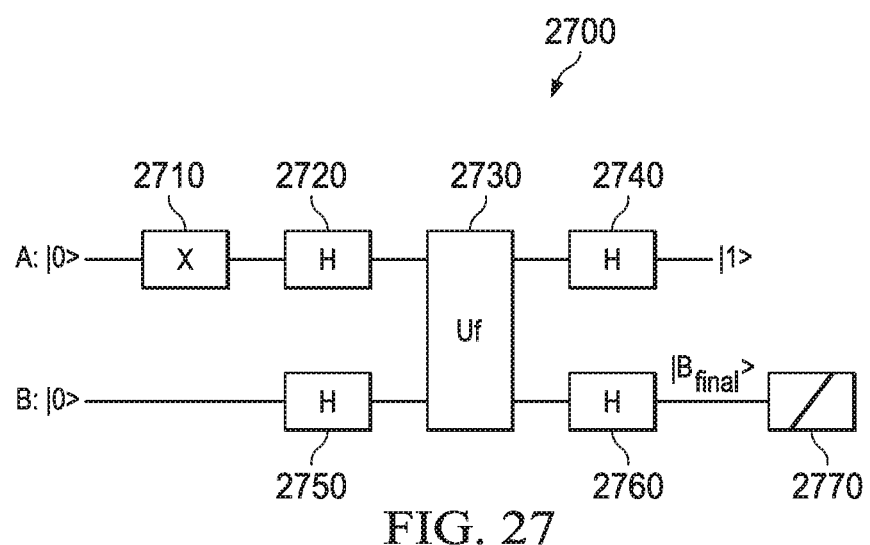
FIG. 27 illustrates an example schematic for implementing the Deutsch-Jozsa algorithm in a quantum computing emulation device, according to one embodiment.

FIG. 27 illustrates an example schematic for implementing the Deutsch-Jozsa algorithm in a quantum computing emulation device, such as those described herein. In this example, the device 2700 includes an n-qubit unitary gate $U_f$ (shown as gate 2730), two Hadamard gates on the inputs (shown as gates 2720 and 2750), and two Hadamard gates on the outputs (shown as gates 2740 and 2760). In this example, device 2700 also includes a NOT gate 2710 and a circuit 2770 to add noise to the final signal prior to measurement.

As previously noted, certain classes of problems may be well suited to solution using a quantum emulation device such as those described herein. These classes may include, for example, the set of known quantum calculations, such as Shor's factoring algorithm and Grover's search algorithm. Unstructured searches provide another class of problems that may be solved by a quantum emulation device of the sort described herein. In some cases, such problems may be represented by a Boolean function mapping an n-bit integer to a single bit such that the function may be evaluated in a number of elementary steps that grows at most polynomially with n. The search task may then include finding the inputs that yield an output of, for example, 1. The problem of determining the existence of a solution falls into the complexity class NP, while the problem of finding the number of solutions falls into the complexity class #P. A classical algorithm would need to evaluate the function at every input in order to find all solutions. The problem classes NP and #P contain some of the most challenging computational problems and are generally believed not to be efficiently solvable (i.e., solvable in polynomial time) on a probabilistic, Turing-equivalent machine.

One of the first examples of a #P problem to be studied from a complexity theory perspective is the computation of the permanent of a matrix, which is in fact #P-complete. Other examples include determining the number of perfect matchings in a bipartite graph, finding subtree isomorphisms, and graph coloring problems. Thus, #P represents a broad class of problems with important, practical applications.

In theory, a quantum computer can be used to efficiently solve problems in the complexity classes NP and #P if they possess some nonlinearity in the gate operations. Unfortunately, quantum mechanical systems observe a strictly linear time evolution, according to the Schrödinger equation. However, the quantum computing emulation devices described herein are under no such constraint. In particular, the use of projection operations allows these quantum computing emulation devices to take advantage of the Abrams-and-Lloyd scheme using the following subspace projection method.

Assume one has a Boolean function $f: \{0, \ldots, N-1\} \to \{0, 1\}$, with $N=2^n$, such that $f(x)=1$ if $x=a$ and $f(x)=0$ otherwise. Let $U_f$ denote the unitary transformation corresponding to $f$ such that, for a given basis state $|x, y\rangle$, where $x \in \{0, \ldots, N-1\}$ is the state of the input register and $y \in \{0, 1\}$ is the state of the output register, there is the following transformation:

$$U_f|x,y\rangle = |x,y \oplus f(x)\rangle.$$

In the equation above, $\oplus$ represents the modulo-2 sum operation. The quantum state $|x, y\rangle$ may be represented by a complex signal $\varphi_{x,y}(t) = \exp[j\Omega_{x,y}t]$ with a single frequency component $$\Omega_{x,y} = (-1)^{x_{n-1}}\omega_n + \ldots (-1)^{x_0}\omega_1 + (-1)^y \omega_0.$$

Here, $[x_{n-1} \ldots x_0]$ is the binary form of x. Thus, the effect of $U_f$ is only to alter the components with frequency $\pm\omega_0$. One may determine the value of a as follows. Beginning with an initial state of the form $|\psi_0\rangle = s|0, 0\rangle$, where $s>0$ is some amplitude scaling, apply Hadamard gates to each qubit in the input register (i.e., qubits 1 through n). A Hadamard gate H performs the single-qubit operations $H|0\rangle = [|0\rangle + |1\rangle]/\sqrt{2}$ and $H|1\rangle = [|0\rangle - |1\rangle]/\sqrt{2}$. This has the effect of producing a linear superposition of all possible input states so that the signal is uniformly spread across N frequencies. Thus, $$sH_n \ldots H_1|0, 0\rangle = \frac{s}{\sqrt{N}} \sum_{x=0}^{N-1} |x, 0\rangle = |\phi\rangle.$$

This state can be realized, for example, by generating an initial signal of the form $$\phi(t) = s \cos(\omega_n t) \ldots (\omega_1 t) e^{i\omega_0 t}.$$

Next, $U_f$ is applied to $|\phi\rangle$ to obtain $$U_f|\phi\rangle = \frac{s}{\sqrt{N}}\left[\sum_{x \neq a}|x, 0\rangle + |a, 1\rangle\right] = |\psi\rangle.$$

In a true quantum system, a measurement of the output register would result in the desired solution, $|a, 1\rangle$, with only a vanishingly small probability of $1/N$. This is no better than a classical algorithm that evaluates the function $O(N)$ times before obtaining the solution. Using a quantum computing emulation device such as those described herein, a single projection operation onto the subspace corresponding to the output register value of $|1\rangle$ may be performed to obtain $$|\psi'\rangle = \frac{s}{\sqrt{N}}|a, 1\rangle$$

Thereafter the value a may be read from the input register, a process that is linear in n. A similar procedure may be used in the case of multiple solutions. Compared to a classical digital machine operating serially, which must evaluate $O(N)$ input values in order to obtain a solution, there is an exponential advantage to using an analog device to evaluate the function simultaneously at every possible input and then perform a single projection operation to obtain the solution. By contrast, a standard quantum search using, say, Grover's algorithm requires $0(\sqrt{N})$ function calls and, so, provides only a quadratic speed-up.

There are tradeoffs to be made between extracting a signal of amplitude $1/\sqrt{N}$ using the aforementioned subspace projection method and either the application of $O(N)$ unitary operations using Grover's algorithm, the application of $O(N)$ unitary operations using Grover's algorithm, or the application of $O(N)$ function calls using a classical search algorithm. Having greater access and control of the quantum via a signal representation suggests that a better-than-quadratic speed-up may be obtained used the quantum computing emulation device, albeit with more limited scalability.

A similar procedure may be used to determine the number of solutions. Suppose $f(x)=1$ only for $x \in S = \{a_1, \ldots, a_M\}$ and suppose there are exactly M unique solutions. In this case, the final state, upon applying $U_f$, becomes $$|\psi\rangle = \frac{s}{\sqrt{N}}\left[\sum_{x \notin S}|x, 0\rangle + \sum_{j=1}^{M}|a_j, 1\rangle\right].$$

The state $$|\phi'\rangle = \frac{s}{\sqrt{N}}\sum_{x=0}^{N-1}|x, 1\rangle$$

may be represented by the signal $$\phi'(t) = s\cos(\omega_n t) \ldots \cos(\omega_1 t)e^{-j\omega_0 t}.$$

In this case, the inner product yields the total number of solutions, since $$M = \frac{N}{s^2}\langle\phi'|\psi\rangle = \frac{N}{s^2 T}\int_0^T \phi'(t)*\psi(t)dt.$$

It should be noted that the outcome of this procedure may not be completely deterministic since the underlying signals may be subject to noise and other errors. The magnitude of these errors may depend upon the equivalent signal-to-noise ratio and, in particular, may be proportional to $N/(s^2 T)$. For fixed s and T, this error increases exponentially with the number of bits, n, used to specify the problem. In some embodiments of the present disclosure, this effect may be compensated for by using a larger value of s. However, circuit design constraints may limit the peak voltage that is possible in the quantum computing emulation device. Another approach to compensating for errors may include using a larger value of T. However, this may produce a commensurate increase in the gate time and, hence, a reduction in overall solution time. In some embodiments, with careful engineering, the signal errors may be minimized and a computational advantage may be achieved.

The examples described above demonstrate the sorts of problem that could be solved on a quantum computing emulation device such as those described herein. It may be noted that several of these algorithms rely upon the implementation of a unitary transformation $U_f$ corresponding to the Boolean function $f$. This particular approach may only be useful, then, for classes of problems for which $f$ admits an efficient, programmable sequence of elementary gate operations to realize the corresponding unitary transformation. Since all problems in the NP complexity class permit an efficient computation of the Boolean function $f$ the corresponding unitary transformation, $U_f$, would require a number of elementary (i.e., single- and two-qubit) gates that similarly scales polynomially (typically linearly) with n. Therefore, this condition is satisfied.

Another problem to be considered for solution using a quantum computing emulation device such as those described herein is the Boolean satisfiability (SAT) problem. The general SAT problem considers a number of Boolean variables combined into a single Boolean expression via AND, OR, and NOT operators. Hence, it forms a Boolean function. If a particular assignment of values gives a result of TRUE, then the expression is said to be satisfied. Determining whether or not such an assignment exists, usually by finding one, constitutes the SAT problem. According to the Cook-Levin theorem, the unrestricted SAT problem is NP-complete, meaning that any NP problem is at least as hard as the SAT problem. Thus, a great many decision and optimization problems may be construed as being equivalent to SAT. Determining the number of satisfying assignments is a #P problem and is, in fact, #P-complete.

Logical AND and OR operations can be implemented on a quantum computer (and, similarly, on a quantum computing emulation device such as those described herein) using reversible gate operations. In particular, the three-qubit Toffoli gate $T_{ijk}$, defined such that a NOT gate is applied to qubit k if and only if qubits i and j have values of 1, may be used directly to implement a reversible AND gate. Furthermore, by applying NOT gates to all three qubits before and after application of the Toffoli gate, a reversible OR gate may be realized, since $\neg(\neg x_i \wedge \neg x_j) = x_i \vee x_j$. The three-qubit Toffoli gate, and the more general multi-qubit Toffoli gate, may, in turn, be constructed out of a universal set of one- and two-qubit gates. In this manner, any Boolean function or expression may be translated into an equivalent sequence of elementary quantum gates operations.

An unrestricted SAT problem may be formulated as a 3-SAT problem, wherein clauses consisting of disjunctions (ORs) of three literals (a variable or its negation) are combined by conjunctions (ANDS) to form an equivalent Boolean expression in so-called conjunctive normal form. The 3-SAT problem is one of Karp's 21 NP-complete problems, which include 0-1 integer programming, the four-color-map problem, and the traveling salesman problem, among others. The formulation of a quantum oracle for the 3-SAT may be implemented in terms of single-qubit, CNOT, and Toffoli gates. A standard probabilistic algorithm for solving the 3-SAT problem due to Schöning is known to run in time $(4/3)^n$, where n is the number of Boolean variables. For large problem instances, a hybrid approach in which a classical solver is combined with a quantum co-processor using Grover's algorithm to iteratively solve subsets of the 3-SAT problem has been suggested. This approach has shown performance gains of up to 50% predicted with as few as 16 qubits and 50 variables. In this manner, even the best classical solvers can be improved with the inclusion of some quantum processing.

Other, more useful, classes of functions may be identified for which an efficient, gate-based implementation is possible. For example, a typical optimization problem consists of both hard constraints (those which must logically be satisfied) and soft constraints (those for which a sub-optimal solution may be satisfactory). A Boolean function search using a quantum computing emulation device may be used for such problems to identify a set of viable solutions (i.e., those satisfying the hard constraints), from which an optimal solution may more easily be found.

The typical processing efficiency gains that might be expected when using a quantum computing emulation device such as those described herein may be estimated using the following scaling arguments. Given n, suppose that a classical evaluation of $f(x)$ takes a time $\tau_n$ that scales linearly with n such that $\tau_n = \beta_n$ for some $\beta > 0$. Note that, more generally, the scaling may be polynomial, but the linearity assumption may suffice for this estimation. A serial processing algorithm usable to determine the number of solutions M to $f(x)=1$ may be of the general form

M=0 for $x$=0 to $N$-1

$M=M+f(x)$ output M.

The serial processing algorithm may require a solution time of about N $\tau_n = \beta n2^n$. By contrast, a parallel processing algorithm with a full set of N processing nodes would take only a time $\tau_n$ to compute all N values of $f(x)$, but these values would have to be stored in a common memory location as some N-dimensional array with elements $f(0), \ldots, f(N-1)$. To compute the final answer, then, this memory must be accessed. Let a denote the access time to store or retrieve an item in memory. For synchronous dynamic random access memory (SDRAM), for example, typical access times may be around 10 ns. Determining the number of solutions, in this example, requires a serial procedure to access the array stored in memory, the elements of which must be summed to compute M. The total solution time, then, may be approximately $\tau_n + Na = \beta n + a2^n$. In accordance with Amdahl's law, for large n, the speed-up due to full parallelization may be only $\tau_n/a$, since a fraction $a/\Omega_n$ of the total time is spent in serial processing.

For a quantum computing emulation device using the aforementioned subspace projection method, the solution time scaling may be quite different. For example, the number of gate operations needed to realize the unitary operation $U_f$ may scale polynomially with n. Each of these gate operations may execute in a fixed time $T=2\pi/\omega_0$ corresponding to the period of the emulation signal and, hence, the period of the lowest-frequency qubit. Since $U_f$ need only be applied once to the entire signal, the total solution time may be the product of the number of gates times the signal period. Therefore, the total solution time may be approximately nT, which scales linearly with n.

The three approaches described above have been compared and the respective solution times were plotted in a semilog plot as a function of n. For this comparison, the following values were used: a=10 ns, $\beta$=90 ns/bit, and 1/T=10 MHz. These values were based on typical measured run times for a Deutsch-Jozsa oracle implemented classically on a single-core CPU with a 2.40 GHz clock speed, and they agreed well with a predicted solution time of $\beta n2^n$. The value of T was chosen so that, for n=1, the solution time for all methods was about 90 ns. The serial algorithm broke away from the other two and, on a semilog plot, asymptotes with a slope of $\log_{10}(2)$. The parallel and quantum computing emulation device approaches were comparable for small values of n (i.e., less than about 5 in this example) but soon broke away as the exponential term in the serial component of the parallel method began to dominate. For a relatively small number of qubits, then, it may be reasonable to expect that favorable performance can be achieved using the quantum computing emulation devices described herein.

Figure 28:
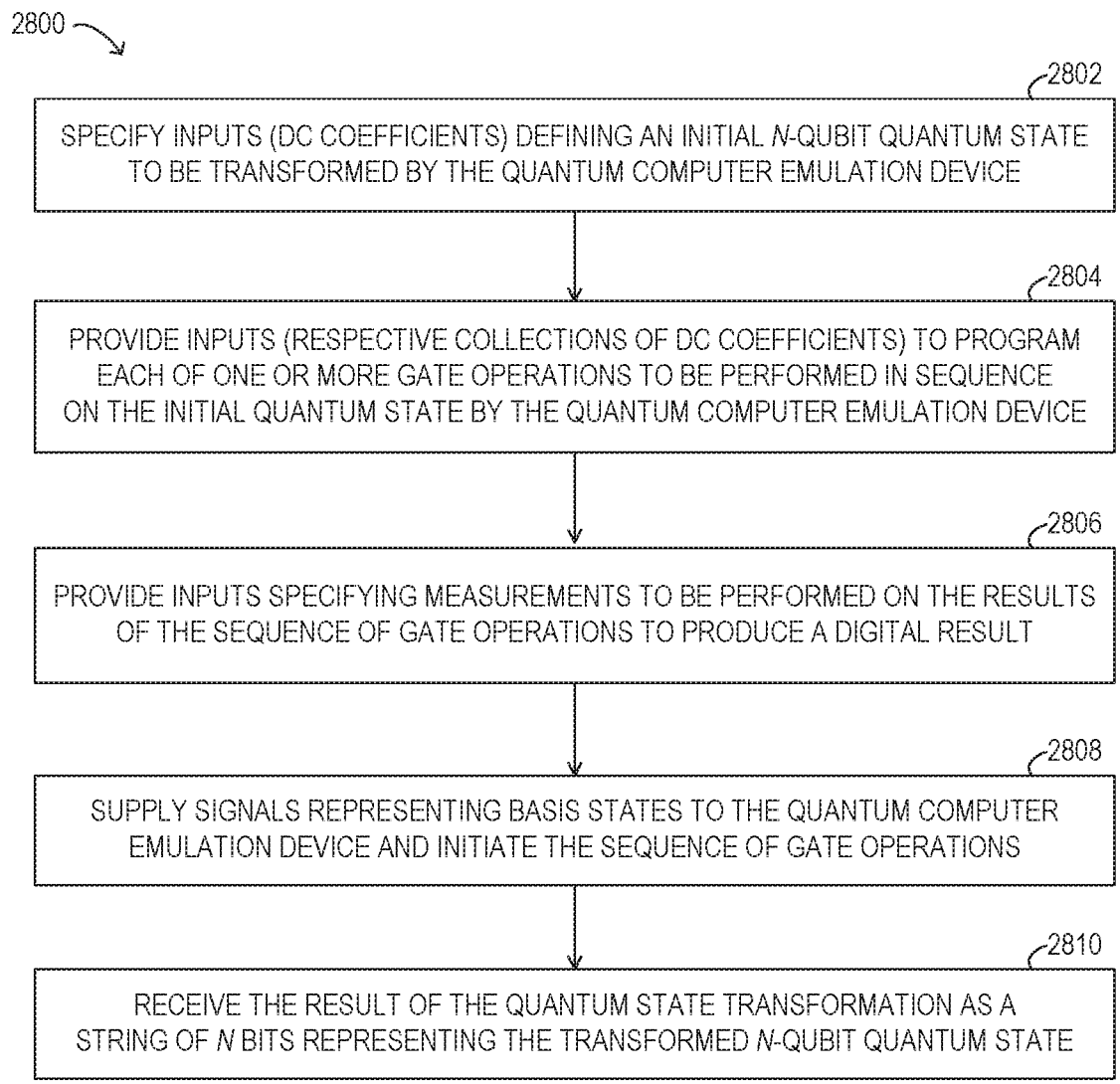
FIG. 28 illustrates an example method for programming and operating a quantum computing emulation device, according to one embodiment.

FIG. 28 illustrates an example method 2800 for programming and operating a quantum computing emulation device, according to one embodiment. As illustrated in this example, method 2800 may include specifying inputs (e.g., DC coefficients) defining an initial n-qubit quantum state to be transformed by the quantum computer emulation device (as in 2802). The method may include providing inputs (e.g., respective collections of DC coefficients) to program each of one or more gate operations to be performed in sequence on the initial quantum state by the quantum computer emulation device (as in 2804). The method may also include providing inputs specifying measurements to be performed on the results of the sequence of gate operations to produce a digital result (as in 2806).

Once the quantum computing emulation device has been programmed as in 2802, 2804, and 2806, the method may include supplying signals representing a collection of basis states to the quantum computer emulation device and initiating the programmed sequence of gate operations (as in 2608). The method may also include receiving the result of the quantum state transformation as a string of n bits representing the transformed n-qubit quantum state (as in 2810).

Figure 29:
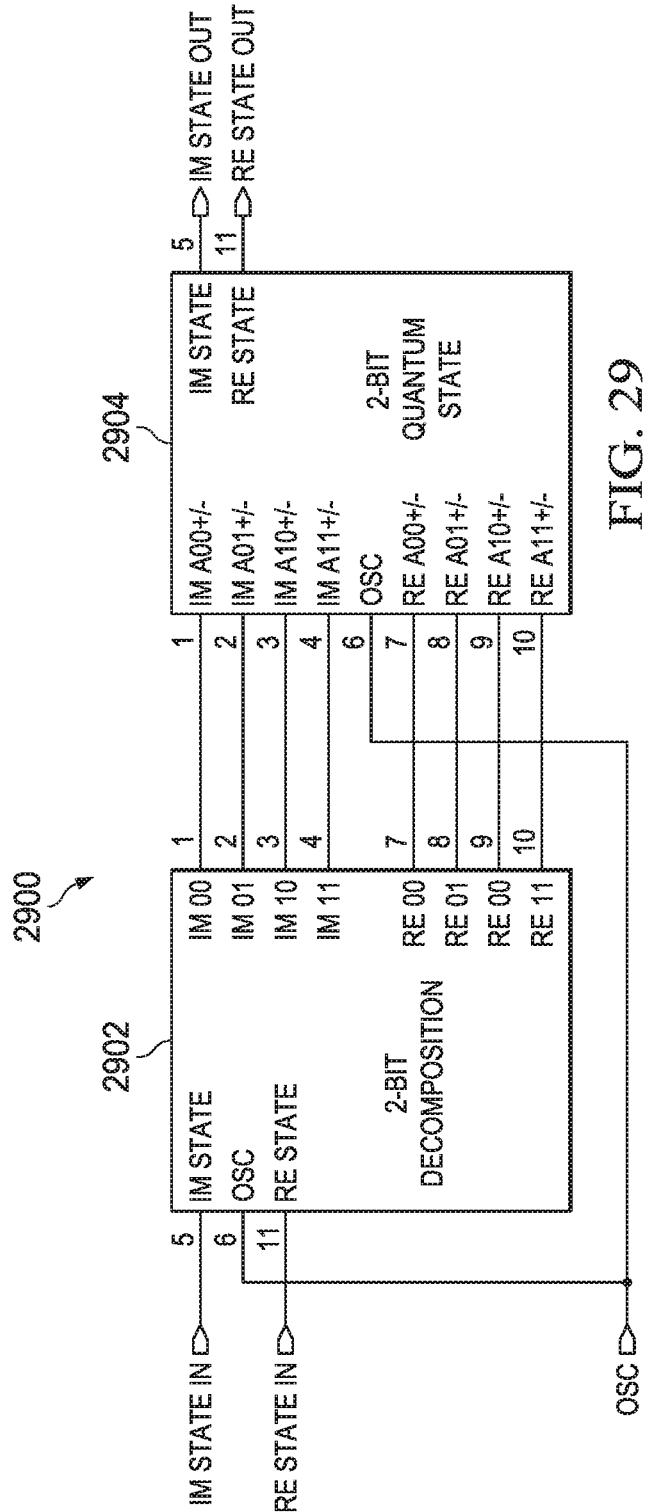
FIG. 29 illustrates an example circuit implementation for a two-qubit identity gate, according to one embodiment.
Figure 30:
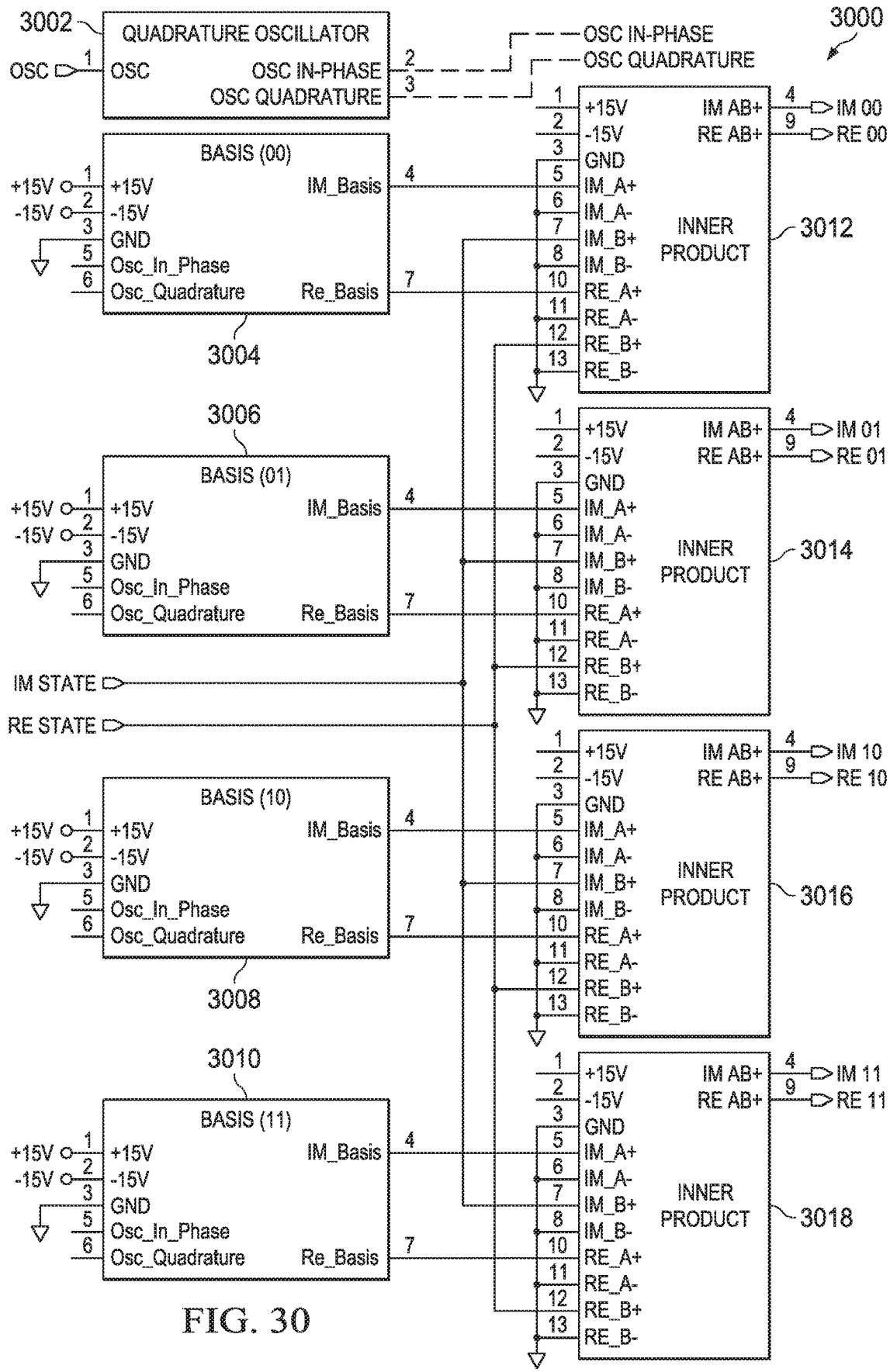
FIG. 30 illustrates an example circuit implementation for a two-qubit decomposition device, according to one embodiment.

The quantum computing emulation devices described herein may be better understood through reference to additional example circuit implementations. FIGS. 29-36 illustrate example circuit implementations of various components of the quantum computing emulation devices described herein, according to at least some embodiments. These examples are included to describe exemplary embodiments only and should not be interpreted to encompass the entire breadth of the disclosure. More specifically, FIG. 29 illustrates an example circuit implementation for a two-qubit identity gate 2900, including a two-bit decomposition circuit 2902 and a two-bit quantum state generation device 2904. FIG. 30 illustrates an example circuit implementation for a two-qubit decomposition device 3000, such as that illustrated in FIG. 29. In this example, the device includes a quadrature oscillator 3002, four basis state generators (elements 3004, 3006, 3008, and 3010), each of which may be similar to the basis state generation device 1000 illustrated in FIG. 10, and four inner product calculation devices (elements 3012, 3014, 3016, and 3018), each of which may be similar to inner product calculation device 900 illustrated in FIG. 9).

Figure 31:
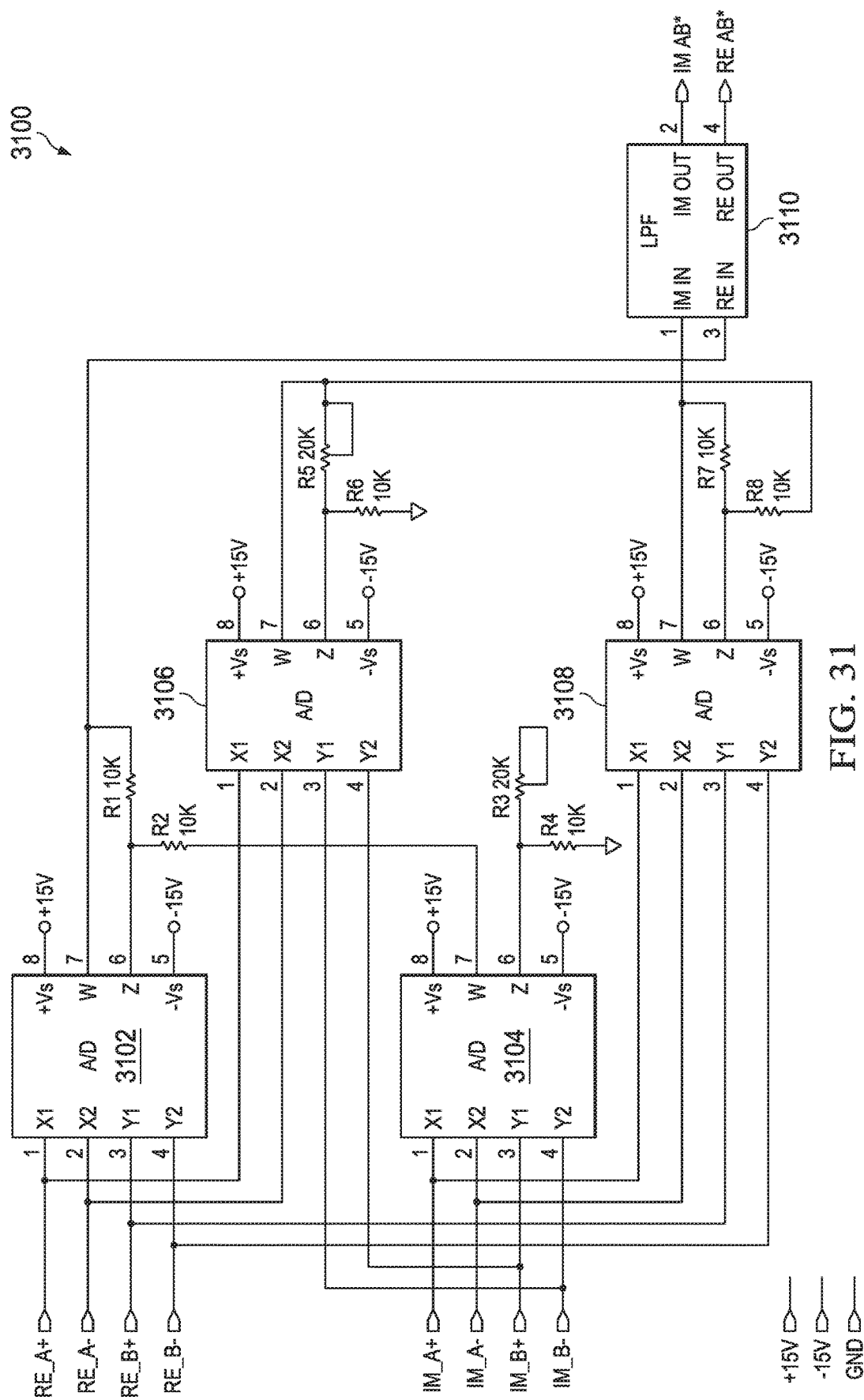
FIG. 31 illustrates an example circuit implementation for an inner product calculation device, according to one embodiment.
Figure 32:
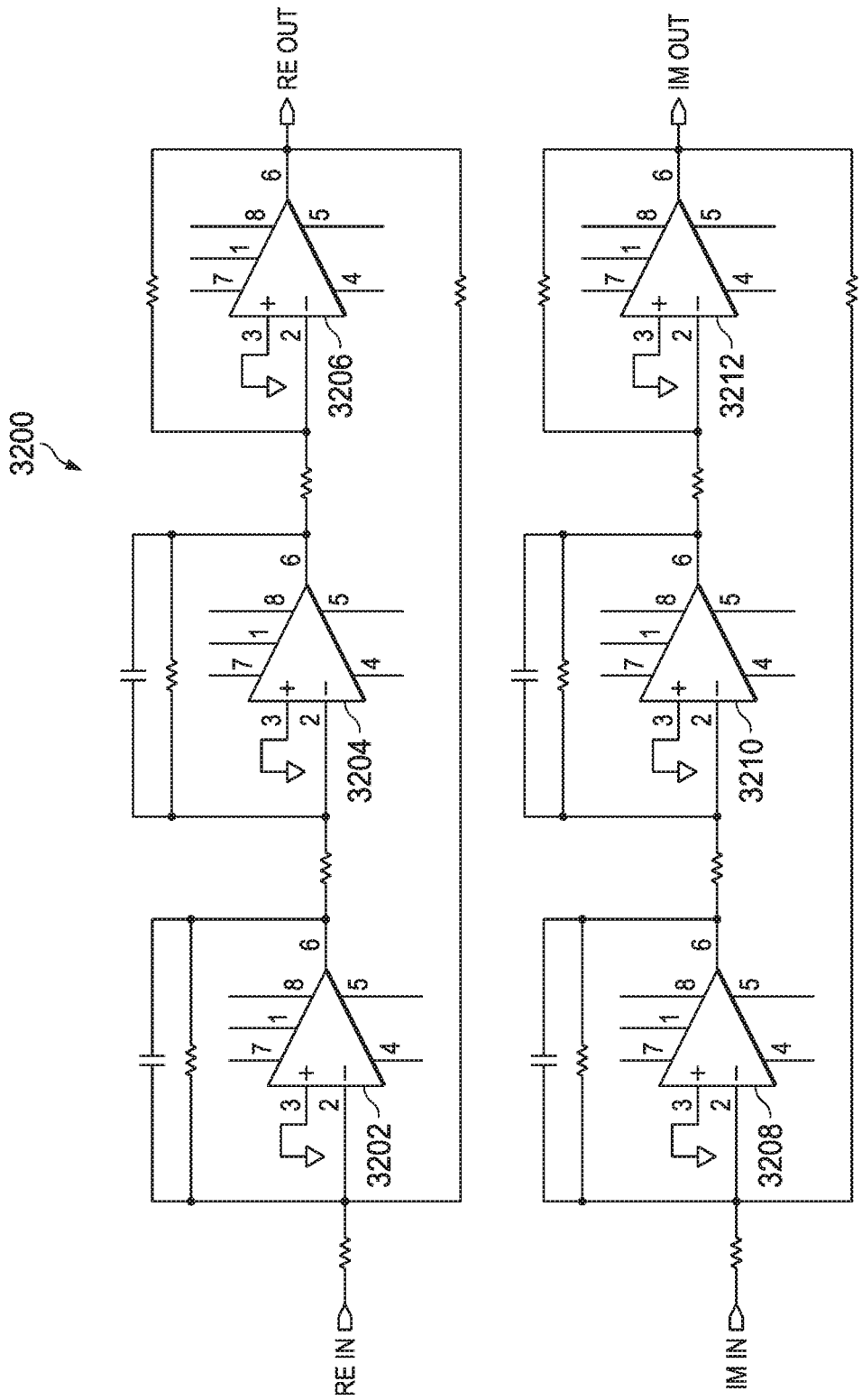
FIG. 32 illustrates an example circuit implementation for a low-pass filter, according to one embodiment.
Figure 33A:
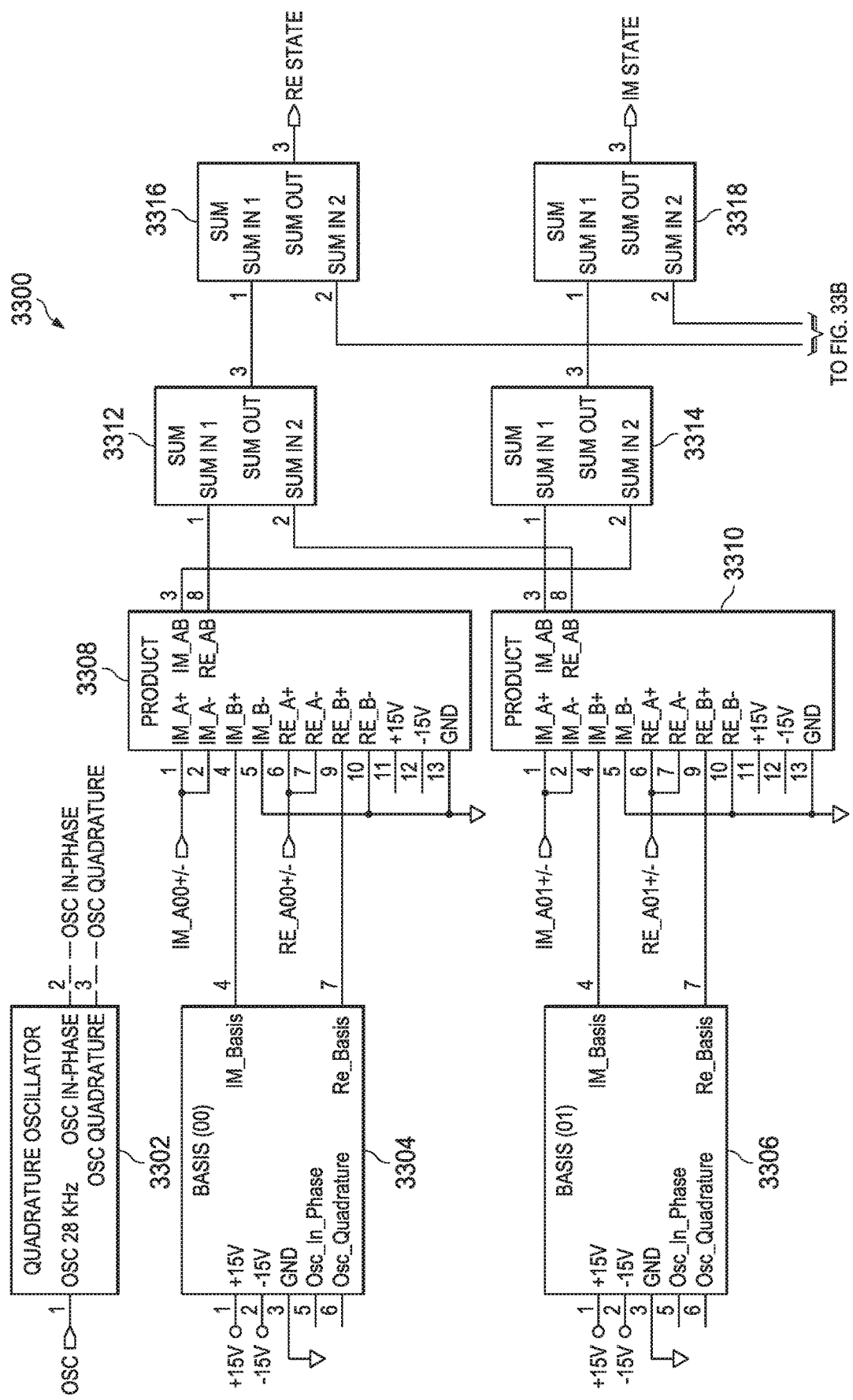
FIGS. 33A-33B illustrate an example circuit implementation for a two-qubit quantum state generation device, according to one embodiment.
Figure 33B:
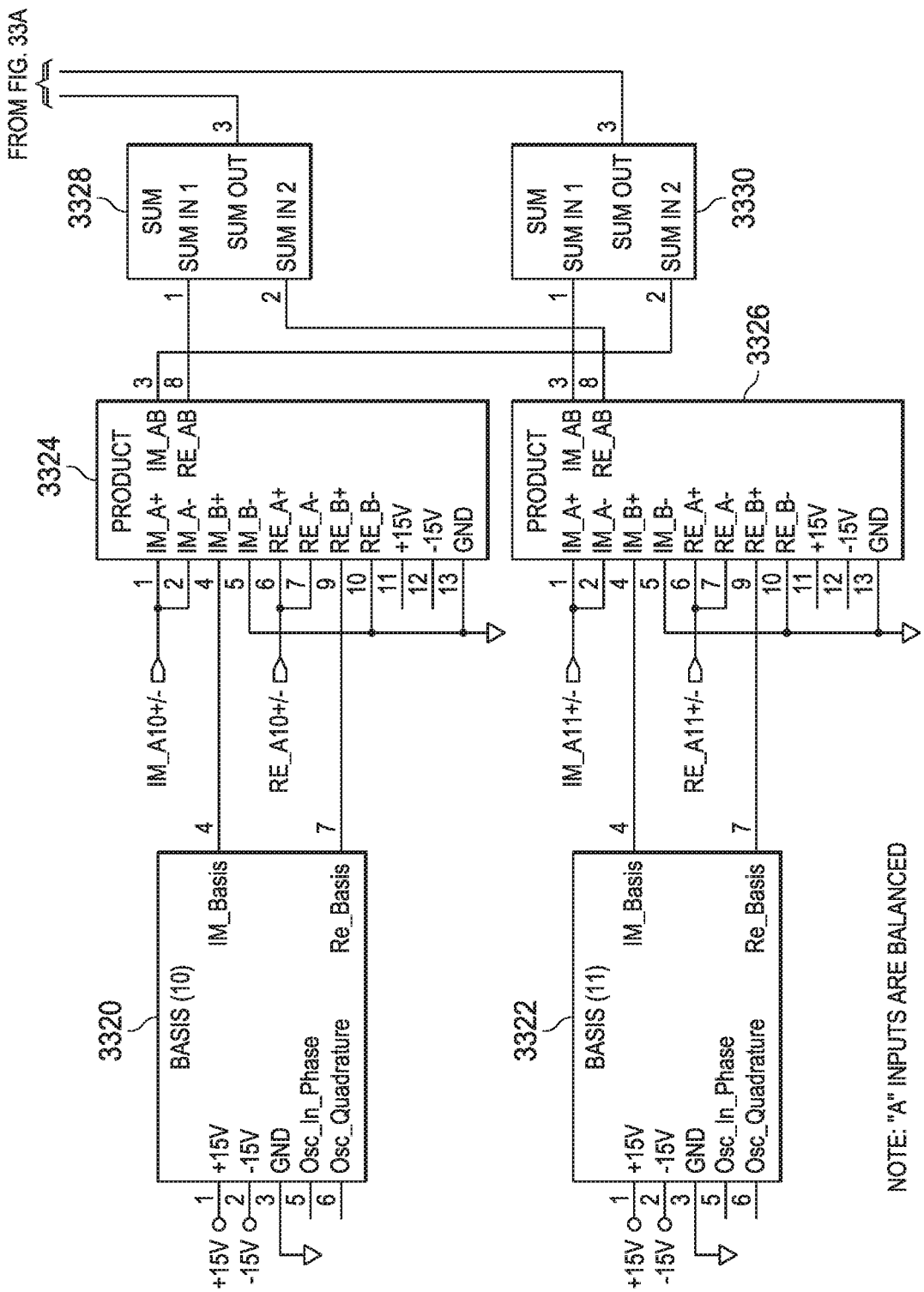
Figure 34:
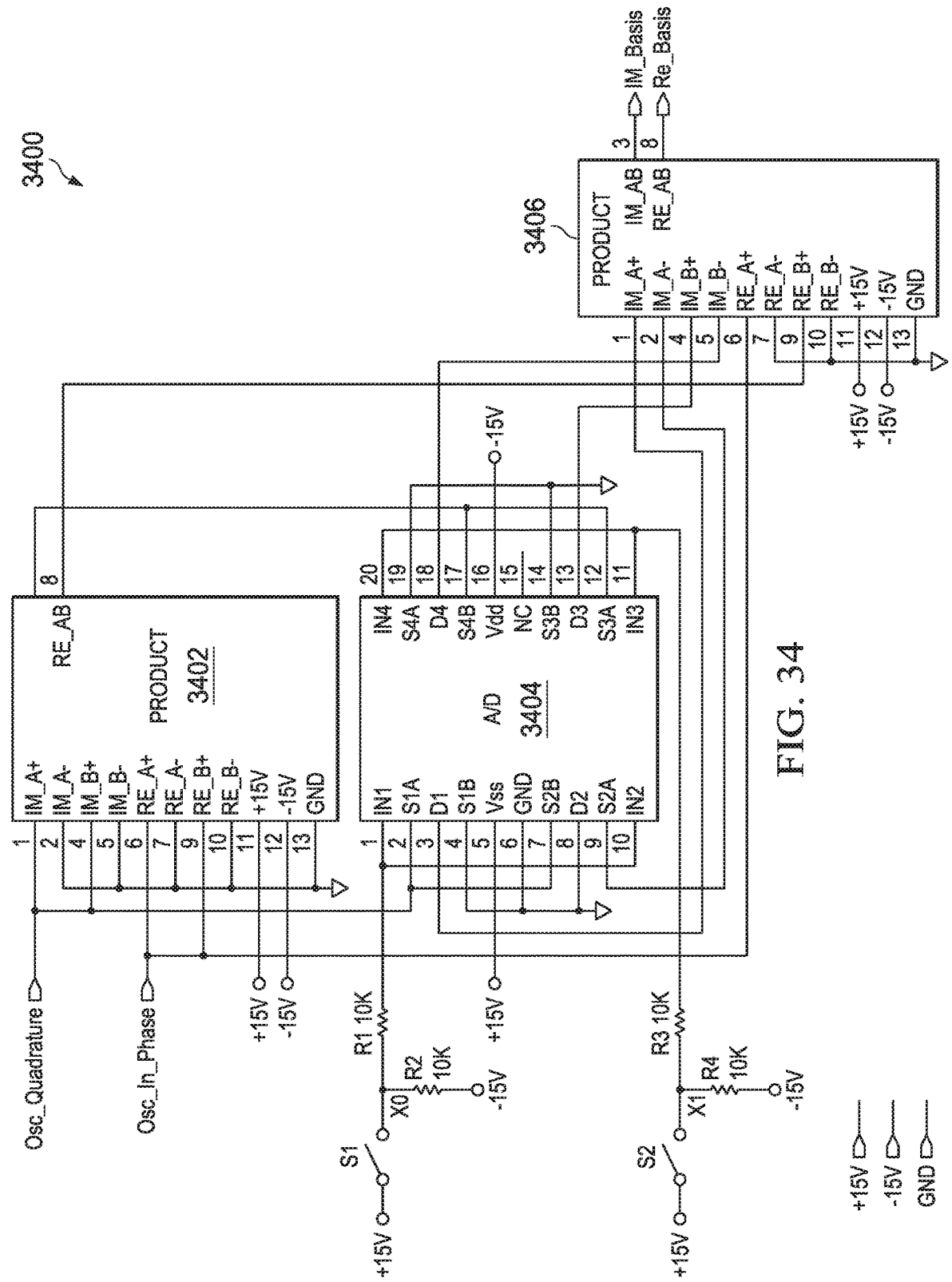
FIG. 34 illustrates an example circuit implementation for a basis state generation device, according to one embodiment.
Figure 35:
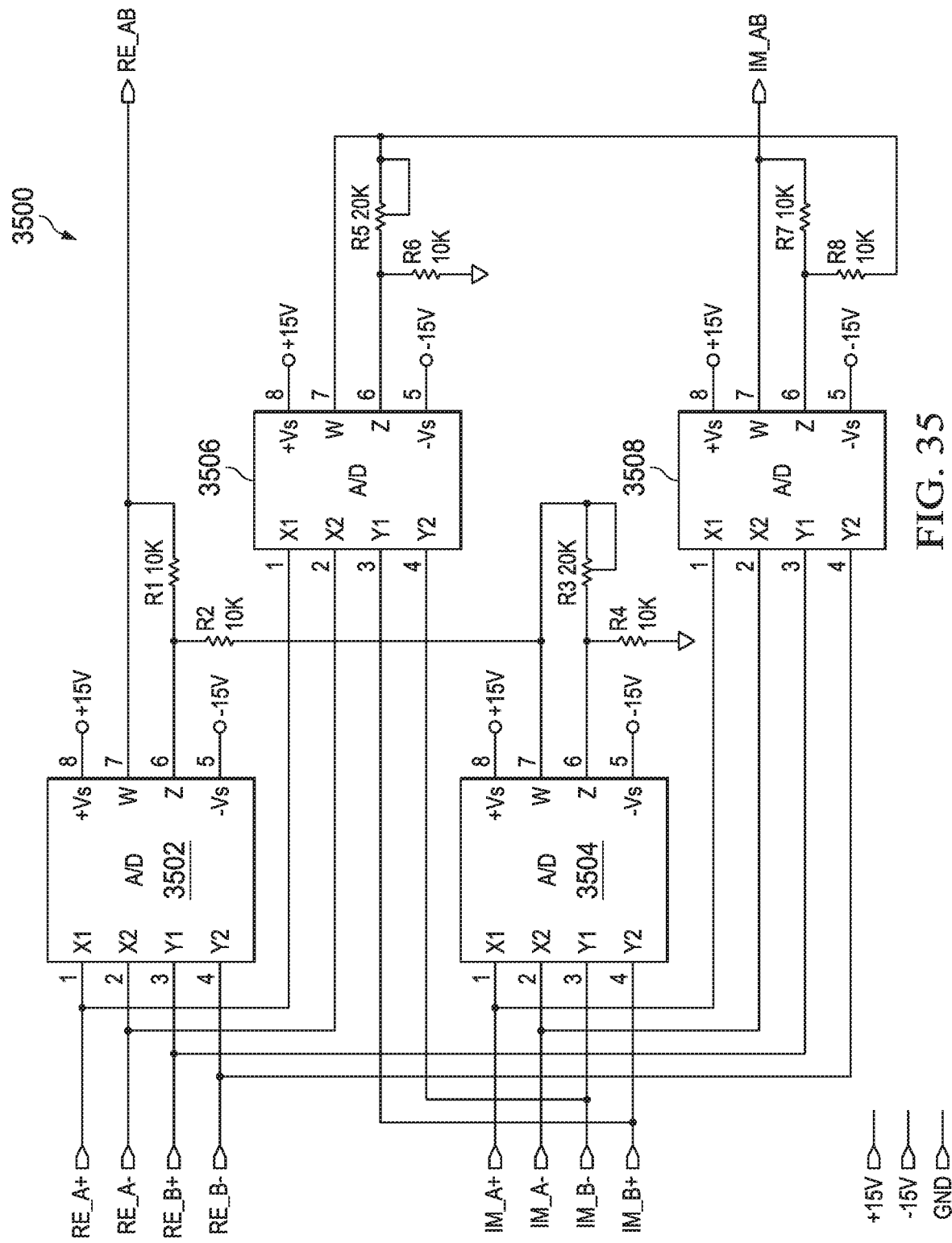
FIG. 35 illustrates an example circuit implementation for a complex product calculation device, according to one embodiment.
Figure 36:
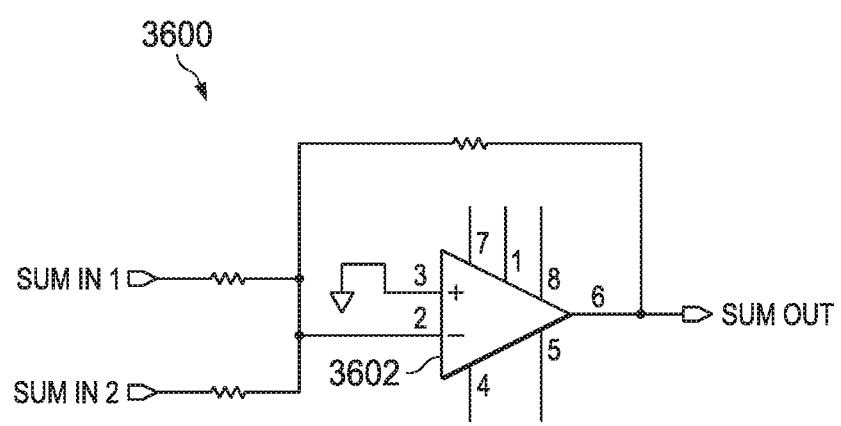
FIG. 36 illustrates an example circuit implementation for an adder, according to one embodiment.

FIG. 31 illustrates an example circuit implementation for an inner product calculation device 3100, including four analog to digital (A/D) converters (elements 3102, 3104, 3106, and 3108), and a low-pass filter 3110. FIG. 32 illustrates an example circuit implementation for a low-pass filter 3200, including six operational amplifiers 3202, 3204, 3206, 3208, 3210, and 3212. FIGS. 33A-33B, collectively, illustrate an example circuit implementation for a two-qubit quantum state generation device 3300, including a quadrature oscillator 3302, four basis state generators (elements 3304, 3306, 3320, and 3322), four product calculation devices (elements 3308, 3310, 3324, and 3326), and six adders (elements 3312, 3314, 3316, 3318, 3328 and 3330). FIG. 34 illustrates an example circuit implementation for a basis state generation device 3400, including two product calculation devices (elements 3402 and 3406) and an A/D converter 3404. FIG. 35 illustrates an example circuit implementation for a complex product calculation device 3500, including four A/D converters 3502, 3504, 3506, and 3508. FIG. 36 illustrates an example circuit implementation for an adder 3600, including an operational amplifier 3602.

The quantum computing emulation device that has been constructed as a demonstration system is currently limited to two qubits. In other embodiments, additional qubits may be implemented, with additional bandwidth requirements that may scale exponentially with the number of qubits. The complexity of the filters needed to perform the subspace projection operations may increase similarly with the number of qubits. Based on results of prototyping and simulations, it is expected that, using current integrated circuit technology, a device of up to 20 qubits may fit easily on single integrated circuit device, while 40 qubits may represent a practical upper limit on such a device.

In some embodiments, a quantum computing emulation device may be interfaced with a traditional digital computer and serve as an analog co-processor. In such embodiments, a digital computer, tasked with solving a particular problem, perhaps as a subroutine to a larger computation, may designate an initial quantum state and sequence of gate operations to be performed on this state through a digital-to-analog converter (DAC) interface. The co-processor may then produce a final state (i.e., a signal) which may be subject to a sequence of measurement gate operations. The result may be a particular binary outcome, which may then be reported back to the digital computer via an analog-to-digital (A/D) converter.

In some embodiments, each single-qubit projection operation on an n-qubit state may be implemented using a pair of distinct, comb-like filters with $2^n/4$ (positive) passband frequencies, while each two-qubit operation may be designed to perform $n(n-1)$ different projection operations.

In some embodiments, the number of qubits that can actually be realized may be dependent upon the bandwidth of the signal, while the speed of each gate operation may be determined by the lower end of the frequency band (i.e., the lowest frequency $\omega_0$, or period T, of the signal). For example, let $f_{n-1}=\omega_{n-1}/(2\pi)$ and $f_0=\omega_0/(2\pi)$ denote the upper and lower frequencies, respectively, where $f_{n-1} \geq 2f_0$. Then $n=\lceil \log_2(f_{n-1}/f_0) \rceil$ and $T=1/f_0$. Thus, the computational speedup of a quantum computing emulation device over a digital serial processor would be $$\frac{\beta n 2^n}{nT} = \beta f_{n-1}.$$

Hence, the speedup may depend only on the upper frequency limit and the digital clock speed. For $\beta$=90 ns/bit, this result may imply an over-unity speedup for upper frequencies over about 10 MHz, which may be quite reasonable to achieve. Since the result is independent of the lower frequency limit, the number of qubits required for implementation may be small, allowing for a simple and inexpensive hardware implementation.

In a specific example, under the octave spacing scheme, n qubits may require a frequency band from $\omega_0$ to $2^n\omega_0$. Each gate operation may require a time O(T) to complete, and any useful algorithm may include a number of gates that grows only polynomially in n. Thus, for a base qubit frequency of 1 MHz, in this example, a single gate operation acting simultaneously on all $2^{10}$ digital states of a 10-qubit signal may take about T=1 μs. Compared to a nominal single-core, 1 GHz digital processor, the time to process all $N=2^{10} \sim 10^6$ inputs would also be about 1 μs. Thus, a mere 10 qubits may result in a processing step time comparable to that of a modern digital processor.

For a fully parallelized digital architecture, the speedup may be more modest, as given by the expression $$\frac{\beta n + a 2^n}{nT} = \beta f_0 + \frac{a f_{n-1}}{\lfloor \log_2 f_{n-1}/f_0 \rfloor}.$$

Here, the speedup depends on both the upper and lower frequency limits. These results were plotted for both serial and parallel processing schemes. For $f_{n-1} \gg f_0$, the speedup was approximately $af_{n-1}/\log_2(f_{n-1})$, which, for a=10 ns, results in an over-unity speedup for $f_{n-1}$ above about 3.2 GHz. Thus, a 10-qubit quantum computing emulation device such as those described herein, operating in the 10 MHz to 10 GHz range, for example, may provide a computational speedup even when compared to a fully parallelized 1024-core digital processor.

In many of the example embodiments described herein, the quantum state is represented in the frequency domain. In some embodiments, additional qubits may be represented in the time domain, such as by using several signal packets. For example, additional qubits may be represented as part of train of signal packets that are separated in time. In other embodiments, the capacity of the quantum computing emulation devices described herein may be increased in the spatial domain by using parallel signals. For example, additional qubits may be represented as multiple signals existing in separate wires. In this example, the processes described herein may be parallelized and all of the gate operations may be replicated so that, instead of having a single pair of signals, there may be four or eight or more parallel signals that are combined in such a way that they allow the device to implement a large number of qubits.

The power of quantum computing lies ultimately in the ability to operate coherently on arbitrary superpositions of qubits representing the quantum state. It has been shown that the fundamental mathematics of gate-based quantum computing can be represented classically and practically implemented electronically. Thus, the quantum computing emulation devices described herein may be capable of faithfully emulating a truly quantum system, albeit one of limited scale. The work described herein serves to illustrate that by leveraging the concepts of quantum computing and applying them to classical analog systems, one can construct a relatively small-scale device that may actually be competitive with current state-of-the-art digital technology.

As described herein, a gate-based quantum computer emulation device is presented in which the physical resources needed to represent, prepare, manipulate, and measure the quantum state scale sub-exponentially with respect to the number of qubits to be represented. The quantum computer emulation devices described herein may be robust to decoherence, easily manipulated, and may be efficiently scaled to a desired number of qubits. In at least some embodiment, the quantum computer emulation devices described herein may be constructed from standard analog electronic components. These devices may be faster than current digital processors with a similar form factor and yet cheaper to build than a true quantum computing device.

Although only exemplary embodiments of the present disclosure are specifically described above, it will be appreciated that modifications and variations of these examples are possible without departing from the spirit and intended scope of the disclosure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by the law, the scope of the present disclosure is to be determined by the broadest permissible interpretation of the following claims and their equivalents, and shall not be restricted or limited by the foregoing detailed description.

What is claimed is:

1. A quantum computer emulation device, comprising:
    a basis state generator including circuitry to:
        receive a baseline signal;
        derive a plurality of phase-coherent signals from the baseline signal, wherein each of two or more pairs of signals in the plurality of phase-coherent signals is to represent a real component and an imaginary component of a signal for a single qubit; and
        multiply components of the single-qubit signals together to create a plurality of basis state signals;
    an initial quantum state generator including circuitry to:
        receive a plurality of direct current (DC) voltages, the DC voltages to represent complex coefficients; and
        generate, from the plurality of basis state signals and dependent on the plurality of DC voltages, a synthesized complex signal to represent a particular initial quantum state of two or more qubits;
    a first gate component including circuitry to:
        receive the synthesized complex signal; and
        perform a given operation on the synthesized complex signal to produce a modified complex signal, the modified complex signal to represent a transformed quantum state; and
    a measurement component including circuitry to:
        receive the modified complex signal; and
        output a digital signal, the digital signal corresponding to the transformed quantum state as measured and representing a result of the given operation.

2. The quantum computer emulation device of claim 1, wherein:
    the plurality of phase-coherent signals comprises two pairs of signals;
    the plurality of basis state signals comprises four basis state signals; and
    the synthesized complex signal is to represent the initial quantum state of two qubits.

3. The quantum computer emulation device of claim 1, wherein the initial quantum state generator further includes circuitry to:
    multiply each of the plurality of basis state AC signals by a respective pair of DC voltages, the pair of DC voltages to represent one of the complex coefficients; and
    add results of the multiplication of the basis state AC signals by the respective pairs of DC voltages to generate the synthesized complex signal.

4. The quantum computer emulation device of claim 1, wherein:
    the initial quantum state generator further includes circuitry to encode information to represent the initial quantum state in the frequency information in the synthesized complex signal;
    to produce the modified complex signal, the first gate component further includes circuitry to perform a matrix transformation on the synthesized complex signal; and
    the matrix transformation causes information to represent the transformed quantum state to be encoded in the frequency information in the modified complex signal.

5. The quantum computer emulation device of claim 1, wherein:
    to produce the modified complex signal, the first gate component is programmable to perform one of two or more supported quantum computing operations at a time, including the given operation; and
    to perform each of the two or more supported quantum computing operations, the first gate component further includes analog circuitry to perform one or more of:
        a multiplication operation;
        a summation operation; and
        a filtering operation.

6. The quantum computer emulation device of claim 1, wherein the quantum computer emulation device further comprises a second gate component including circuitry to:
    receive the modified complex signal; and
    perform a particular operation on the modified complex signal to produce a further modified complex signal, the further modified complex signal to represent a furthered transformed quantum state.

7. The quantum computer emulation device of claim 1, wherein:
    to produce the modified complex signal, the first gate component further includes circuitry to perform two or more supported quantum computing operations, including the given operation;
    at least one of the supported quantum computing operations is to operate on a single qubit; and
    at least one of the supported quantum computing operations is to operate on two or more qubits.

8. The quantum computer emulation device of claim 1, wherein to produce the modified complex signal, the first gate component further includes circuitry to:

determine on which one or more of the qubits represented in the synthesized complex signal the given operation is to be performed;
filter the synthesized complex signal to extract components of the synthesized complex signal that represent the one or more qubits on which the given operation is to be performed; and
perform the given operation.

9. The quantum computer emulation device of claim 1, wherein:
the quantum computer emulation device further comprises:
a storage component; and
circuitry to:
direct the modified complex signal from an output of the first gate component to the storage component; and
direct the modified complex signal from the storage component to an input of the first gate component;
the first gate component further comprises circuitry to:
receive the modified complex signal from the storage component; and
perform a particular operation on the modified complex signal to produce a further modified complex signal, the further modified complex signal to represent a furthered transformed quantum state.

10. A method for emulating a quantum computer, comprising:
generating a first pair of phase-coherent signals representing an initial quantum state of one or more qubits, the signals corresponding to real and imaginary parts of a complex signal, respectively;
providing the first pair of signals as inputs to a first gate component that has been programmed to perform a given quantum computing operation;
performing, by analog electronic circuits within the first gate component, the given quantum computing operation on the first pair of signals to produce a second pair of signals, the second pair of signals representing a transformed quantum state of at least one of the one or more qubits;
providing an output of the first gate component to a measurement component; and
producing, by the measurement component, a digital representation of a result of the given quantum computing operation corresponding to the output of the first gate component.

11. The method of claim 10, wherein the first pair of phase-coherent signals represents an initial quantum state of two or more qubits.

12. The method of claim 10, wherein:
the method further comprises, prior to providing an output of the first gate component to the measurement component:
storing a representation of the second pair of signals for use in a subsequent quantum computing operation;
providing the representation of the second pair of signals as inputs to the first gate component; and
performing, by analog electronic circuits within the first gate component, the subsequent quantum computing operation on the second pair of signals to produce a third pair of signals, the third pair of signals representing a transformed quantum state of at least one of the one or more qubits; and
providing an output of the first gate component to the measurement component comprises providing the third pair of signals to the measurement component.

13. The method of claim 10, further comprising, prior to providing the first pair of signals as inputs to the first gate component:
programming the first gate component to perform the given quantum computing operation, including:
providing, to the first gate component, inputs that cause the first gate component to perform a particular one of two or more quantum computing operations that are executable by the analog electronic circuits within the first gate component, the particular quantum computing operation including one or more of:
a multiplication operation;
a summation operation; and
a filtering operation.

14. The method of claim 10, further comprising, prior to providing the first pair of signals as inputs to the first gate component:
receiving a baseline signal;
deriving a plurality of phase-coherent signals from the baseline signal, wherein each of two or more pairs of signals in the plurality of phase-coherent signals represents a real component and an imaginary component of a signal for a single qubit;
multiplying components of the single-qubit signals together to create a plurality of basis state signals;
receiving input representing a plurality of complex coefficients; and
generating, from the plurality of basis state signals and dependent on the plurality of complex coefficients, the first pair of signals.

15. The method of claim 10, further comprising, prior to providing an output of the first gate component to the measurement component:
performing, by analog electronic circuits of a second gate component within the first gate component, a second quantum computing operation on the second pair of signals to produce a third pair of signals, the third pair of signals representing a transformed quantum state of at least one of the one or more qubits; and
providing an output of the first gate component to the measurement component comprises providing the third pair of signals to the measurement component.

16. A non-transitory computer readable medium storing instructions that when executed by a processor cause the processor to perform:
receiving input defining an initial quantum state of one or more qubits to be encoded in a pair of phase-coherent signals, the signals representing real and imaginary parts of a complex signal, respectively;
providing the input defining the initial quantum state to a quantum computing emulation device as one or more direct current (DC) values;
receiving input defining a first quantum computing operation to be performed on the pair of signals into which the initial quantum state is encoded;
providing the input defining the first quantum computing operation to the quantum computing emulation device as one or more pairs of DC values, each representing a complex coefficient of a matrix transformation to be applied by the quantum computing emulation device to transform the initial quantum state;
receiving, subsequent to the performance of the first quantum computing operation on the pair of signals by the quantum computing emulation device, a digital signal corresponding to a modified quantum state as transformed by the quantum computing emulation device and representing a result of the first quantum computing operation.

17. The non-transitory computer readable medium of claim 16, wherein when executed by the processor the instructions further cause the processor to perform:
receiving input defining a plurality of basis states from which the pair of phase-coherent signals are to be derived; and
providing the input defining the plurality of basis state to the quantum computing emulation device.

18. The non-transitory computer readable medium of claim 16, wherein receiving the input defining the first quantum computing operation comprises receiving input selecting one of a plurality of quantum computing operations supported in the quantum computing emulation device.

19. The non-transitory computer readable medium of claim 16, wherein:
receiving the input defining the first quantum computing operation comprises receiving input specifying on which one or more of the one or more qubits the first quantum computing operation is to be performed; and
the digital signal representing the modified quantum state is dependent on which one or more of the one or more qubits are specified.

20. The non-transitory computer readable medium of claim 16, wherein:
when executed by the processor the instructions further cause the processor to perform:
receiving input defining a second quantum computing operation to be performed by the quantum computing emulation device to transform the result of the first quantum computing operation;
providing the input defining the second quantum computing operation to the quantum computing emulation device as one or more pairs of DC values; and
the digital signal represents a modified quantum state as transformed by the performance of the first quantum computing operation and the second quantum computing operation by the quantum computing emulation device.

* * * * *